United States Patent [19]
Nimura et al.

[11] Patent Number: 6,125,323
[45] Date of Patent: Sep. 26, 2000

[54] DEVICE FOR PROCESSING ROAD DATA OR INTERSECTION DATA

[75] Inventors: Mitsuhiro Nimura; Yasunobu Ito, both of Anjo, Japan

[73] Assignee: Aisin AW Co., Ltd., Japan

[21] Appl. No.: 08/847,504

[22] Filed: Apr. 25, 1997

[30] Foreign Application Priority Data

| Apr. 28, 1996 | [JP] | Japan | 8-131446 |
| Apr. 29, 1996 | [JP] | Japan | 8-131443 |
| Jun. 14, 1996 | [JP] | Japan | 8-154651 |
| Jun. 14, 1996 | [JP] | Japan | 8-154652 |

[51] Int. Cl.⁷ .............................................. G06F 165/00
[52] U.S. Cl. ..................... 701/207; 701/208; 701/202; 701/209; 701/211; 701/200; 701/210; 340/988
[58] Field of Search ..................... 701/207, 208, 701/202, 209, 211, 200, 210; 340/988

[56] References Cited

U.S. PATENT DOCUMENTS

| 5,486,822 | 1/1996 | Tenmoku et al. | 340/995 |
| 5,508,931 | 4/1996 | Snider | 364/449 |
| 5,821,880 | 10/1998 | Morimoto et al. | 340/995 |
| 5,844,505 | 12/1998 | Van Ryzin | 340/988 |
| 5,874,905 | 2/1999 | Nanba et al. | 340/995 |
| 5,884,218 | 3/1999 | Nimura et al. | 701/208 |
| 5,887,269 | 3/1999 | Brunts et al. | 701/208 |
| 5,893,045 | 4/1999 | Kusama et al. | 701/211 |
| 5,893,113 | 4/1999 | McGrath et al. | 707/200 |
| 5,897,603 | 4/1999 | Henderson | 701/207 |
| 5,944,768 | 8/1999 | Ito et al. | 701/200 |
| 5,948,042 | 9/1999 | Heimann et al. | 701/208 |
| 5,954,773 | 9/1999 | Luper | 701/35 |

*Primary Examiner*—William A. Cuchlinski, Jr.
*Assistant Examiner*—Olga Hernandez
*Attorney, Agent, or Firm*—Lorusso & Loud

[57] ABSTRACT

In traveling toward a destination, locus data for routes traveled by a vehicle is repeatedly learned and stored, and a route is identified in route searching using the stored locus data. The stored locus data may be rearranged or deleted, and undesired locus data is not used in route searching. Storage of locus data may be limited to certain areas so as not to store undesired locus data. The geographical coordinates of the stored locus data are corrected, as required, and locus data such as links are correctly shown on a map.

30 Claims, 36 Drawing Sheets

FIG. 3

FIRST RAM 5

| PRESENT POS. DATA | MP |
|---|---|
| ABSOLUTE DIR. DATA | ZD |
| RELATIVE DIR. ANGLE DATA | D$\theta$ |
| TRAVELED DIS. DATA | ML |
| PRESENT POS. DATA | PI |
| VICS DATA | VD |
| ATIS DATA | AD |
| INPUTTED DES. DATA | TP |
| START POINT OF ROUTE DATA | SP |
| END POINT OF ROUTE DATA | ED |
| GUIDE ROUTE DATA | MW |
| POS. DATA | PQ1 |
| POS DATA | PQ2 |
| ANGLE CHANGE DATA | RZ |
| START POINT COST | VA |
| END POINT COST | VB |
| LINK TRAVEL COST | VL |
| INSC. TRAVEL COST | VC |
| LOCUS ROUTE | KT (S) |
| LOCUS ROUTE | KR (P) |
| LOCUS ROUTE | KU (H) |
| ROUTE DIS. | KTL (S) |
| ROUTE DIS. | KRL (P) |
| ROUTE DIS. | KUL (H) |
| CALCULATION REGISTER | UW |
| EVALUATED VALUE | KCS(GM) |

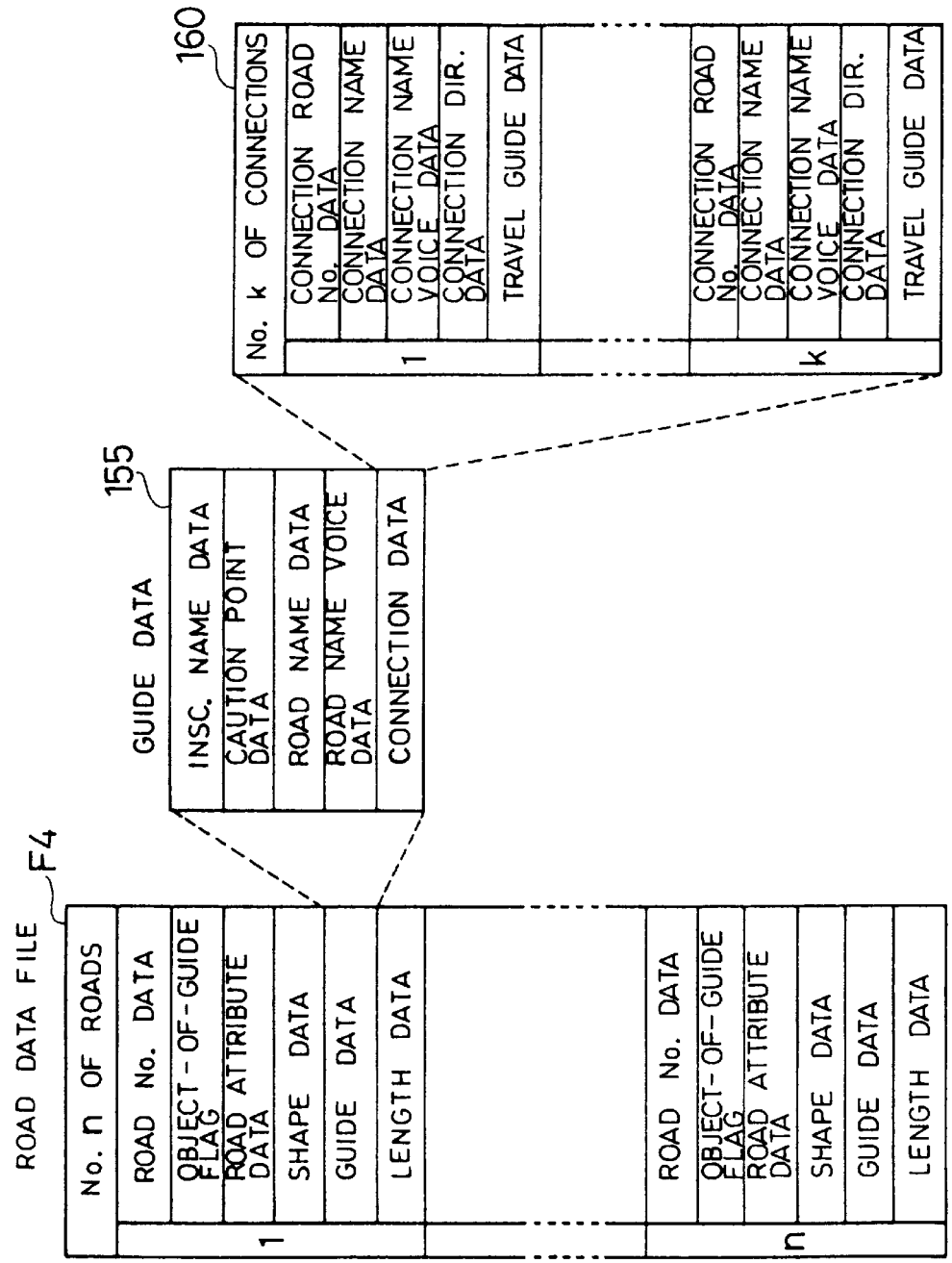

FIG. 5

NODE DATA 55

| | |
|---|---|
| | No. NP(nn) OF NODES |
| 1 | NODE No. NB |
| | THE EAST LONGITUDE COORDINATE NPE |
| | THE NORTH LATITUDE COORDINATE NPN |
| | INSC. No. NPB |
| ↓ | ⋮ |
| nn | NODE No. NB |
| | THE EAST LONGITUDE COORDINATE NPE |
| | THE NORTH LATITUDE COORDINATE NPN |
| | INSC. No. NPB |

FIG. 6

LINK DATA 60

| | | |
|---|---|---|
| | No. (NL) OF LINKS | |
| 1 | LINK No. RB | |
| | START POINT NODE No. SNB | |
| | END POINT NODE No. ENB | |
| | No. OF TIMES SEK OF TRAVEL IN THE START POINT→END POINT DIR. | |
| | No. OF TIMES ESK OF TRAVEL IN THE END POINT→START POINT DIR. | |
| | No. OF TIMES YT OF INPUT BY THE USER | |
| | LENGTH LR OF LINK | |
| | AVERAGE VEHICLE SPEED AS | |
| | TRAVELED DATE-AND-HOUR DATA SND | |
| | ROAD DISCRIMINATION DATA LD | |
| | ROAD No. MB IN THE MAP DATA | |
| | START POS. MSP ON A ROAD IN THE MAP DATA | |
| | END POS. MEP ON THE ROAD IN THE MAP DATA | |
| | ⋮ | |
| NL | LINK No. RB | |
| | START POINT NODE No. SNB | |
| | END POINT NODE No. ENB | |
| | ⋮ | |
| | START POS. MSP ON A ROAD IN THE MAP DATA | |
| | END POS. MEP ON THE ROAD IN THE MAP DATA | |

FIG. 7

| INSC. DATA | | | 65 |
|---|---|---|---|
| No. (nc) OF INSCS. | | | |
| 1 | INSC. No. NPB | | |
| | No. (NIM) OF ENTERING LINKS | | |
| | 1 | ENTERING LINK No. IRB | |
| | | No. OF LEAVING LINKS (NOUT) | |
| | | 1 | LEAVING LINK No. ORB |
| | | | No. OF TIMES NVC OF TRAVEL IN THE ENTERING→LEAVING DIR. |
| | | | AVERAGE TIME TSU FOR PASSING |
| | | | TRAVELED DATE AND HOUR DTS |
| | | | ⋮ |
| | | NOUT | LEAVING LINK No. ORB |
| | | | No. OF TIMES NVC OF TRAVEL IN THE ENTERING→LEAVING DIR. |
| | | | AVERAGE TIME TSU FOR PASSING |
| | | | TRAVELED DATE AND HOUR DTS |
| | ⋮ | | |
| | NIM | ENTERING LINK No. IRB | |
| | | No. OF LEAVING LINKS (NOUT) | |
| | | 1 | LEAVING LINK No. ORB |
| | | | No. OF TIMES NVC OF TRAVEL IN THE ENTERING→LEAVING DIR. |
| | | | AVERAGE TIME TSU FOR PASSING |
| | | | TRAVELED DATE AND HOUR DTS |
| | | | ⋮ |
| | | NOUT | LEAVING LINK No. ORB |
| | | | No. OF TIMES NVC OF TRAVEL IN THE ENTERING→LEAVING DIR. |
| | | | AVERAGE TIME TSU FOR PASSING |
| | | | TRAVELED DATE AND HOUR DTS |
| ⋮ | | | |
| nc | | | |

FIG. 8

POINT LIST    66

| | | |
|---|---|---|
| | No. Pn OF POINTS | |
| 67 — 1 | RANGE OF STORAGE | RP |
| | THE EAST LONGITUDE COORDINATE | PTE |
| | THE NORTH LATITUDE COORDINATE | PTN |
| | No. OF TIMES HTP OF RECOGNIZING THE POS. | |
| ↓ | ⋮ | |
| Pn | RANGE OF STORAGE | RP |
| | THE EAST LONGITUDE COORDINATE | PTE |
| | THE NORTH LATITUDE COORDINATE | PTN |
| | No. OF TIMES HTP OF RECOGNIZING THE POS. | |

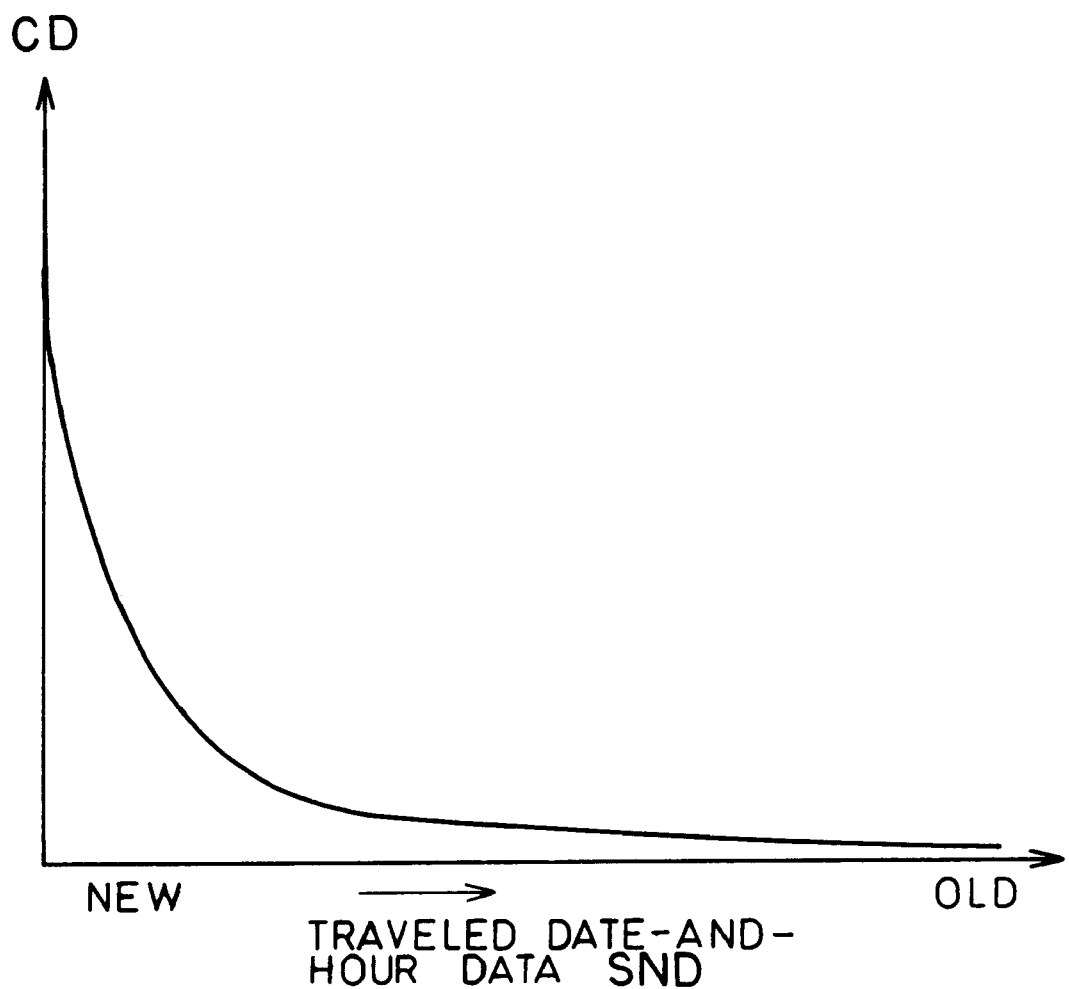

DEVICE FOR PROCESSING ROAD DATA OR INTERSECTION DATA

BACKGROUND OF THE INVENTION

1. Field of the Invention

The present invention relates to a device for processing road data or intersection data and, more specifically, to a navigation device in which a route along which a moving body will travel is identified based upon map data, and the route that is identified is displayed to the operator. In particular, the invention relates to a navigation system which learns the route of travel.

2. Description of the Related Art

A conventional navigation device has been disclosed in, for example, Japanese Unexamined Patent Publication (Kokai) No. 194473/1986. According to this navigation device, a map of a desired area is displayed on a display unit based upon the stored map data. Conditions for identifying the facilities are shown on the screen of the display unit, the conditions for identification are selected step by step, and a facility desired by the user is set as a destination.

The position of the thus set facility is indicated by a discrimination mark on the map screen. Based on the map data, furthermore, the navigation device searches a route from the present position to the facility that is set and displays the route on the screen. While the moving body is traveling along the route, the user is informed of various necessary data (road into which the moving body should enter, etc.) by voice or the like means.

The route that is identified is, for example, the one along which the moving body can arrive at the destination traveling a distance which is as short as possible, the one composed of roads which are relatively wide, or the one along which the moving body needs turn to the right or to the left the least number of times. However, the route that is identified does not necessarily include the roads along which the driver usually travels or the roads which the driver prefers.

Moreover, the road data in the map data is stored in a nonvolatile data storage unit, and the roads that are not stored in the nonvolatile data storage unit are not included in the route that is identified. In practice, however, new roads are constructed one after another, and the most desirable route is often not identified by the road data stored in the nonvolatile data storage unit. For example, a route which utilizes the new road may often enable the moving body to move to a desired destination more quickly and more favorably. Changes of the roads result from an increase or a decrease in the number of lanes of the existing roads, the existing road that is constructed as an elevated road, as an underpass or as a solid crossing, construction of a bridge, tunnel and signals.

In particular areas such as the vicinity of the dwelling of the driver, furthermore, it is desired that the roads preferred by the driver are preferentially used as a guide route. In foreign areas, however, it is desirable that wider roads be used as a guide route. In other words, the driver may feel more comfortable in driving when the roads used as a guide route are changed depending upon the area.

In particular, it will become more convenient if data for the roads used for driving the vehicle is saved, and thus the saved road data is utilized for searching a route. Besides, an optimum route can be identified if predetermined amounts of the stored road data can be rearranged.

SUMMARY OF THE INVENTION

According to the present invention, the present position of a vehicle is detected, the data related to the present position that is detected is compared with the data related to a road or to an intersection, and the data for number of trips through the road or through the intersection is updated, depending upon the result of comparison. In searching a route from a point of departure of the vehicle or from near the present position of the vehicle to near the destination, furthermore, an intersection or a road of a large "passing volume" is found based upon the saved data for passage through the intersection or the road in previous trips and is preferentially used as a route. Thus, the road or the intersection through which many vehicle trips have been made is preferentially used as a guide route.

Moreover, the present position of the vehicle is detected, the data related to the present position that is detected is compared with the data related to a road or an intersection, and, when the present position does not correspond to the road or to the intersection as a result of comparison, a new road or a new intersection corresponding to the present position is stored. Therefore, even a newly constructed road can be utilized to search a route provided data for the newly constructed road is learned and stored after having been traveled once.

Besides, the present position of the vehicle is detected, the data related to the present position that is detected is compared with the data related to a road or to an intersection, and the data of traffic through the road or the intersection and the data related to the travel date and hour is updated and stored based upon the result of comparison. The stored data related to the road or the intersection may be selectively deleted when provided predetermined conditions related to the "passing volume", date and hour of travel are not satisfied. The data related to a road or the intersection may be deleted when data for a new road or a new intersection is stored in the storage unit, when the vehicle has arrived at the destination, when the user has instructed the deletion, or when the storage unit has no more capacity. Therefore, the newly stored road or the intersection that is no longer necessary is determined to be deleted based upon predetermined conditions. Accordingly, only effective and important locus data is stored in the data storage unit; i.e., the data storage unit is effectively utilized to its maximum degree. As a result, the data storage unit stores only that locus data which is important and preferred by the user, so that the user can obtain an optimal guide route.

Furthermore, a position of the vehicle is detected with respect to a specified point. When the position of the vehicle that is detected is within a predetermined range from the specified point, the data related to the position of the vehicle that is detected is compared with the data related to a road or an intersection through which the vehicle will travel. It is then determined, relying upon this comparison, whether the position the vehicle corresponds to the road or to the intersection. Based upon the result of this determination, the position of the vehicle is stored as a new road or a new intersection.

Furthermore, the result of comparison is used for changing the data related to the frequency of passage through the road or the intersection, direction of travel and date and hour of travel. The specified point is a point specified by the operator or a point where the drive source of the vehicle is started or stopped.

Furthermore, the number of times of passage of the vehicle or the number of times of detecting the start or end of the drive source of the vehicle is stored for each specified point, and the size of the predetermined range based on the specified point is changed depending upon the number of times of detection. Therefore, the road near the specified point is preferentially stored. In searching a route from a point of departure of the vehicle or from near the present position of the vehicle to near the destination, furthermore, an intersection or a road of a large "passing volume" is preferentially used as a route based upon the data related to the frequency of passing through the intersection or the road.

Moreover, the data representing the present position of the vehicle is compared with the stored data related to the road or the intersection, and coordinate values of a geographical positions of the road or the intersection are corrected. The correction is effected depending upon the "passing volume" of the road or the intersection. Thus, the geographical positions of the roads or the intersections are correctly maintained, eliminating error in distinguishing between two adjacent roads or in distinguishing between the geographical positions of the intersections.

BRIEF DESCRIPTION OF THE DRAWINGS

FIG. 3 is a diagram illustrating a variety of kinds of data stored in a first RAM 5;

FIG. 4 is a diagram illustrating the structure of a road data file F4;

FIG. 5 is a diagram illustrating the structure of node data 55;

FIG. 6 is a diagram illustrating the structure of link data 60;

FIG. 7 is a diagram illustrating the structure of intersection data 65;

FIG. 8 is a diagram illustrating the structure of data of a point list PT;

FIG. 36 is a diagram illustrating a weighing function used in the routines for deleting locus data.

PRO(S).:PROCESSING(S), DIR.:DIRECTION, DIS (S). DISTANCE (S), DISS.:DISTANCES, CLA. CLASSIFICATION, POS. POSITION, No(s). NUMBER (S), ION. IDENTIFIED, IND.:INDIC:-tTF, INDD.:INDICATED, INDN.:INDICATION, INSC(S) .:INTERSECTIDN(S), INSCG.:INTERSECTING, PRED.:PREDETERMINED, PAR.:PARTICULAR, DES(S) .:DESTINATION, DET.:DETERMINE, DETG.:DETERMINING, DETD.:DETERMINED, DETN.:DETERMINATION, OVE.:OVERLAPPED, PER.:PERIPHERAL, DELG.:DELETING, DEL.:DELETE, DELD. DELETED.

DETAILED DESCRIPTION OF THE PREFERRED EMBODIMENTS

1. Summary of the Embodiments

The present position of a vehicle is detected after every expiration of a predetermined period or time, and a traveling direction of the vehicle is calculated based on the relative direction angle D$\theta$. When the angle of the traveling direction changes by a predetermined amount (step SB5) after the vehicle has traveled for a predetermined period of time (step SB1), the locus of travel of the vehicle is formed and is stored (steps SB11, SC19, SC21, SC5, SC23).

The total amount of the data newly stored is calculated (SK1), and when the amount of data newly input is larger than the free capacity of the memory (step SK3), evaluated values KCS of the link data are found (step SK13). The links having evaluated values KCS smaller than a threshold value ZZ are deleted (step SK15), and the node data related to the deleted links and the data or the intersection are deleted or corrected (steps SK17, SK19).

When at least one node of a stored link does not lie within a range RP from the center point PT of the limited region (step SQ3), the link data temporarily stored in the RAM is deleted (step SQ5), and the node data of the link is also deleted (step SQ7). When the deleted node is at an intersection, the data for the intersection is corrected (SQ9).

When the position of the link stored in the RAM lies within a predetermined range and is permitted to be stored (step SQ3), a deviation $\Delta$L is found (step SQ11) between the new coordinate positions where the nodes are detected at both ends of the link and the coordinate values of the locus data that have previously been stored. Due to this deviation $\Delta$L, the geographical coordinate values of the node of the locus data are corrected (step SQ15).

2. Overall Construction

Figure 1:
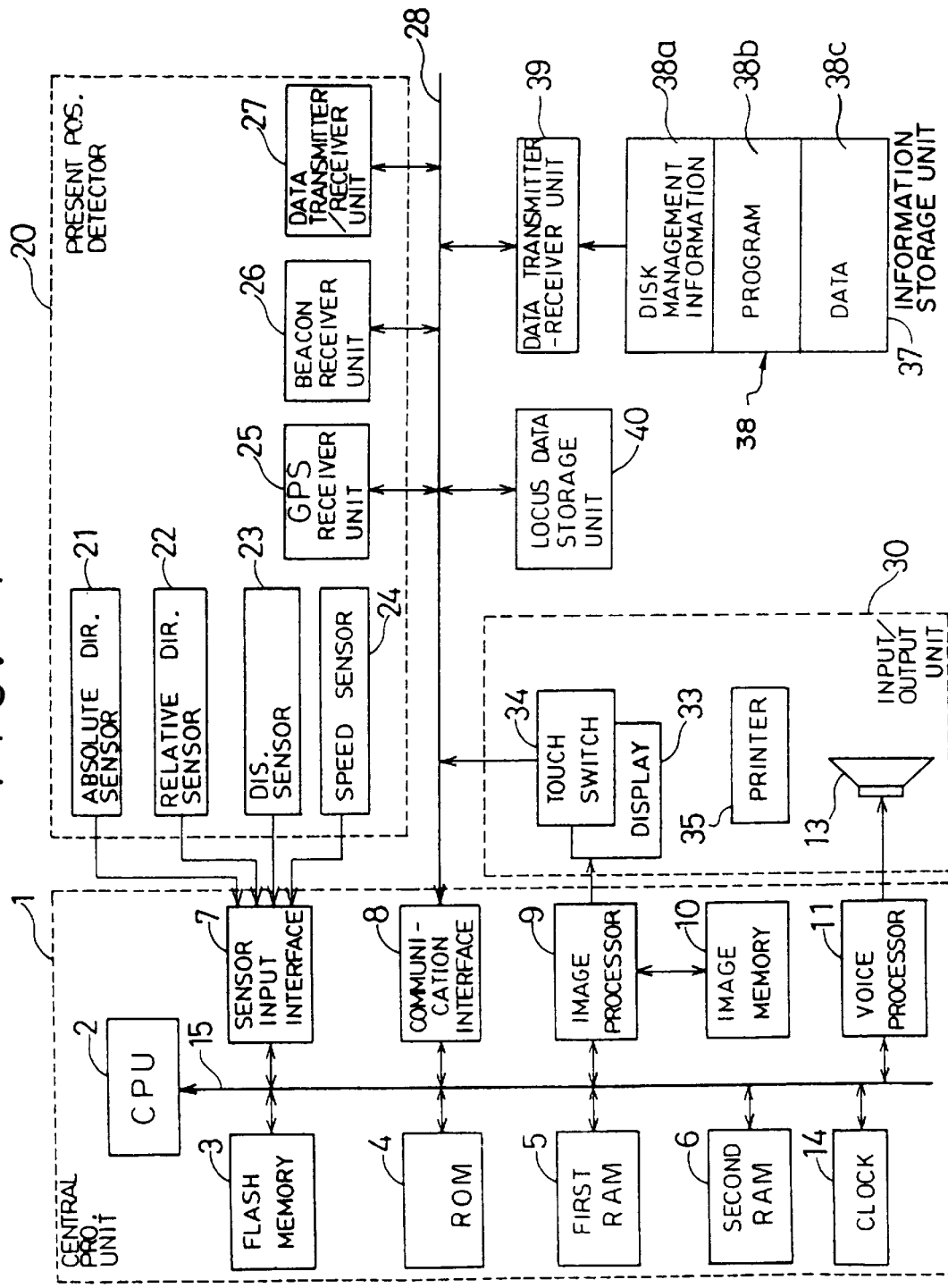
FIG. 1 is a diagram illustrating the overall structure of a preferred embodiment of the navigation device of the present invention.

FIG. 1 illustrates the navigation device. A central processor 1 controls the operation of the whole navigation device.

The central processor 1 is provided with a CPU 2, a flash memory 3, a ROM 4, a first RAM 5, a second RAM 6, a sensor input interface 7, a communication interface 8, an image processor 9, an image memory 10, a voice processor 11 and a clock 14. The CPU 2 and the devices through up to the clock 14 are connected together through a CPU local bus 15, and data is exchanged among these devices.

The flash memory 3 stores a variety of processing programs corresponding to all flowcharts described later, executed by the CPU 2, and a variety of parameters required for executing the programs. These programs 38b are, for example, for displaying control for information or guide control by voice, and these programs 38b are installed and copied from the information storage medium 37.

The programs stored in the flash memory 3 are to control the display of data, to control voice guidance, etc. The first RAM 5 stores figure data to be displayed and various general-purpose data. The figure data to be displayed are used for route guidance and maps shown on the display 33. The general-purpose data include voice waveforms recording synthetic or human voice for voice guidance, and are used for the navigation operation.

The ROM 4 stores data input from external units, a variety of parameters used for the arithmetic operation, the operation results and programs for navigation. The clock 14 comprises a counter, a battery backed-up RAM or EPROM, etc., and outputs time data.

The sensor input interface 7 comprises an A/C converter circuit or a buffer circuit. The sensor input interface 7 receives analog or digital sensor data from the sensors 21 to 24 of a present position detector 20. The present position detector 20 includes an absolute direction sensor 21, a relative direction sensor 22, a distance sensor 23 and a vehicle speed sensor 24. The absolute direction sensor 21 is, for example, a terrestrial magnetism sensor and detects terrestrial magnetism. The absolute direction sensor 21 outputs data indicating a south-and-north direction which serves as the absolute direction.

The relative direction sensor 22 is, for example, a steering angle sensor and detects the steering angle of the wheel based upon a gyroscope such as optical fiber gyroscope or piezo-electric vibration gyroscope. The relative direction sensor 22 outputs a relative angle of a direction of progress of the car with respect to the absolute direction detected by the absolute direction sensor 21. The distance sensor 23 comprises a counter or the like interlocked to, for example, an odometer. The distance sensor 23 outputs data indicating distance travelled by the car. The vehicle speed sensor 24 comprises a counter or the like connected to a speedometer. The vehicle speed sensor 24 outputs data that varies in proportion to the running speed of the car.

An I/O data bus 28 is connected to the communication interface 8 of the central processor 1. To the I/O data bus 28 are connected the GPS receiver unit 25, beacon receiver unit 26 and data transmitter/receiver unit 27 of the present position detector 20.

To the I/O data bus 28 are further connected a touch switch 34 and a printer 35 of the input/output unit 30, and a data storage unit 38. That is, a variety of data are exchanged between the external accessory equipment and the CPU local bus 15 through the communication interface 8.

The present position detector 20 outputs data for the detected present position of the car. In other words, the absolute direction sensor 21 detects the absolute direction. The relative direction sensor 22 detects the relative direction with respect to the absolute direction. Furthermore, the distance sensor 23 detects the distance travelled. The vehicle speed sensor 24 detects the running speed of the car. The GPS receiver unit 25 receives GPS (Global Positioning System) signals to detect position data such as longitude and latitude of the car. The GPS signals are microwaves transmitted from a plurality of satellites orbiting around the earth.

Similarly, the beacon receiver unit 26 receives beacon signals from a data providing system such as VICS (Vehicle Information and Communication System) or the like, and the received data and the corrected data of GPS are output to the I/O data bus 28. The data transmitter/receiver unit 27 exchanges a variety of information related to the present position or the road conditions near the car relative to the bi-directional present position information offering system or the ATIS (advanced traffic information service), etc., by utilizing a cellular phone, FM multiplex signals or a telephone circuit. These items of information are used as detecting information for the car position or support information of movement. The beacon receiver unit 26 and the data transmitter/receiver unit 27 may be omitted.

The input/output device 30 comprises a display 33, a transparent touch panel 34, a printer 35 and a speaker 13. The display 33 displays guide data during the navigation operation. The touch panel 34 is constituted by a plurality of transparent touch switches that are arranged in the form of a planar matrix, and is adhered onto the screen of the display 33. By using the touch panel 34, data necessary for setting the destination, such as start point, destination, passing points, drop-in places, etc. are input to the navigation device. A printer 35 is used for printing a variety of data such as map data and guidance to facilities output through the communication interface 8. Information of various kinds is transmitted by voice to the user from the speaker 13. The printer 35 may be omitted.

The display 33 may be a CRT, a liquid crystal display or a plasma display, and displays a picture. Desirably, however, a liquid crystal display is preferred as a display 33 because it consumes small amounts of electric power, it can be seen very clearly, and is light in weight. An image memory 10 such as DRAM (dynamic RAM) or dual port DRAM is connected to the image processor 9 that is connected to the display 33. The picture data are written into the image memory 10 by the image processor 9. Being controlled by the image processor 9, furthermore, the data are read out from the image memory 10 and are displayed on the display 33.

In accordance with a drawing command from the CPU 2, the image processor 9 converts map data and character data into picture data for display and writes them into the image memory 10. At this moment, the peripheral image on the screen is also formed and is written into the image memory 10. Therefore, the peripheral image can be readily displayed, too, upon scrolling.

A voice processor 11 is connected to the speaker 13. The voice processor 11 is connected to the CPU 2 and to the first RAM 5 through the CPU local bus 15. The voice waveform data for voice guidance read out from the first RAM 5 by the CPU 2 are input to the voice processor 11. The voice waveform data are converted into analog signals by the voice processor 11, and are output from the speaker 13. The voice processor 11 and the image processor 9 comprise general-purpose DSPs (digital signal processors) or the like.

The information storage unit 38 connected to the I/O data bus 28 contains the information storage medium 37 in which are stored, in a nonvolatile manner, disk management information 38a programs 38b and data 38c such as road map data necessary for the navigation operation. The disk management information 38a is related data or programs stored in the information storage medium 37, for example version information for the programs 38b. The information storage unit 38 is provided with a data transmitter/receiver 39 for reading data written into the information storage medium 37 and outputting the read data through the I/O data bus 28.

The information storage medium 37 may be an optical memory (CD-ROM, etc.), a semiconductor memory (IC memory, card, etc.), or a magnetic memory (opto-magnetic disk, hard disk, floppy disk, etc.). The data transmitter/receiver 39 is equipped with a data pickup adapted to allow change of the data recording medium. When, for example, the recording medium is a hard disk, a core head is provided.

Figure 2:
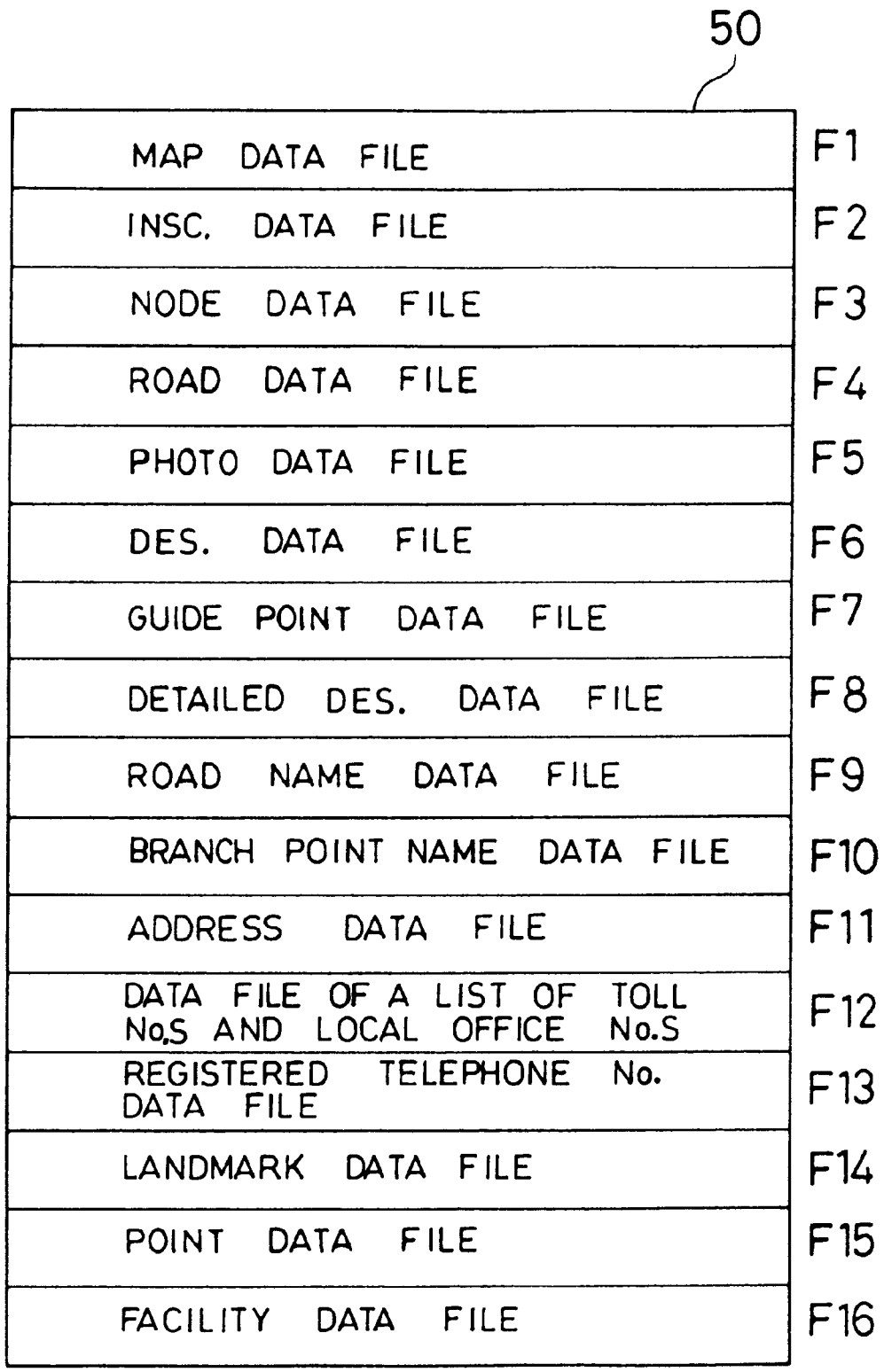
FIG. 2 is a diagram illustrating the structure of data stored in a data region 38c of a data storage unit 37.

FIG. 2 is a diagram illustrating the contents stored in the information storage medium 37. The information storage medium 37 stores disk management data. The stored data include those data items related to programs, such as version data of the programs.

In the information storage medium 37 are stored navigation processing programs and programs related to other processings executed by the CPU 2, depending upon the flow chart that will be described later, as the programs 38b. These programs 38b are read out from the information storage medium 37 (external storage means/unit), and are written into the flash memory 3 (internal storage means/medium) and are stored therein (installed, transferred/copied).

The installation (transfer/copy) is automatically executed when the information storage medium 37 is installed in the navigation device, or is automatically executed when the power source circuit of the navigation device is closed, or is executed according to an operation by the operator. The information storage medium 37 can be replaced by another information storage medium 37. Thus, the program is replaced by a new one or by the latest one. By this replacement, the latest navigation system may be used.

The information storage medium 37 stores map data, intersection data, node data, road data, photographic data, destination data, guide point data, detailed destination data, destination read data, house shape data, as well as other data and programs that are necessary for the navigation operation as the data 38c. In accordance with these programs, the navigation operation is executed by using the road map data stored in the information storage medium 37. The program for navigation is read by the data transmitter/receiver 39 from the information storage medium 37, and is installed, copied and written into the flash memory 3 or the ROM 4. Other data include indication guide data, voice guidance data, picture data showing a simple guide route, etc.

The information storage medium 37 stores map data of a plurality of reduced scales. The information storage medium 37, however, may store map data of the largest scale. When the map of a large scale is to be shown on the display 33, the map data stored in the information storage medium 37 is shown on a reduced scale. In this case, not only the lengths of the roads, etc. are shortened but also signs and data representing buildings and facilities are reduced.

The locus data storage unit 40 is connected to an I/O data bus 28. In the storage unit 40 are stored locus data that are formed by a program in compliance with a flow chart that will be described later. The data stored in the locus data storage unit 40 can be rewritten. Even when the electric power supplied to the storage unit 40 is interrupted, the data stored therein is not erased. The locus data storage unit 40 may comprise, for example, an IC memory card, a hard disk, a rewritable optical disk or a nonvolatile memory such as EPROM.

The locus data include node data 55, link data 60 and intersection data 65 of the roads and intersections along which the vehicle has traveled, and the roads along which the vehicle has traveled are shown on the map. The navigation device searches a new route by utilizing the locus data.

3. Data File in a Data Region 38c of the Data Storage Unit 37

FIG. 2 is a diagram illustrating the contents of data files stored in the data region 38c of the data storage unit 37. A map data file F1 stores the map data such as road maps of the whole of the country, road maps of a district, and house maps. An intersection data file F2 stores the coordinates of geographical positions of the intersections and data related to the intersections. A node data file F3 stores geographical coordinate data of the nodes utilized for searching a route on the map. A road data file F4 stores data related to the positions and kinds of the roads, number of the lanes, connections among the roads, etc. A photographic data file F5 stores photographic image data of places where visual display is required such as various facilities, sightseeing spots, major intersections, etc.

A destination data file F6 stores data related to the positions and names of various facilities that may be destinations. The facilities may be sightseeing spots, buildings, sites, companies and offices listed in a telephone book. A guide point data file F7 stores guide data of points that require guidance. The points may be the contents of information boards and branch points. A detailed destination data file F8 stores detailed data related to destinations stored in the destination data file F6. A road name data file F9 stores name data of principal roads among the roads stored in the road data file F4. A branch point name data file F10 stores name data of principal branch points. An address data file F11 stores list data for identifying, from the addresses, the destinations stored in the destination data file F6.

A file F12 contains list data of toll numbers and local office numbers for only the destinations stored in the destination data file F6. A registered telephone number file F13 stores telephone number data of clients input by the user. A landmark data file F14 stores data related to positions and names of points that serve as landmarks while driving and of the places that should be remembered input by the user. The point data file F15 stores detailed data of landmark points stored in the landmark data file F14. A facility data file F16 stores data related to positions and descriptions of destinations such as gas stations, drug stores, parking lots and positions of objective places where the driver may wish to drop in, in addition to the destinations.

4. Contents of Data in the First RAM 5

FIG. 3 illustrates some of a group of data items stored in the first RAM 5. The present position data MP represent the present position of the vehicle as detected by a present position detector 20. The absolute direction data ZD represents the south-north direction, relying upon the terrestrial magnetism, and is based upon the data from an absolute direction sensor 21. The relative direction angle data Dθ represent an angle of the direction in which the vehicle is traveling with respect to the absolute position data ZD and is based upon the data from a relative direction sensor 22.

The traveled distance data ML represent a distance traveled by the vehicle and is based on the data from a distance sensor 23. The present position data PI is related to the present position and is input from a beacon receiver 26 or a data transmitter-receiver 27. The VICS data VD and ATIS data AD are input from the beacon receiver 26 or the data transmitter-receiver 27. The VICS data VD are used for correcting an error in the position of the vehicle detected by a GPS receiver 25. The ATIS data AD are used for determining traffic regulations and traffic jams in the area. When the map data is exchanged between the navigation device and the area monitoring center, relying upon the VICS data VD or the ATIS data AD, the guide route may be identified by using such data.

The inputted destination data TP is related to the coordinate positions and names of the destinations and is input by the user. The start point of route data SP is map coordinate data of a point from where the navigation operation starts. The end point of route data ED is map coordinate data of a point where the navigation operation ends.

The start point of route data SP utilizes node coordinates on a guide route closest to the present position of the vehicle or to the point of departure. This is because the present position of the vehicle may be on a site such as golf course or parking lot, and not necessarily on the guide route. Similarly, the end point of route data ED utilizes node coordinates on a guide route closest to the inputted destination data TP. This is because the coordinates of the inputted destination data TP often may not be on the guide route.

The guide route data MW stored in the first RAM 5 represent an optimum route or a recommended route up to the destination, and are found by a processing for searching a route that will be described later. Specific road numbers are attached to the individual roads in the road map stored in the data region 38c of the data storage unit 37. The guide route data MW are constituted by the road numbers or by the link numbers, that will be described later, of from the start point of route data SP to the end point of route data ED.

The position data PQ1, PQ2 represent coordinate data of a geographical position of the vehicle and absolute time of when the position of the vehicle is detected, that are used in the programs (flow charts) that will be described later. The angle change data RZ represents an absolute value of an increment or a decrement of the relative direction angle data Dθ. The start point cost VA, end point cost VB, link travel cost VL and intersection travel cost VC are general-purpose data temporarily stored for searching peripheral links that will be described later. Here, the cost represents the time or labor at or with which the vehicle passes through the links or the intersections in the stored locus data, and includes a weighting value that indicates the frequency of use. The cost decreases with an increase in the frequency of passage. The links or the intersections are selected depending upon the cost values to constitute a guide route.

The locus routes KT(S), KR(P) and KU(H) represent a course of the guide routes, and are constituted by a plurality of link numbers. The route distances KTL(S), KRL(S) and KUL(S) represent distances of the locus routes KT(S), KR(P) and KU(H). The calculation register UW temporarily stores the results of calculation of the route distances. The evaluated value KCS(GM) is a value for selecting locus data that will be deleted in a routine for deleting locus data that will be described later. The word "locus" includes mark or impression etc. in this specification.

5. Road Data

FIG. 4 is a diagram illustrating some of road data in the road data file F4 stored in the data storage unit 37. The road data file F4 includes data related to all roads wider than a predetermined width for the whole of areas stored in the map data file. When the number of roads contained in the road data file F4 is n, the road data related to the roads of a number n are stored in the data storage unit 37. Each road data entry is constituted by road number data, object-of-guidance flag, road attribute data, shape data, guide data and length data.

The road number data are discrimination numbers attached to all roads contained in the map data, the roads being sectionalized by the branch points. The object-of-guidance flag becomes "1" in the case of a guide road and becomes "0" in the case of a non-guide road. A guide road is one wider than a predetermined width, such as a main trunk road or a general road, and may be selected in searching a route. A non-guide road is a road narrower than a predetermined width, such as footpath or lane, and is seldom selected in searching a route.

The road attribute data represents attributes of a road such as elevated road, underpass, speedway or toll road. The shape data represents the shape of a road and are constituted by coordinate data of start points and end points of the roads, and of the nodes between the start point and the end point.

The guide data are constituted by intersection name data, caution point data, road name data, road name voice data and connection data. When the end point of a road is an intersection, the intersection name data represent the name of the intersection. The caution point data represent caution points on the road such as a railway crossing, inlet of a tunnel, exit of the tunnel, point where the width of the road decreases, etc. The road name voice data are voice data of road names, and are used for guidance by voice.

The connection data represent a road that connects to the end point of the above-mentioned road, and is constituted by a number k of connections and data for the connections. The data for each connection are constituted by connection road number data, connection name data, connection name voice data, connection direction data and travel guide data.

The connection road number data represent a road number of a connection. The connection name data represent a name of a road that is connected. The connection name voice data includes voice data for guiding the name of connection by voice. The connection direction data represent the direction in which the road of connection is headed. The travel guide data include guide data for guiding the driver to enter into the right lane or into the left lane on the road to proceed to a road that is connected, or to travel on the center lane. The length data represent a length from the start point to the end point of a road, lengths from the start point to the nodes, and lengths among the nodes.

6. Node Data

Figure 32:
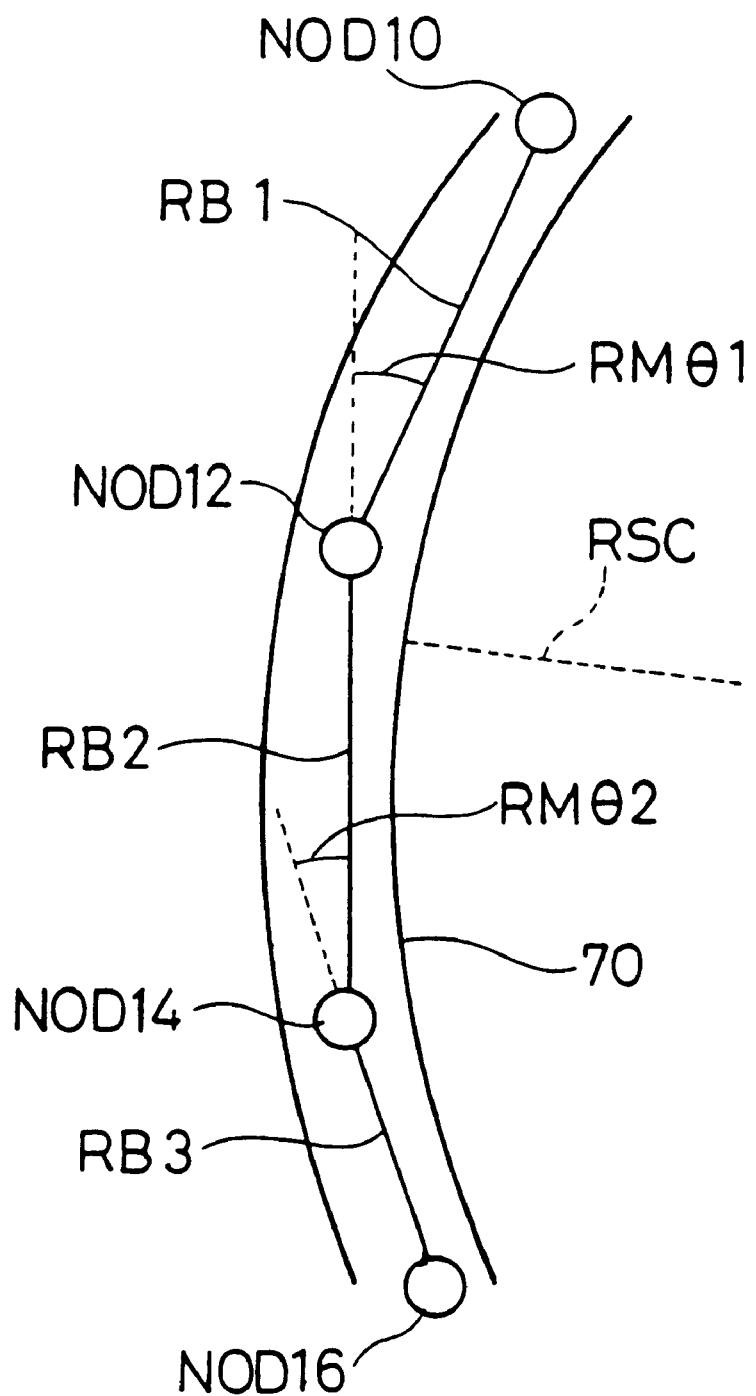
FIG. 32 is a diagram illustrating approximation of a curved road 70 by the links RB.

FIG. 5 is a diagram illustrating node data 55 stored in the locus data storage unit 40. The node data 55 have the same constitution as the shape data of the road data file F4, and represent junction points by approximating the roads on a map by straight lines, the junction points being successively formed on the roads traveled by the vehicle. FIG. 32 illustrates a relationship among the nodes, straight links connecting the nodes and a practical road on a map.

The road 70 shown in FIG. 32 is curved having a radius of curvature RSC. The road 70 is approximated by a plurality of straight lines connected by nodes. The straight lines are links RB1, RB2, - - - , and the connection points among the links are nodes NOD12, NOD14, - - - . Therefore, the practical road 70 shown in FIG. 32 is expressed by locus data, i.e., links RB1, RB2, RB3, - - - . The links RB1, RB2, RB3, - - - are connected together by the nodes NOD12, NOD14, The data related to the nodes are collected in the node data 55 stored in the locus data storage unit 40, and the number nn of nodes represent the number of nodes of the node data 55. The node data 55 are constituted by a node number NB, east longitude coordinates NPE, north latitude coordinates NPN and an intersection number NPB. The node number NB distinguishes the node. The east longitude coordinates NPE and the north latitude coordinates NPN represent geographical coordinates of the node. The coordinate values of the node data are used together with the map stored in the data storage unit 37 at the time when the roads are displayed on the screen.

The links of the roads are connected by the nodes. Therefore, if the coordinate positions of the nodes are specified, the roads can be approximated by the links on the map. The intersection numbers NPB are the same as the intersection numbers NPB (see FIG. 7) in the intersection data 65 that will be described later. Therefore, when the node is not at an intersection, the intersection number NPB is "0" indicating that there is no intersection number. When the intersection number NPB is other than "0", on the other hand, it means that the node is at an intersection where three or more links are connected together.

When the practical road 70 is approximated by a plurality of straight lines, the lengths of the links are determined as described below. Presuming that the vehicle is traveling along the road 70, when a change in the angle of direction of travel of the vehicle becomes greater than a predetermined value, a new node and a new link are formed. That is, the node NOD12 is so formed that an angle RMθ1 subtended by the two neighboring links RB1 and RB2 remains the same at all times. Therefore, the angle RMθ2 between the link RB2 and the link RB3 is the same as the angle RMθ1. When a curved road is represented by a plurality of links as described above, the links and the nodes are so formed that the angle subtended by the neighboring links remains the same at all times. The links may have the same length at all times. In this case, a curved road is approximated by using a plurality of links having the same length.

7. Link Data

FIG. 6 is a diagram illustrating link data 60 stored in the locus data storage unit 40. The link data 60 are constituted by a link number RB, a start point node number SNB, an end point node number ENB, number of times SEK of travel in the start point→end point direction, number of times ESK of travel in the end point→start point direction, number of times YT of input by the user, length LR of link, average vehicle speed AS, data SND of traveled date and hour, road discrimination data LD, road number MB in the map data, start position MSP, and end position MEP on the road in the map data.

The link number NL represents the number of links stored in the locus data storage unit 40. The link number RB distinguishes the links from each other. The start point node number SNB is a node number connected to an end of the link, i.e., a node number NB of node data 55. Based on the node number NB, the east longitude coordinate NPE, north latitude coordinate NPN and intersection number NPB are read.

The end point node number ENB is a node number NB of node data 55 connected to the other end of the link. There is no particular limitation concerning which one of the nodes at both ends of the link is the start point or the end point. Therefore, either one of the ends of the link may be determined to be a start point node and the other end may be determined to be an end point node.

The number of times SEK of travel from the start point to end point direction is indicated by the cumulative number of times the vehicle has traveled the link from the above-mentioned conveniently determined start point node number SNB to the end point node number ENB. Similarly, the number of times ESK of travel from the end point to start point direction is indicated by the cumulative number of times the vehicle has traveled the link from the end point node number ENB to the start point node number SNB. The number of times YT of input by the user is a cumulative number of times the link is used as a guide route to the destination. Based upon the number of times YT of input, a particular link is preferentially identified in the process of searching a route that will be described later. The length LR of the link represents a geographical length of the link, i.e., represents the distance of the link.

The average vehicle speed AS represents an average speed of the vehicle in traveling the link, and is calculated based upon the data from the vehicle speed sensor 24. When the vehicle has travelled the link a plural number of times, the average vehicle speed AS is an average of the plural number of times. The average vehicle speed AS is found by dividing the distance of the link by the time required for passing through the link. The data SND of traveled date and hour are related to all dates and hours the vehicle has traveled the link.

The road discrimination data LD represent the kind of road of the link that is formed and are detected from the road data file F4 based on the road number MB that will be described later. The kind of road data includes data for distinguishing between roads used as a guide route, roads (narrow roads) that are not used as a guide route, and roads that have not been stored. The roads that have not been stored are those that have not been stored in the data storage unit 37, and may include a road that is newly constructed, a road that is expanded and the like roads.

The road number MB in the map data is specific to a road stored in the data storage unit 37. Based upon the road number MB, it is determined whether or not the road including the link has been stored in the data storage unit 37.

The start position MSP represents a geographical position of the start point node of the link that corresponds to a start point coordinate of road data specified by the road number MB. Similarly, the end position MEP represents a geographical position of the end point node of the link that corresponds to an end point coordinate of road data specified by the road number MB. The start position MSP and the end position MEP are related to, for example, geographic distances.

Figure 33:
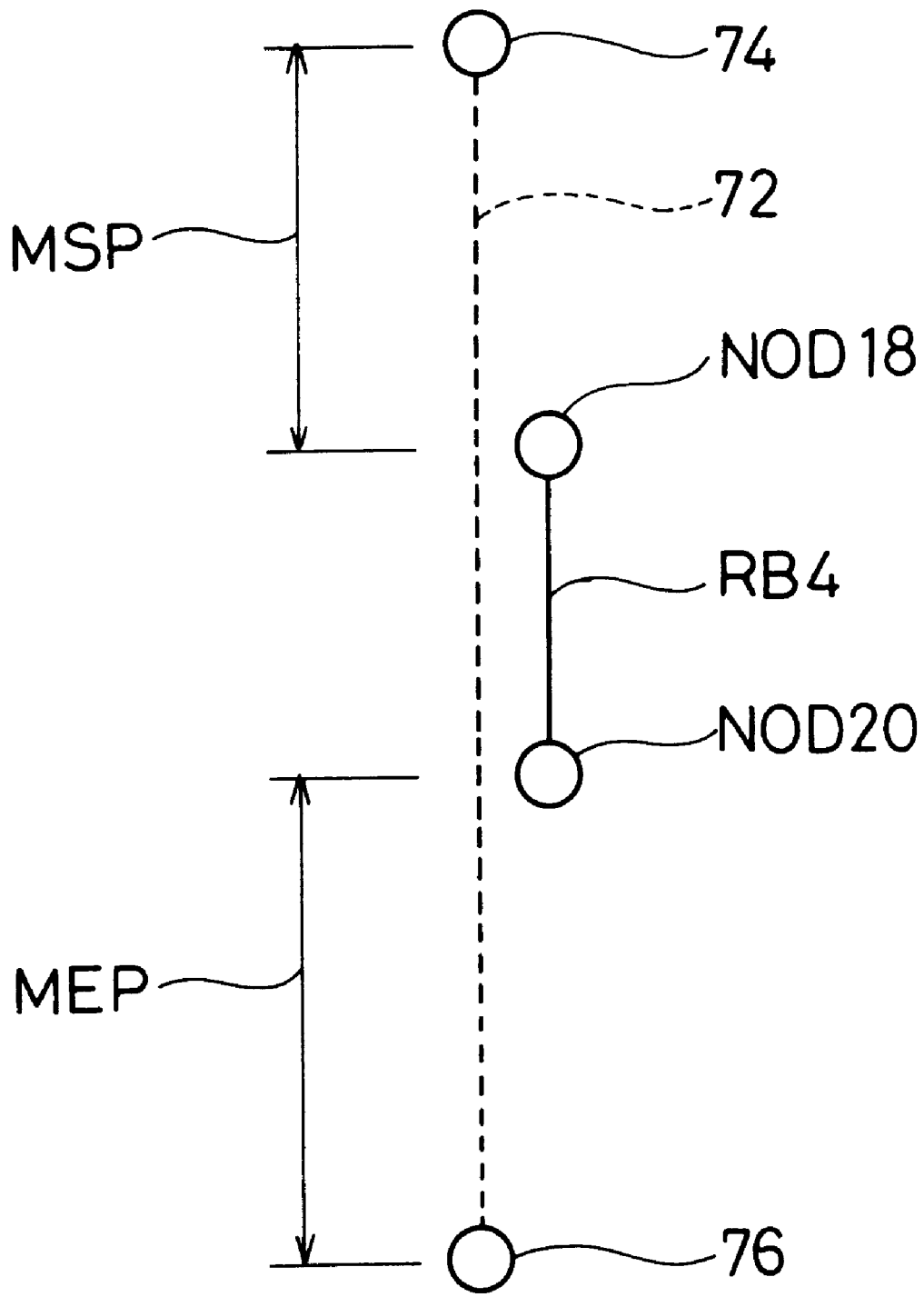
FIG. 33 is a diagram illustrating a relative positional relationship between a road stored in the data storage unit 37 and the links stored in a locus data storage unit 40.

FIG. 33 illustrates a relationship between the start position MSP and the end position MEP. The road 72 shown in FIG. 33 represents a road stored in the data storage unit 37. Part of the road 72 corresponds to the link RB4. A distance between the start point node NOD 18 and the start point 74 of the road 72 is a start position MSP. A distance between the end point node NOD 20 and the end point 76 of the road 72 is an end position MEP. Relying upon the start position MSP and the end position MEP, a relative position of the link on the road of the road number MB is determined.

8. Intersection Data

FIG. 7 is a diagram illustrating the structure of intersection data 65 stored in the locus data storage unit 40. The number nc of intersections represents the number of intersections stored in the locus data storage unit 40. Specific intersection numbers NPB are attached to the intersections. The intersection numbers NPB are in agreement with the intersection numbers NPB of node data 55. The intersection data 65 represents road data or link data that branch or join together in the node data 55.

The intersection data are constituted by the combination of link numbers IRB of the links entering the intersection and link numbers ORB of the links leaving to other nodes. This clarifies a relationship between a link entering the intersection and a link exiting the intersection when the vehicle has entered the intersection through the entering link.

Figure 34:
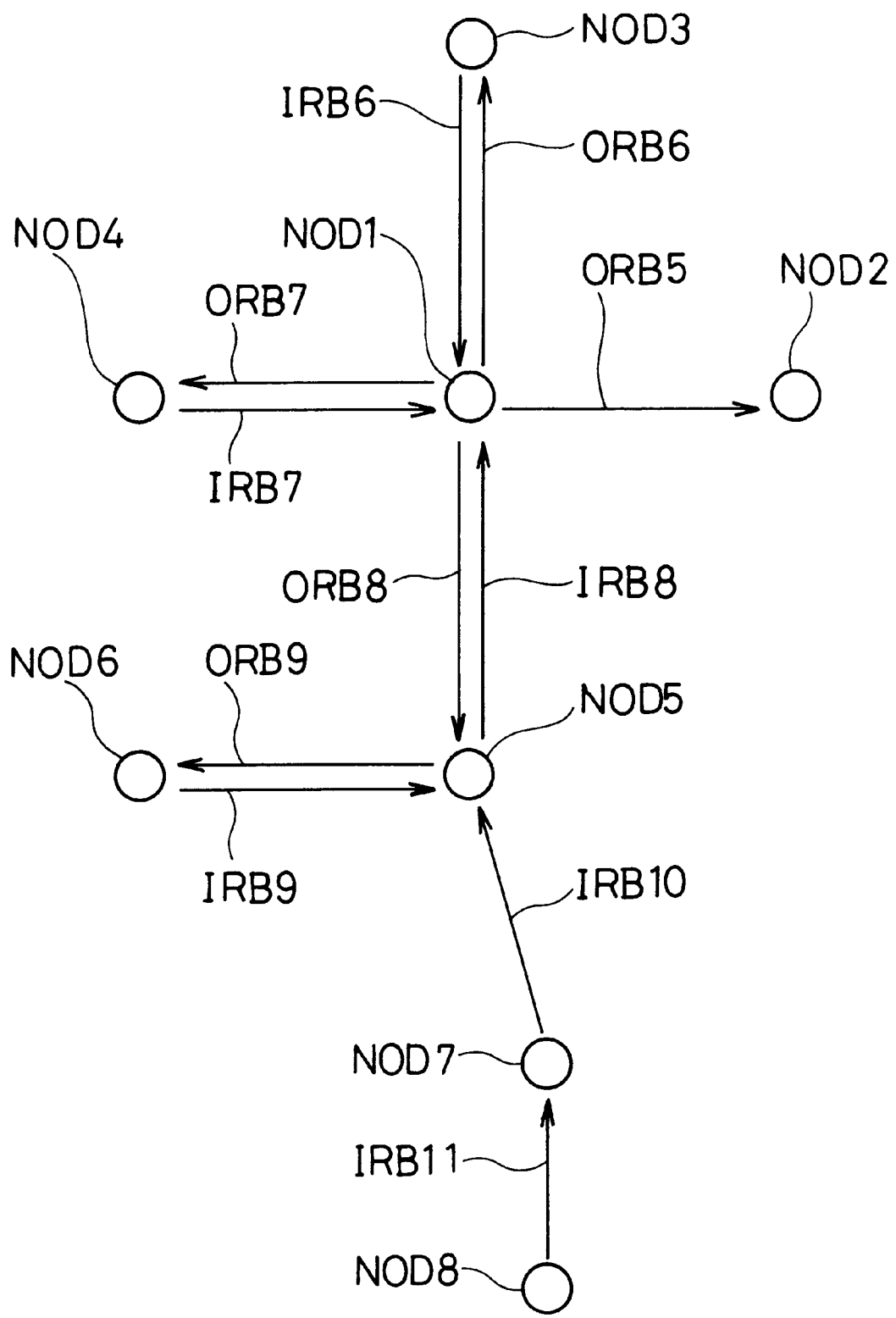
FIG. 34 is a diagram illustrating the connections of the links and the nodes.

FIG. 34 illustrates a relationship between the links and the nodes. A node NOD1 shown in FIG. 34 is an intersection, and the links IRB6, IRB7 and IRB8 enter the intersection. It is now presumed that the vehicle enters the intersection node NOD1 from the entering link IRB8, and there are only the exit links ORB6 and ORB7 through which the vehicle is allowed to leave through the intersection node NOD1. In this case, the number of exit links NOUT="2" is stored in the intersection data 65. Therefore, the vehicle entering the intersection node NOD1 from the entering link IRB8 is not allowed to turn to the right.

Thus, the exit link numbers through which the vehicle entering from the entering links is allowed to leave, are stored for each of the intersections. The number NIM of entering links in the intersection data 65 represents the number of links through which the vehicle is allowed to enter the intersection. The number NIM of links entering the intersection node NOD1 shown in FIG. 34 is "3". The number NOUT of exit links represents the number of links through which the vehicle entering through a link is allowed to leave.

The exit link number ORB represents a link number through which the vehicle entering the intersection node from an entering link IRB is allowed to leave. The number NVC of times of travel from an entering link to an exit link is a cumulative number of times of travel from a certain entering link IRB to any leaving link ORB. For example, the cumulative number of times of travel from the entering link IRB8 to an exit link ORB8 of FIG. 34 is the number NVC of times of travel. An average time TSU for passing is an average time consumed in passing through the intersection NOD1 of the vehicle that runs from, for example, the entering link IRB8 into the exit link ORB7.

The average time TSU for passing is found as described below. The relative direction angle data Dθ1 is found when the vehicle is traveling through the entering link IRB8. The relative direction angle data Dθ2 is similarly found when the vehicle is traveling through the leaving link ORB7. As the vehicle passes through the intersection node NOD1, the relative direction sensor 22 successively monitors the change in the relative direction angle Dθ. Then, the time required by the relative direction angle Dθ to change from the relative direction angle Dθ1 to the relative direction angle Dθ2 is measured. The time required for changing the relative direction angle Dθ is the time required by the vehicle to pass from the entering link IRB8 to the exit link ORB7 through the intersection node NOD1.

The time required for passing through the intersection node NOD1 is measured for every passage (trip) through the intersection node NOD1. The total average inclusive of the previous times for passage is continuously updated, and is stored as the average time TSU for passing. The traveled date-and-hour data includes all dates and hours of passing from the entering link to the leaving link.

The average time TSU for passing may be found as described below. For example, the times for traveling through the links are subtracted from the whole time required for the vehicle to run from the start point node NOD5 of the entering link IRB8 to the end point node NOD4 of the leaving link ORB7. The times for traveling through the links are measured at the time of calculating the average vehicle speed AS.

As described above, the intersection data 65 includes a combination of the link numbers IRB entering the intersection and the exit link numbers ORB from the entering links through the intersection node. Therefore, a reference to the intersection data 65 makes it possible to determine the directions for entering the intersection node and the directions for leaving therefrom. This information (data) is used in searching for peripheral links described later.

9. Point List PT

FIG. 8 is a diagram illustrating the structure of a point list 66 stored in the first RAM 5 or in the locus data storage unit 40. The point list 66 is used in a routine for deleting locus data that will be described later, and is constituted by a plurality of points PT. Each point PT represents a geographical position where an ignition key of the vehicle is turned on/off or a geographical position input by the user. The point PT has a point number 67 and is constituted by a range of storage RP, the east longitude coordinate PTE, the north latitude coordinate PTN and the number of times HTP of recognizing the position. Examples of the point PT include a parking lot near the company, garage of the user's home, the user's favorite shops, etc.

The range of storage RP is used in a routine for confirming the storage of locus data (step SA21) that will be described later. More specifically, the range of storage RP is a threshold value of distance between any geographical position and a point PT, and is used for determining the distance. The east longitude coordinate PTE and the north latitude coordinate PTN represent a relative position of the point PT on the map shown on the display 33. The number of times HTP of recognizing the position represents the number of times the ignition key is turned on/off or is input at each point PT.

10. Overall Processing

Figure 9:
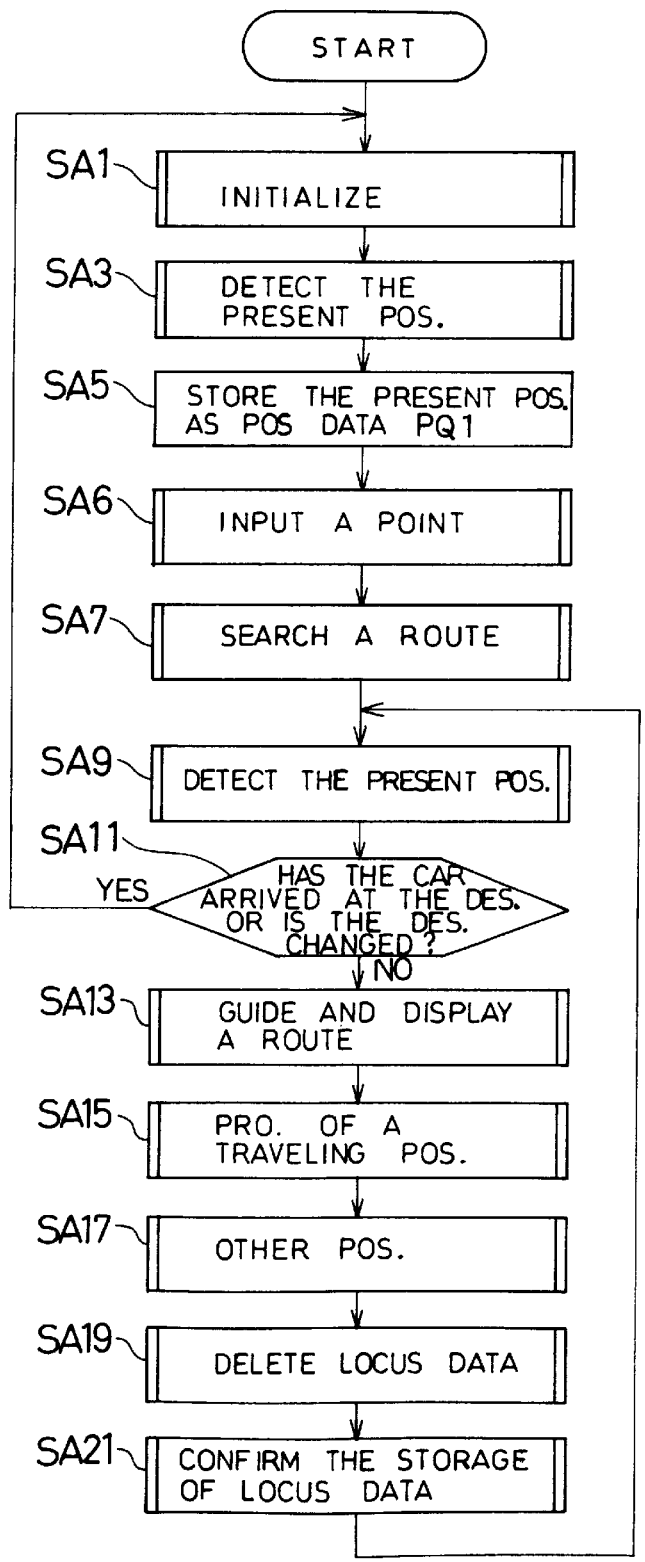
FIG. 9 is a flow chart illustrating a main routine.

FIG. 9 is a flow chart of the main routine executed by a CPU 2 in use of the navigation device according to the present invention. The processing starts upon closing the power source circuit and ends upon breaking the power source circuit. The power source is turned on or off as the power source of the navigation device is turned on or off, or as the engine start key (ignition switch) of the vehicle is turned on or off.

First, initialization is executed (step SA1). In initializing, a program for navigation is read out from the data region 38c of the data storage unit 37, copied into a flash memory 3, and is executed. The CPU 2 clears the general-purpose storage areas in the RAMs, such as work memory of a first RAM 5 and an image memory 10.

Then, detection of the present position (step SA3) and the subsequent steps are executed. In detecting the present position (step SA3) the detector 20 detects the geographical coordinates (latitude, longitude, altitude, etc.) of an overland moving body, i.e., of a vehicle mounting the navigation device. That is, a GPS receiver 25 receives signals from a plurality of satellites orbiting around the earth, detects coordinate positions of the satellites, times at which the electromagnetic waves are emitted from the satellites and the time at which the electromagnetic waves are received by the GPS receiver 25, and calculates the distances to the satellites. The coordinate position of the vehicle is calculated from the distances to the satellites, to detect the present position of the vehicle. The thus found geographical coordinate data of the vehicle is stored in the first RAM 5 as present position data MP. The present position data MP is often corrected by the data input through a beacon receiver 26 or a data transmitter-receiver 27.

In detecting the present position (step SA3), furthermore, the absolute direction data ZD, relative direction angle data D$\theta$ and the traveled distance data ML are simultaneously found by using an absolute direction sensor 21, a relative direction sensor 22 and a distance sensor 23. The absolute direction data ZD, relative direction angle D$\theta$ and traveled distance data ML are utilized to determine the position of the vehicle. The thus determined position of the vehicle is collated with map data stored in a data region 38c of a data storage unit 37, and the present position on the map screen is corrected and is indicated more correctly. Therefore, the present position of the vehicle is correctly indicated even when the GPS signals are not received such as when traveling through a tunnel.

The data representing the present position obtained by the processing of the present position at the step SA3 is stored in the first RAM 5 as position data PQ1 (step SA5). The position data PQ1 include time data; i.e., the position data of the vehicle and the time data are stored in relationship to each other. Then, point input processing is executed (step SA6), and it is determined whether or not the present position of the vehicle corresponds to a point PT in the point list 66.

Thereafter, a route search routine is executed (step SA7) to set a destination (step SF1 in FIG. 15) and to search the links to form a route (step SF9). In setting the destination, the geographical coordinates of the destination desired by the user are stored as inputted destination data TP. For example, a coordinate position is specified by the user on a road map or on a house map shown on a display 33. The destination is selected by operator from a list of destinations shown on the display 33. Thereafter, a central processing unit 1 stores the data related to the geographical coordinates of the destination in the first RAM 5 as inputted destination data TP.

In the route search processing, furthermore, an optimum route is identified from the start point of guide route SP to the end point of guide route ED. The optimum route referred to here is the one by which the user can arrive at the destination within the shortest period of time or traveling the shortest distance, or is the one which includes the roads that were preferentially used by the user in the past. The optimum route may be the one which uses speedways enabling the user to arrive at the destination within the shortest period of time or traveling the shortest distance, or is the one which preferentially uses wide roads such as national highways. The routine for searching a route (step SA7) will be described later.

Thereafter, the present position of the vehicle is detected again by a present position detector 20 (step SA9). It is then determined at the step SA7 whether the vehicle has arrived at the destination of the route that is identified from the present position (step SA11). The present position routine (step SA15) is executed based upon the amount of displacement between the position of the vehicle detected at the step SA3 and the latest position of the vehicle detected at the step SA9. In the processing of a traveling position, a relative direction angle of the vehicle is measured by the relative direction sensor 22 and is used in step SB5 of FIG. 11 that will be described later.

At the step SA11, it is also determined whether the object has changed while the vehicle is traveling along the guide route. When the vehicle has arrived at the destination or when the destination is changed at the step SA11, the processing is started again from the step SA1. When the vehicle has not arrived at the destination or when the destination is not changed, however, the next routine for guiding and displaying the route (step SA13) is executed.

In the routine for guiding and displaying the route, the guide route identified by the above-mentioned searching a route is shown on the display 33 with the present position of the vehicle as a center. The guide route is displayed on the map in a manner that it can be easily distinguished. For example, the guide route and the roads not part of the guide route are indicated in different colors, so that the two can be distinguished from each other. Furthermore, guide information is provided by voice from a speaker 13 or is shown on the display 33, continuously, so that the vehicle is allowed to travel favorably along the guide route. The image data for the guide route is the road map data for the area around the present position or the house map data for the area around the present position stored in the data region 38c of the data storage unit 37.

The road map data and the house map data are changed over depending upon the conditions such as a distance from the present position to a guide point (destination, place to drop in or intersection), a traveling speed of the vehicle, the size of the area that can be displayed, or the switching operation by the user. Near the guide point (destination, place to drop in or intersection), the map is shown on an enlarged scale on the display 33. Instead of displaying the road map, only a minimum amount of necessary data may be displayed, such as the guide route, direction to the destination or the place to drop in and the present position, with omission of geographical data.

After the processing for guiding and displaying the route, there are successively executed the traveling position routine (step SA15), another position determination routine (step SA17), a routine for deleting locus data (step SA19) and a routine for confirming the storage of locus data (step SA21).

In execution of a traveling position routine (step SA15), new data are added to the locus data stored in the locus data storage unit 40 or the locus data is updated. The locus data to be newly stored is temporarily stored in the second RAM 6. Here, the locus data is that related to the links, nodes and intersections through which the vehicle has traveled. The traveling position routine (step SA15) will be described later.

In step SA17, it is, for example, determined whether an instruction for changing the destination has been input by the switching operation by the user. In the processing of locus data (step SA19), the following steps are executed. For example, the amount of new locus data stored in the locus data storage unit 40 is calculated or an increase in the amount of the locus data to be updated is calculated. It is then determined whether or not the amount of increase can be stored in the locus data storage unit 40 and whether the free memory region of the locus data storage unit 40 is larger than an increase in the amount of data. When the memory capacity is small, predetermined locus data are selectively deleted depending upon the deletion conditions that will be described later.

Thereafter, the processing for confirming the storage of locus data (step SA21) is executed. In the processing for confirming the storage of locus data, new locus data temporarily stored in the second RAM 6 are stored in the locus data storage unit 40. Then, the routine is repeated starting from the step for detecting the present position (step SA9).

When the vehicle has arrived at the destination, a series of steps are executed again from the step of initialization (step SA1). When the present traveling position of the vehicle has deviated from the guide route, an optimum route from the present off-route position to the end point of the guide route is automatically identified again by the routine for searching a route (step SA7).

11. Routine for Inputting a Point

Figure 10:
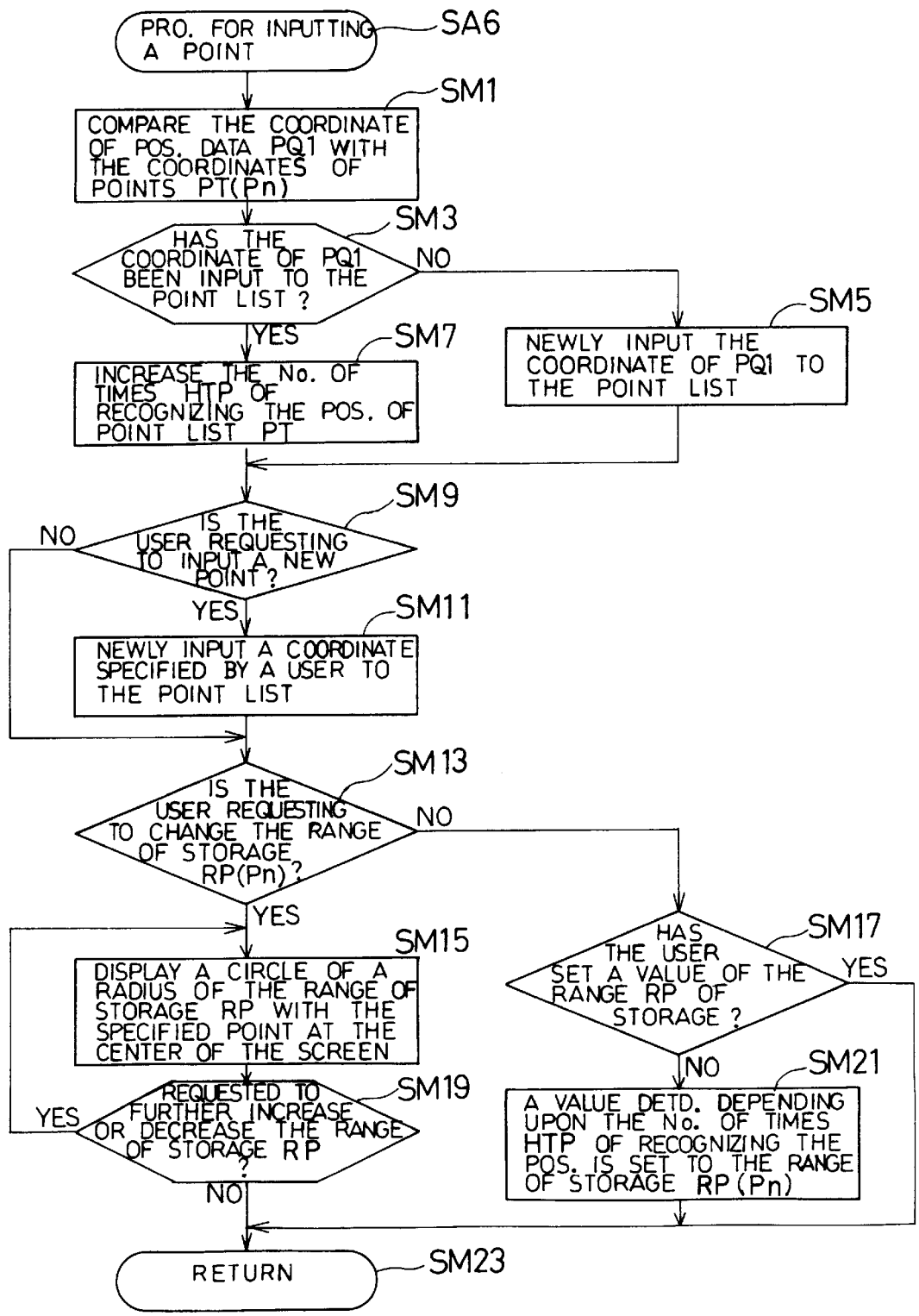
FIG. 10 is a flow chart of a subroutine for inputting a point.

FIG. 10 is a flow chart of a routine for inputting a point of FIG. 9. First, a coordinate value of position data PQ1, determined at the steps SA3, SA5 of FIG. 9, is compared with coordinate values of points PT of the point list 66 (step SM1). When a corresponding point PT exists at the coordinate position represented by the position data PQ1 (step SM3), the coordinate position of the position data PQ has been input already to the point list 66. However, when there is no point PT that corresponds to the coordinate position of the position data PQ1, a point represented by the coordinate value of position data PQ1 is input to the point list 66 as a new point PT (step SM5).

In the comparison of the step SM1, straight distances on the map are calculated between the coordinate of the position data PQ1 and the coordinates of points PT of the point list 66. When the straight distance is within a predetermined error range, the point represented by the position data PQ1 has been stored in the point list 66. When the position data PQ1 has been input to the point list 66 at the step SM3, the number of times HTP of recognizing the position of the point PT is increased by "1" (step SM7).

Next, it is determined whether or not the user has requested input of a new point to the point list 66 (step SM9). This request of input is generated by the operation of a touch switch 34. On a map shown on the display 33, for example, a cursor is moved to specify a particular point. The specified cursor position is input to the point list 66 as a requested point PT (step SM11). When the new point is input or when the user is not requesting to input the new point, the next step SM13 is executed. At the step SM13, it is determined whether the user has requested an increase or decrease of the numerical values of a range for storing a desired point PT.

In confirming the storage of locus data (step SA21), the range of storage RP is used as a condition for determining whether or not the locus data such as links and nodes is stored in the locus data storage unit 40. That is, only those locus data within a circle of the radius RP from a point PT are stored in the locus data storage unit 40. The range of storage RP is used even in the processing for deleting locus data (step SA19) of the third embodiment. These steps SA19 and SA21 will be described in more detail later.

Therefore, the amount of locus data stored in the locus data storage unit 40 increases or decreases depending upon an increase or decrease of the value of the range of storage RP. When it is requested to change the value of the range of storage RP (step SM13), a circular area on a map surrounded by the radius of the range of storage RP is shown on the display 33 with the point PT as a center (step SM15). It is then determined again whether the value of the range RP of storage is increased or decreased (step SM19).

When it is requested to increase or decrease the range of storage RP (step SM19), the circular area of the range of storage RP of a newly set value is shown again on the display 33 (step SM15). The amount for increasing or decreasing the value of the range of storage RP is specified by the touch switch 34. For example, when the touch switch 34 for increasing the value is depressed, the value of the range of storage RP increases. When the touch switch 34 for decreasing the value is depressed, the value of the range of storage RP decreases.

When it is not requested to increase or decrease the value of the range of storage RP (step SM13) and when the user does not set any value for the range of storage RP (step SM17), a value determined depending upon the number of times HTP of recognizing the position is set as the range of storage RP (step SM21). That is, the value of the range of storage RP increases with an increase in the number of times HTP of recognizing the position. Conversely, the value of the range of storage RP decreases with a decrease in the number of times HTP of recognizing the position. When the number of times HTP of recognizing the position is large, it means that the ignition key of the vehicle is turned on and off frequently at a position PT having the number of times HTP of recognizing the position. This means that the user goes to the point PT very frequently, and the vicinities of the point PT are the areas where the user travels frequently.

Therefore, a value corresponding to the number of times HTP of recognizing the position is set to the range of storage RP so that the locus data around the point PT having an increased number of times HTP of recognizing the position can be stored in the locus data storage unit 40. Thus, when a value of the range of storage RP has not at all been specified by the user, a numerical value determined depending upon the number of times HTP of recognizing the position is automatically set to the scope of storage RP (step SM21). Conversely, when a value of the range of storage RP has been specified by the user, this value is maintained and the processing at the step SM21 is neglected. Furthermore, when a value of the range of storage RP is once set, this value is permanently maintained unless it is changed by the user. Thus, when a value desired by the user is set or a value is set depending upon the number of times HTP of recognizing the position as the range of storage RP, the routine returns back to the main routine of FIG. 9 (step SM23).

12. Processing of a Travel Locus Data

In the processing of travel locus data as described above, the locus of travel of the vehicle is detected and is stored in the locus data storage unit 40 as locus data. However, the updated locus data or the new locus data are once stored in the second RAM 6 and are stored in the locus data storage unit 40 (step SA21) after the size of the free memory region of the locus data storage unit 40 is confirmed (step SA19).

Figure 11:
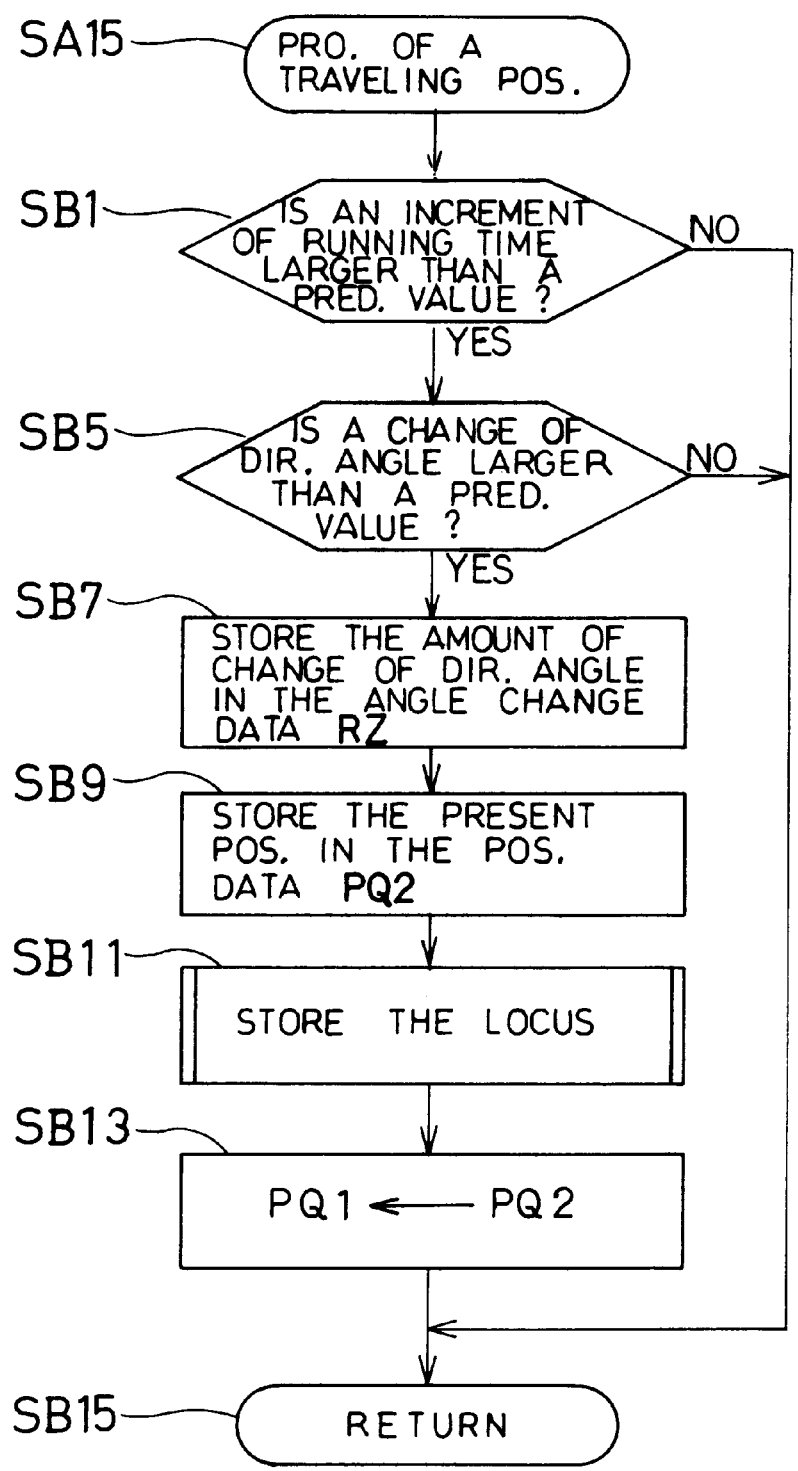
FIG. 11 is a flow chart of a subroutine for processing of a traveling position.

FIG. 11 is a flow chart of the processing of a traveling position. It is, first, determined whether or not an increment of the traveling time is larger than a predetermined value (step SB1). The amount of change in the traveling time corresponds to the passage of time from the absolute time at the position of the vehicle stored in the position data PQ1 at the steps SA3, SA5 of FIG. 9 to the present absolute time. The passage of time is measured by a clock 14 or by a clock contained in the GPS receiver 25.

When the increment of the traveling time does not exceed a predetermined value, the steps after step SB5 are skipped, and the routine returns back to the main routine of FIG. 9. When the increment of the traveling time becomes greater than a predetermined value, however, the next step SB5 is executed. In the processing of a present position in steps SA3, SA9 of FIG. 9, a relative direction angle of the vehicle is measured by the relative direction sensor 22. Then, the relative direction angle of the vehicle at the moment when the data related to the position of the vehicle is stored in the position data PQ1 is compared with the relative direction angle of the vehicle at the present moment (step SB5). This comparison is for detecting a difference between the relative direction angle data Dθ stored in the first RAM 5 and the latest relative direction angle data Dθ detected at the step SA9.

When the difference between the relative direction angle data Dθ stored in the first RAM 5 and the latest relative direction angle data of the vehicle is larger than a predetermined value, the steps following step SB7 are executed. At the step SB7, an absolute value of the difference is stored in the first RAM 5 as angle change data RZ. The coordinate data of the present position of the vehicle detected at the step SA9 of FIG. 9 and the absolute time of this detection are stored in the position data PQ2 (step SB9).

Next, a routine for storing a locus is executed (step SB11), and the traveling locus data of the vehicle such as newly generated links are temporarily stored in the second RAM 6. After the processing for deleting locus data (step SA19) of FIG. 9, the locus data are selectively stored in the locus data storage unit 40 in the routine for confirming the storage of locus data (step SA21).

After the step SB11, the position data PQ2 is copied onto the position data PQ1 (step SB13). Then, the routine of FIG. 11 ends and the routine returns back to the main routine of FIG. 9 (step SB15). In the routine for storing locus at the step SB11, a change in the traveling direction of the vehicle is detected, and the locus of travel is stored in the second RAM 6 as locus data. When the amount of change of the relative direction angle is smaller than a predetermined value at the step SB5, the routine of FIG. 11 is jumped over and the routine returns back to the main routine of FIG. 9.

The determination at the step SB1 is based upon the traveling time of the vehicle, which, however, may be a traveling distance. That is, whether or not the vehicle has traveled a predetermined distance is detected, and the steps following step SB5 are executed when the vehicle has traveled a predetermined distance. In this case, a difference in the traveled distance is detected by the distance sensor 23. When a value output from the distance sensor 23 has changed by more than a predetermined amount, it is so determined that the vehicle has traveled a predetermined distance.

13. Processing for Storing a Locus

Figure 12:
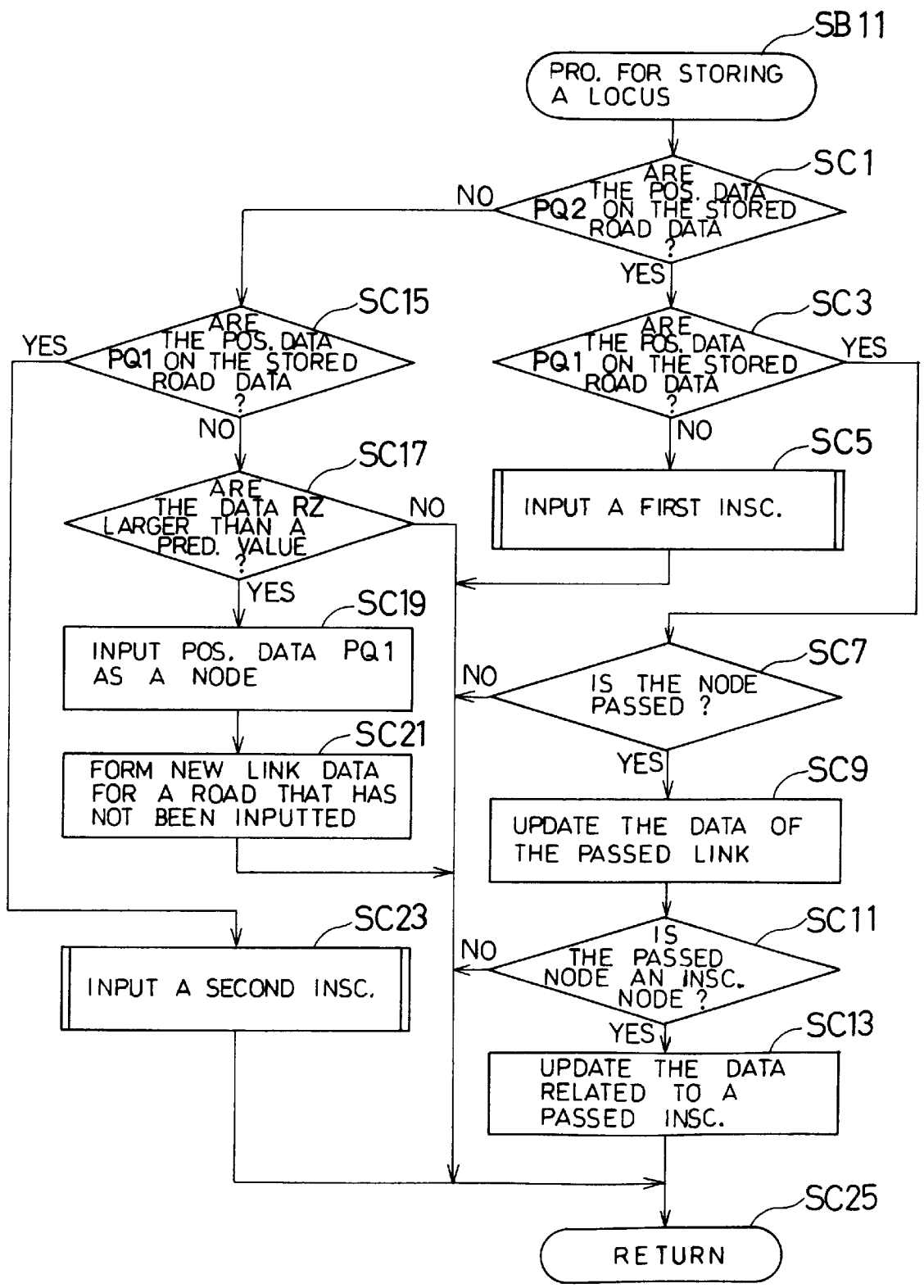
FIG. 12 is a flow chart of a subroutine for storing the locus.

FIG. 12 is a flow chart of a routine for storing a locus. It is, first, determined whether or not the position coordinates stored as position data PQ2 match the coordinates on a link stored in the locus data storage unit 40 (step SC1). In other words, it is determined whether or not the link data or the node data corresponding to a road on which the vehicle is now traveling have been stored in the locus data storage unit 40.

When the position coordinates of position data PQ2 lie on a locus stored in the locus data storage unit 40, it is then determined whether or not the position coordinates of the vehicle in the position data PQ1 lie on a locus stored in the locus data storage unit 40 (step SC3). That is, it is determined whether the vehicle is traveling along the locus stored in the locus data storage unit 40 at a moment when the position of the vehicle is stored in the position data PQ1.

When the position coordinate of the position data PQ1 does not lie on the locus that is stored, a routine is executed for inputting a first intersection (step SC5). When the position coordinate of the position data PQ1 lies on the locus that is stored, however, it is determined by utilizing the node data 55 and link data 60 whether or not the vehicle has passed through a node stored in the locus data storage unit 40 (step SC7). The inputting of the first intersection will be described later. Whether or not the vehicle has passed through the node is determined, for example, as described below. That is, the determination is based upon whether or not a straight distance between the east longitude coordinate NPE and the north latitude coordinate NPN of the node which is the object of determining the passage of the vehicle and the coordinate value of the position data PQ2 (latest present position of the vehicle), is within a predetermined value.

When the vehicle has passed through the node that is stored, it means that the vehicle has passed through a link, and the data of the link that has been passed through are updated (step SC9). The updating of the link data may be the addition of the number of times SEK of travel or of the number of times ESK of travel, updating of the average vehicle speed AS or the addition of the traveled date-and-hour data SND (see FIG. 6). In the steps SC1 and SC3 as described above, it is determined that the vehicle was traveling on the link stored in the locus data storage unit 40 just before or even at the present moment. In this case, whether or not the vehicle has traveled through a link is indirectly determined by determining whether or not the vehicle has passed through the node.

Even in updating the link data, the data to be changed are once stored in the second RAM 6. Through the processings at the steps SA19 and SA21 of FIG. 9, the locus data in the locus data storage unit 40 are selectively updated. After the end of the processing of the step SC9, it is determined whether or not the node that is passed is an intersection node (step SC11). Whether or not it is an intersection node is determined based upon whether or not the intersection number NPB in the node data 55 is a value other than "0".

That is, the values other than "0" represent intersection nodes. Therefore, when it is determined that the vehicle has passed through an intersection node, the data related to the intersection that the vehicle has passed through is updated (step SC13). In updating the intersection data, the locus data to be changed is once stored in the second RAM 6. Thereafter, the data in the locus data storage unit 40 is selectively updated based on the data stored in the second RAM 6 in the steps SA19 and SA21 of FIG. 9. The updating of intersection data may be the addition of the number of times NVC of travel in the entering→leaving direction, updating of the average time TSU for passing, and addition of the traveled date-and-hour data DTS (see FIG. 7). When the results of determination of the steps SC7 and SC11 are NO after the end of the processing for inputting the first intersection (step SC5), the routine for storing a locus of FIG. 12 ends, and the routine returns back to the processing of a traveling position of FIG. 11 (step SC2).

When the position coordinate of position data PQ2 does not lie on a stored link at the step SC1, it is then determined whether or not the position coordinate of position data PQ1 lies on a stored link (step SC15). When the position coordinate of position data PQ1 matches a coordinate on a link, a routine is executed for inputting a second intersection (step SC23). This means that, though the latest position of the vehicle does not lie on a link that has been stored in the locus data storage unit 40, the next previous position of the vehicle was on a link stored in the locus data storage unit 40. In other words, this means that the vehicle has traveled along a link and the node stored in the locus data storage unit 40 but has deviated from the link or the node. In this case, the processing is executed for inputting a second intersection, and the routine returns back to the processing of a traveling position of FIG. 11 (step SC25). The inputting of the second intersection will be described later.

When the position coordinate of position data PQ1 does not lie on a link stored in the locus data storage unit 40, it is determined whether or not the angle change data RZ is larger than a predetermined value (step SC17). If none of the position coordinates of position data PQ1 and PQ2 lie on a link stored in the locus data storage unit 40, this means that the vehicle is traveling on a road that has not been input. When the angle change data RZ is larger than a predetermined value, new node data are formed and stored (step SC19). That is, when a change in the traveling direction of the vehicle becomes larger than a predetermined amount as shown in FIG. 32, it means that the vehicle is traveling on a curved road. Therefore, new node data are formed by using geographic coordinate data stored in the position data PQ1.

The newly formed node data are temporarily stored in the second RAM 6 (step SC19). Furthermore, new link data 60 are formed being linked by the newly formed node data, and are stored in the second RAM 6 (step SC21). Then, the routine returns back to the processing of a traveling position shown in FIG. 11 (step SC25). When the angle change RZ is smaller than the predetermined value, the processings of the steps SC19 and SC21 are not executed, and the routine readily returns back to the routine of FIG. 11.

The node data and link data that are newly formed at the steps SC19 and SC21 are once stored in the second RAM 6. Then, the new data are selectively stored in the locus data storage unit 40 through the processing for detecting locus data (step SA19) and through the processing for confirming the storage of locus data (step SA21) of FIG. 9.

14. Inputting a First Intersection

Figure 13:
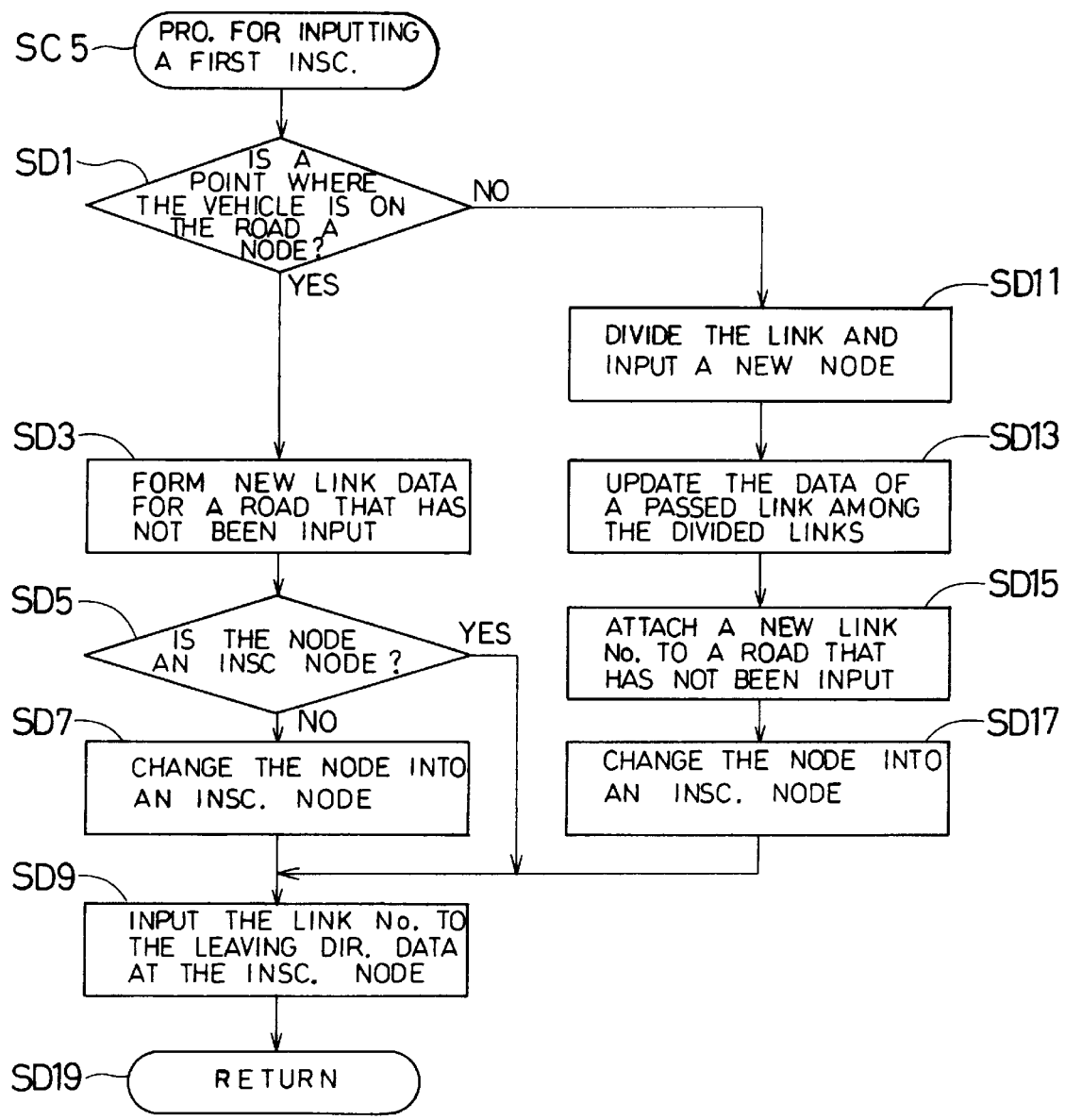
FIG. 13 is a flow chart of a subroutine for inputting a first intersection.

FIG. 13 is a flow chart of a routine for inputting a first intersection (step SC5) of FIG. 12. This routine is executed when the vehicle has traveled from a road that has not been input to a link that has been stored. It is first determined whether or not a geographical position on a link is a node (step SD1). This is the case where the position (latest present position of the vehicle) of position data PQ2 is on a stored link at the step SC1 of FIG. 12 and the position of position data PQ1 is not on a stored link at the step SC3. In other words, this is the case where the vehicle is not traveling on a recorded link at the time of storing the position data PQ1 but is traveling on a recorded link at the time of storing the position data PQ2. Concretely speaking, this is the case where the vehicle has traveled from a road that has not been input to a road that has been input.

When a point at which the vehicle exists on a recorded link is not a node at the step SD1, the link that has been stored in the locus data storage unit 40 is divided and new node data are formed accompanying the division (step SD11). That is, the recorded link on which the vehicle is traveling is divided into two links with the location of the vehicle as a boundary. The data of the divided links that have been stored are updated (step SD13). The updating is the addition of number of times SEK of travel or number of times ESK of travel, updating of the average vehicle speed AS, or accumulation of the traveled date-and-hour data SND. Even in the updating of the link data, the data are once stored in the second RAM 6 and are selectively stored in the locus data storage unit 40 through the processing for confirming the storage of locus data (step SA21) of FIG. 9.

In the above-mentioned case, the vehicle was traveling on a new road until it arrived at the stored link and, hence, new link data are formed up to that point (step SD15). The node formed at the step SD11 becomes an intersection and, hence, the intersection data 65 are newly formed for the new node (step SD17).

The newly formed link numbers RB are input as an entering link number IRB and a leaving link number ORB to the newly formed intersection data 65. Besides, the number of times NVC of travel, average time TSU for passing, and the traveled date-and-hour data DTS are stored (step SD9). Thereafter, the routine returns back to the processing for storing locus of FIG. 12 (step SD19). The newly formed intersection data are once stored in the second RAM 6 and are selectively stored in the locus data storage unit 40 through the processing for confirming the storage of locus data (step SA21).

When a geographical position at which the vehicle is located on the stored link is a node at the step SD1, new link data is formed for a road that has not been input (step SD3). That is, the locus data storage unit 40 is not storing a road on which the vehicle has traveled until it has arrived at the link stored in the locus data storage unit 40 and, hence, link data 60 is formed to represent the new road.

It is then determined whether or not the node on the link stored in the locus data storage unit 40 where the vehicle is located is an intersection node (step SD5). When it is not an intersection node, new intersection data 65 is formed to change the node into an intersection node (step SD7). Then, the link numbers RB of the new link data are registered as an entering link number IRB and an exit link number ORB. Besides, the number of times NVC of travel, average time TSU for passing and traveled date and hour DTS of new intersection data 65 are stored (step SD9). Then, the routine returns back to the processing for storing a locus of FIG. 12 (step SD19).

When the stored node at the vehicle's location is an intersection node, the link numbers RB of the new link data are input as an entering link number IRB and an exit link number ORB. Besides, the number of times NVC of travel, average time TSU for passing and travel date and hour DTS of intersection data 65 are added (step SD19). The newly formed link data and intersection data or the stored locus data that are updated, are once stored in the second RAM 6 and are selectively stored in the locus data storage unit 40 through the processing for locus data (step SA19) and the processing for confirming the storage of locus data (step SA21) of FIG. 9.

15. Inputting a Second Intersection

Figure 14:
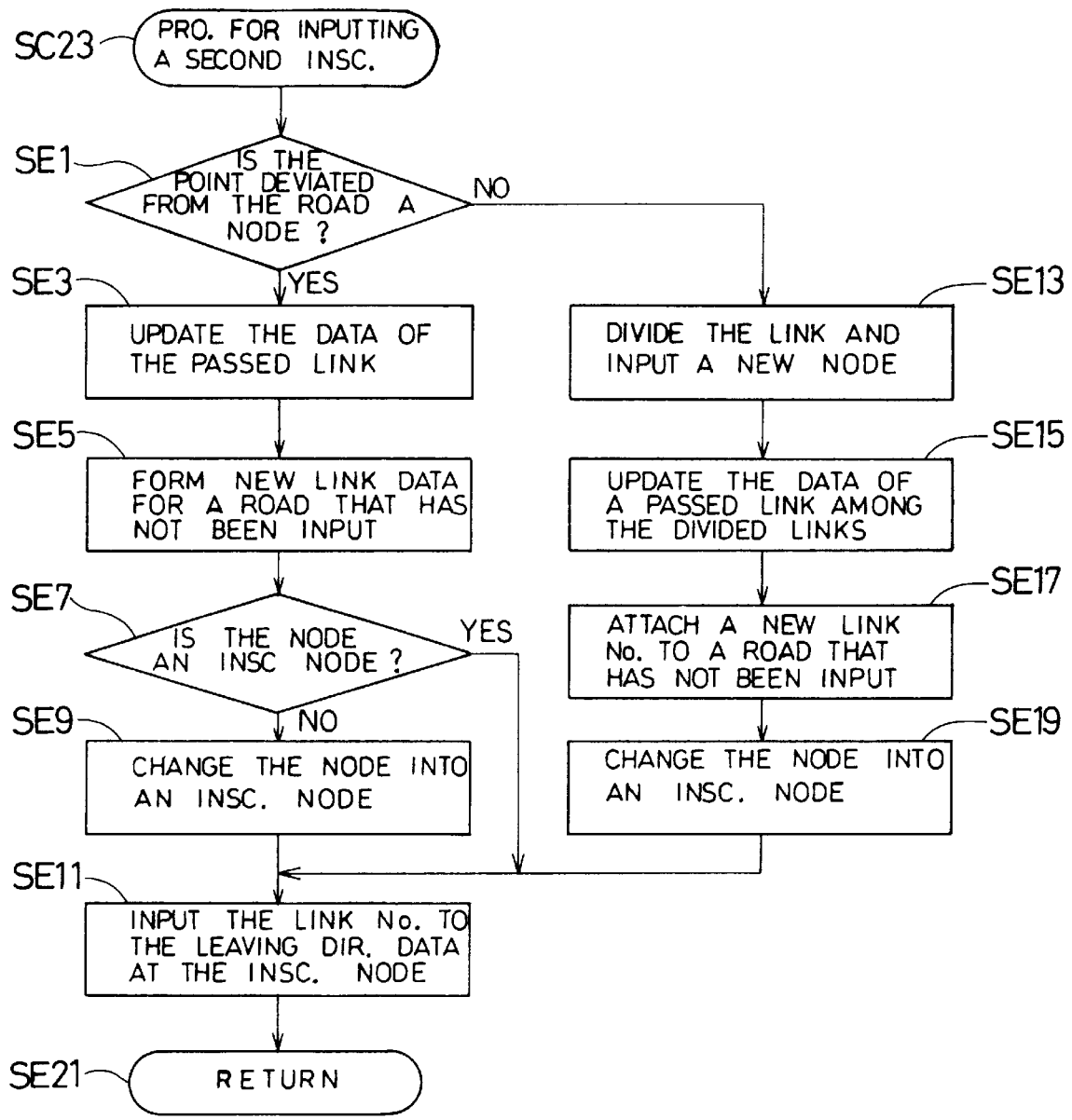
FIG. 14 is a flow chart of a subroutine for inputting a second intersection.

FIG. 14 is a flow chart of a routine for inputting a second intersection (step SC23) of FIG. 12. It is first determined whether or not a location of the vehicle off the road stored in the locus data storage unit 40 is a node (step SE1). This is based upon the determination that the position coordinate of position data PQ2 (latest present position of the vehicle) is not on the stored link at the step SC1 of FIG. 12. That is, this is the case where the vehicle is traveling on a road that has not been input and the geographical position PQ1 is on a stored link at the step SC15 of FIG. 12.

In other words, this is the case where the vehicle is traveling on a link that has been stored in the locus data storage unit 40 at the time of recording the position data PQ1 and is traveling on a road that has not been input at the time of recording the position data PQ2. In other words, this is the case where the vehicle has arrived at a road that has not been input from a road that has been stored.

When a location of the vehicle deviated from the link stored in the locus data storage unit 40 is not a node at step SE1, the stored link is divided and new node data is formed accompanying the division (step SE13). That is, the deviated link of the vehicle is divided into two links with the vehicle location as a boundary. The data of the stored link on which the vehicle has traveled are updated (step SE15). For instance, the number of times SEK or ESK of travel is added, the average vehicle speed AS is updated, or the data SND of travel date and hour are added.

The road on which the vehicle is traveling, deviated from the stored link, is a new road, and new link data are formed with the newly formed node as a start point node (step SE17). Besides, the node formed at the step SE13 becomes an intersection. Accordingly, intersection data 65 are newly formed for the new node (step SE19).

The newly formed link numbers RB are input as an entering link number IRB and an exit link number ORB to the newly formed intersection data 65. Besides, the number of times NVC of travel, average time TSU for passing and travel date and hour DTS are stored (step SE11). Thereafter, the routine returns back to the processing for storing a locus of FIG. 12 (step SE21).

When the deviated geographical position of the vehicle on the stored link is a node at the step SE1, the data of the stored link leading up to the point of deviation are updated (step SE3). The road on which the vehicle is now traveling from the deviated point is a link that has not been input and, hence, new link data are formed (step SE5).

It is then determined whether or not the deviated node of the vehicle on the link is an intersection node (step SE7). When the node is not an intersection node, new intersection data 65 are formed to change the node into an intersection node (step SE9). The link numbers RB of the new link data are input as an entering link number IRB and an exit link number ORB to the newly formed intersection node. Moreover, the number of times NVC of travel, average time TSU for passing and travel date and hour DTS of the intersection data 65 are stored (step SE11). Thereafter, the routine returns back to the processing for storing a locus of FIG. 12 (step SE21).

When the node of the vehicle deviated from the stored link is an intersection node, the link numbers RB of the new link data are added as an entering link number IRB and an exit link number ORB. Besides, the number of times NVC of travel, average time TSU for passing and travel date and hour DTS of intersection data 65 are added (step SE11). Thereafter, the routine returns back to the processing for storing a locus of FIG. 12 (step SE21).

Even in the processing for storing the newly formed link data and the intersection data or even in the processing for updating the locus data, the locus data are once stored in the second RAM 6. Thereafter, the new locus data are selectively stored in the locus data storage unit 40 through the processing for deleting locus data (step SA19) and the processing for confirming the storage of locus data (step SA21) of FIG. 9.

16. First Embodiment of Searching a Route

Figure 15:
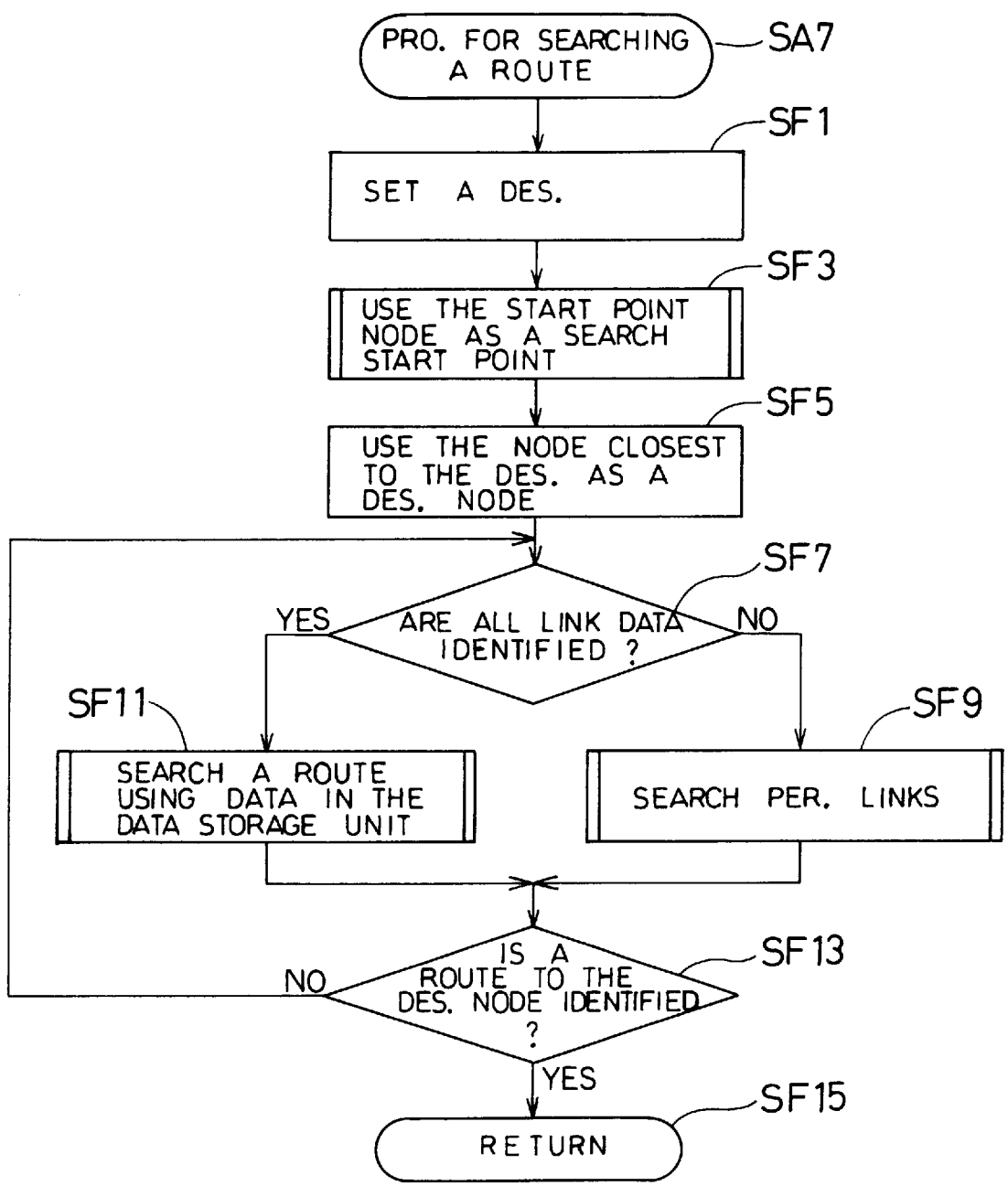
FIG. 15 is a flow chart of a subroutine for searching a route according to a first embodiment.

FIG. 15 is a flow chart of a first embodiment of a routine for searching a route (step SA7) in the main routine of FIG. 9. First, a routine for setting a destination is executed to set a destination desired by the user (step SF1). The destination is set by the user based on the map data shown on the display 33. Then, a start point node closest to the present position of the vehicle, detected by the processing of a present position (step SA3) of FIG. 9, is identified from the node data 55 stored in the locus data storage unit 40.

When the node closest to the start point node has not been stored in the locus data storage unit 40, processing for the next node is executed simultaneously. That is, a coordinate point closest to the present position is identified as a start point from the coordinates of road data stored in the data storage unit 37.

Then, the identified start point node is input as a search start point (step SF3). Next, a node on a link closest to the destination set at the step SF1 is identified from the locus data storage unit 40 (step SF5). The identified node is input as the final destination node to the end point of route data ED in the first RAM 5. In identifying the destination node, when there is no node closest to the destination among the stored nodes, the closest node is identified from the node data stored in the data storage unit 37.

It is determined whether the processing for searching a route is executed for all link data stored in the locus data storage unit 40, starting from the above-mentioned search start point (step SF7). When the processing for searching a route has not been executed, a search for peripheral links is executed (step SF9). The routine for searching peripheral links calculates a search cost of the links extending from a node. A link having a smaller search cost is selected, and the end point node of the selected link is used as a search start point of the next link. The routine for searching peripheral links will be described later.

Next, it is determined whether or not a route to the destination node has been identified (step SF13). When the route has not been identified, the routine is returned back again to step SF7. When the route to the destination has been identified, the routine is returned from the routine of FIG. 15 back to the main routine of FIG. 9 (step SF15). Thus, a series of steps for searching a route, i.e. the steps SF3 to SF13, use the node data 55, link data 60 and intersection data 65 stored in the locus data storage unit 40. When the locus has not been sufficiently stored in the locus data storage unit 40, therefore, the locus data often fails to connect the present position of the vehicle to the destination that is set. To compensate for the lack of route, in this case, the routine for searching a route is executed (step SF11) by using data stored in the data storage unit 37. This may be the case where all link data in the locus data storage unit 40 is identified at the step SF7, but the route to the destination has not been formed at the step SF13. The route is identified from the end point of the route formed by the locus data to the destination by using the road data in the data storage unit 37.

Thus, the route can be identified in the vicinity of the present position of the vehicle by using locus data stored in the locus data storage unit 40. In the vicinity of the destination, however, the locus data has not necessarily been stored in the locus data storage unit 40. In the areas where there are no locus data, therefore, the route is identified based upon the data stored in the data storage unit 37. When the searching of a route from the present position of the vehicle to the destination ends, the routine returns back to the main routine of FIG. 9 (step SF15).

17. Searching Peripheral Links

Figure 16:
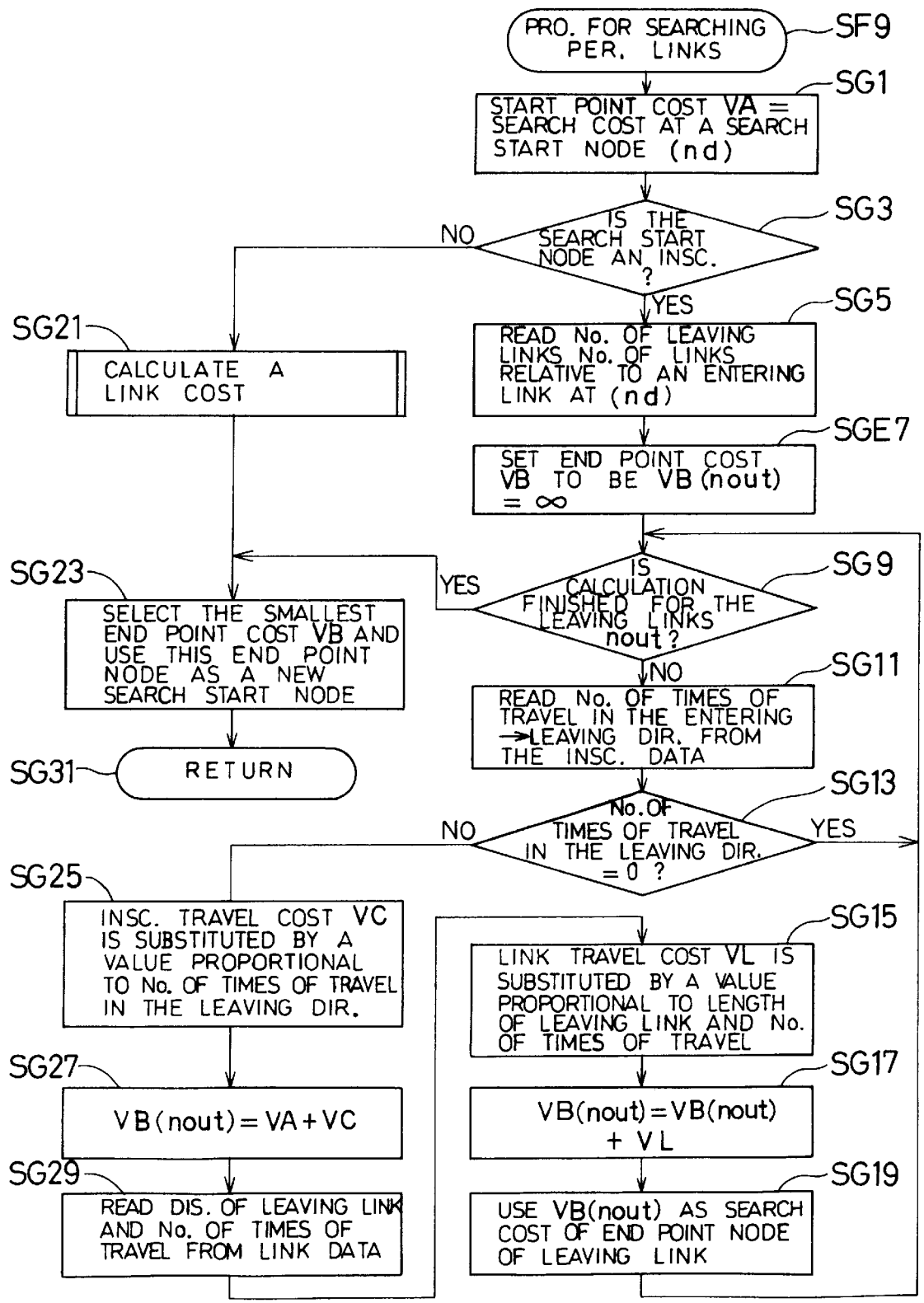
FIG. 16 is a flow chart of a subroutine for searching peripheral links.

FIG. 16 is a flow chart of the routine for searching peripheral links (step SF9) of FIG. 15. First, a search cost value of a search start node is stored as a start cost VA (step SG1). The search cost of the search start node is a cumulative value of search costs of the links identified up to the search start node by the processing for searching a route of FIG. 15. The search costs of the links are compared with each other to select a link having the smallest value, and this link is used as an optimum route. Thus, the links having the smallest search costs are successively selected to form a guide route. The search cost of the end point node of the link is a cumulative value of the search costs of the links and nodes that are identified.

In other words, the search cost stored in the start cost VA at the step SG1 is the sum of search costs of the links and nodes constituting a route that is already identified. Referring to FIG. 34, it is presumed that the node NOD1 is a search start node at the present moment, and that the links IRB11, IRB10 and IRB8 are determined in this order by the searching of a route of a minimum search cost up to the search start node. Then, a value of the start point cost VA at the step SG1 is the sum of traveling costs through the links IRB11, IRB10, IRB8 and of the passage costs through the nodes NOD5, NOD7, NOD8.

After the step SG1, it is determined whether or not the search start node is an intersection node (step SG3). The node NOD1 in FIG. 34 is an intersection node. When the search start node is an intersection node, a next step SG5 is executed. When it is not am intersection node, a link cost is calculated at a step SG21.

When the search start node at the search start point is an intersection node, the number IRB of a link entering into the intersection node is determined from the result of the searching of a route executed just before. That is, a link number RB is attached to the link selected as a guide route by the preceding searching of a route. An entering link number IRB in agreement with this link number is detected from the intersection data 65 to determine the entering link. In the case of FIG. 34, the entering link is a link IRB8.

From the entering link number IRB which is a guide route, the number nout of exit links is read out of the intersection data 65 (step SG5). In the case of FIG. 34, the number nout of exit links is "3" with respect to the entering link IRB8. The values of the end point costs VB (nout) at the end point nodes of the exit links are initially set to infinity (step SG7), and the end point costs VB at the nodes NOD2, NOD3 and NOD4 are first set to infinity.

It is determined whether the search costs are calculated for the exit links read at the step SG5 (step SG9). When the calculation of search cost has not been finished for all exit links, the number of times of travel from the entering link IRB8 to the exit links ORB5, ORB6, ORB7 at the intersection node is read (step SG11). It is then determined if the number of times of travel from the entering link to the exit links is "0" (step SG13).

When the number of times of travel is not "0" the intersection travel costs VC are found for traveling from the entering link IRB8 to the leaving links ORB5, ORB6, ORB7 through the intersection node NOD1 (step SG25). The intersection travel cost VC is substituted by a value which varies in reverse proportion to the number of times of travel from the entering link IRB8 to the exit links ORB5, ORB6, ORB7. That is, the intersection travel cost VC decreases with an increase in the number of times of travel.

The sum of the intersection travel cost VC and the start point cost VA is an end point cost VB (nout) of the exit link ORB (step SG27). When the number of times of travel is "0", the routine is returned back to the step SG9. The number of times "0" of travel indicates the fact that traveling is not allowed from the entering link to the exit link due to one-way or the user has never traveled it in the past.

Next, the length LR of the exit link ORB and the number of times SEK of travel or the number of times ESK of travel are read from the link data 60 (step SG29). The travel cost VL of the exiting link ORB is substituted by the sum of a value which varies in reverse proportion to the number of times of travel on the link and a value which varies in proportion to the length of the link (step SG15). That is, the traveling cost VL of the exit link ORB decreases with an increase in the number of times of travel, and increases with an increase in the length of the link. The number of times of travel used for calculating the traveling cost VL is the one in the direction of travel in agreement with the direction of searching a link, i.e., in agreement with the direction from the search start node to the end point node. The number of times of travel may be the sum of the number of times SEK of travel and the number of times ESK of travel.

The thus found traveling cost VL of the exit link ORB is added to the end point cost VB (nout) (step SG17), and the end point cost VB (nout) is the final search cost at the end point node of the exit link ORB (step SG19). The processing of the step SG9 is executed again.

When the end point cost VB (nout) is calculated for all exit links ORB at the intersection node NOD1 (step SG9), the exit link ORB having the smallest end point cost VB at the intersection node is selected as a next identified route (step SG23). At the intersection node NOD1 of FIG. 34, if the greatest number of times of travel is from the entering link IRB8 to the exit link ORB7 and the exit link ORB7 is the shortest, then, the exit link ORB7 has the smallest final cost VB at the intersection node NOD1 and is selected as a next guide route.

Then, the end point node NOD4 of the exit link ORB7 is determined to be the next search start node. In the next search for peripheral links, therefore, a value of the end point cost VB which is the search cost of the node NOD4 is substituted for the start point cost VA (step SG1). Those links having final costs VB (nout) of infinitely large values are forcibly excluded and are not selected in forming a guide route.

When the search start node is not an intersection node (step SG3), a routine is executed for calculating a link cost (step SG21), and the processing of the step SG23 is executed. This may be the node NOD7 in FIG. 34. In this case, only one end point cost VB is calculated, and the comparison of the cost values is not effected. When the search start node is the node NOD7 (step SG21), therefore, the traveling cost VL of the link IRB10 is calculated, and the end point cost VB of the node NOD5 only is calculated.

When a link constituting an optimum route is selected in searching peripheral links in the routine of FIG. 16, the routine returns back to the processing for searching a route of FIG. 15 (step SG31). In the foregoing description, a link having the smallest search cost was selected, but the method of calculating the search cost may be carried out in a reverse manner. Thus, the value of traveling cost VL of the link increases with an increase in the number of times of travel through the link or with a decrease in the length of the link, and a link having the greatest traveling cost is selected.

Furthermore, the traveling cost VC at the intersection node and the traveling cost VL through the link may be calculated by taking the date of the traveled date and hour DTS and the date-and-hour data SND into consideration. That is, the later date-and-hour data SND make the traveling cost VL through the link small. As a result, a link having data of lately traveled date and hour is preferentially selected in searching a route.

Moreover, turn to the right or turn to the left may be taken into consideration for the traveling cost at the intersection node. That is, the value decreases in the order of traveling cost which turns to the left, traveling cost which turns to the right and straight traveling cost. This is because, in a general intersection, turning to the left is more difficult than turning to the right or going straight. Turning to the left may often be very difficult depending upon the quantity of the oncoming vehicles. In order to avoid the turning to the left at the intersection as much as possible, therefore, the value of the traveling cost VC may be affected by the direction of travel at the intersection.

18. Calculating a Link Cost

Figure 17:
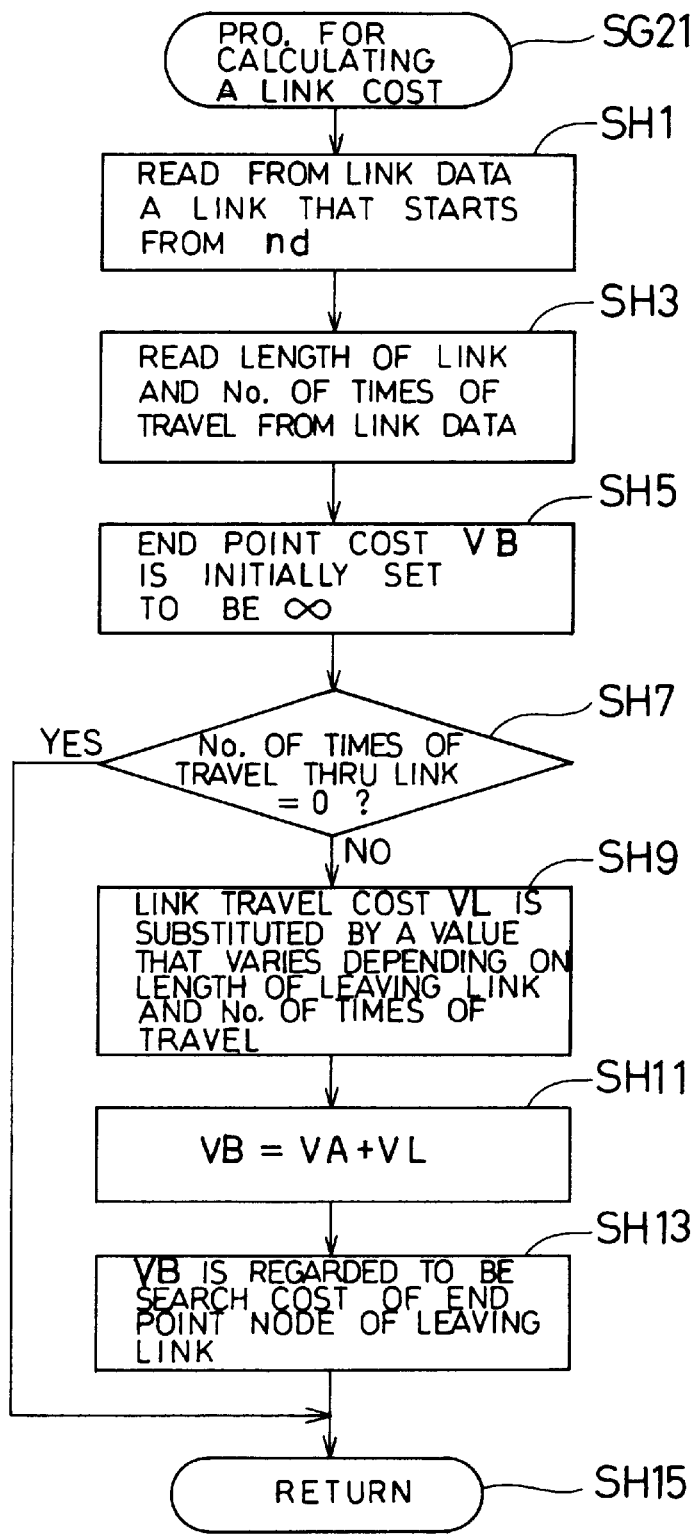
FIG. 17 is a flow chart of a subroutine for calculating a link cost.

FIG. 17 is a flow chart of a routine for calculating a link cost. First, data related to links connected to a search start node are read out from the locus data storage unit 40 (step SH1). For example, when the node NOD7 in FIG. 34 is a current search start node, the link IRB10 connected to the node NOD7 is read out from the locus data storage unit 40.

The length LR of the link IRB10 and the number of times of travel are read from the link data (step SH3), and a value of end point cost VB of the link IRB10 is initially set to infinity (step SH5). Next, when the number of times of travel through the link is "0" (step SH7), the calculating of the link cost ends, and the routine returns back to step SG23 of FIG. 16 (step SH15).

However, when the number of times of travel is not "0" (step SH7), the traveling cost VL of the link is calculated (step SH9). The traveling cost VL is the sum of a value which varies in reverse proportion to the number of times of travel and a value which varies in proportion to the length LR of the link. The sum of the traveling cost VL and the start point cost VA of the search start node is regarded to be the end point cost VB (step SH11). The end point cost VB is the search cost at the end point node NOD5 of the link IRB10 (step SH13), and the routine returns back to the step SG23 of FIG. 16.

Thus, the search cost at the end point node of link is calculated through the routines of FIGS. 16 and 17. A route to the end point node having a smaller search cost is selected as a guide route. In the searching of peripheral links, the intersection traveling cost VC may be calculated by taking into consideration the average time TSU for passing and the travel date and hour DTS. That is, the value of intersection traveling cost VC decreases with a decrease in the average time TSU for passing. The value of intersection traveling cost VC further decreases as the date and hour DTS of travel are more current.

Similarly, the traveling cost VL of the link may be increased or decreased depending upon the average vehicle speed AS through the link, travel date-and-hour data SND, number of times YT of input and the road discrimination data LD. For example, the value of traveling cost VL decreases with an increase in the average vehicle speed AS and as the traveled date-and-hour data SND are more current. Depending upon the time for executing the search for a route, furthermore, the link has more time data according to the above time, the traveling cost VL of the link may further decrease.

When the date-and-hour data SND are concentrated to, for example, a predetermined time zone before noon, it is desired to use the links related to the date-and-hour data SND in that time zone only. In this case, the travel cost VL of the link is a function of value that varies depending upon the time zone of the date-and-hour data SND, and a link, for which the date-and-hour data SND are stored in the same time zone as when searching a route, is preferentially used.

Furthermore, the value of traveling cost VL may decrease with an increase in the number of times YT of input. The value of the traveling cost VL may be decreased even when the link is not stored in the data storage unit 37 due to road discrimination data LD. In particular, when a value of traveling cost VL of the link greatly changes depending upon the number of times YT of input manipulated by the user, the roads preferred by the user are selected in a concentrated manner as a guide route.

In the setting of a destination (step SF1 of FIG. 15), furthermore, external data may be input from the VICS or ATIS and may be used for selecting facilities to be dropped in or for selecting a destination. When, for example, a parking lot near the destination is picked as a final destination, the facilities are selected by taking into consideration whether the parking lot is filled or still empty or whether the roads near the facilities are jammed, depending upon the external data from the VICS or ATIS. This helps decrease erroneous selection of the facilities. Instruction for starting the processing for setting a destination is not accepted while the vehicle is traveling.

Moreover, the road data, intersection data and node data in the data storage unit 37 may all be copied onto the locus data storage unit 40. When the road data are stored in the locus data storage unit, the numbers of times SEK and ESK of travel, date-and-hour data SND and average vehicle speed AS are added. However, these values are "0" at first. In the processing for searching a route, the road data and the intersection data become objects to be identified together with the locus data. Thus, a guide route is identified including both locus data and road data. The number of times of travel in the road data and the traveled date-and-hour data in the locus data storage unit 40 are rewritten in the following case. That is, the present position is detected while the vehicle is traveling, road data having a coordinate value corresponding to the present position are detected, the road data are detected from the locus data storage unit, and the above-mentioned data are updated.

The method of calculating a search cost used in FIGS. 16 and 17 may be utilized in a search for a guide route (step SJ1) that is executed by using road data stored in the data storage unit 37 (CD-ROM, opto-magnetic disk, etc.). That is, the road number MB of a road stored in the data storage unit 37 are stored in the link data 60, the numbers of times SEK, ESK of travel of link data 60 having the road number MB of the above road are referred to in searching a route, based upon the road data, and the search cost of the road data are varied depending upon the numbers of times SEK, ESK of travel. Therefore, even in a guide route identified by using the road data, roads having larger numbers of times of travel are preferentially selected.

In searching a route by using road data, furthermore, the value of search cost may be determined by taking into consideration not only the number of times of travel but also the average vehicle speed AS, traveled date-and-hour data SND and number of times YT of input by the user. In this case, these values are utilized and the traveling cost (search cost) VL is determined.

19. Second Embodiment of Searching a Route

FIGS. 18 to 25 are flow charts illustrating a second embodiment of a route search. First, a routine is executed for setting a destination desired by the user (step SF1). The routine for setting a destination is the same as for setting a destination of FIG. 15. The destination desired by the user is identified from a list of facilities shown on the display 33 according to the conditions for identification, and is specified.

As the destination of route guidance is set by the routine for setting a destination, a guide route is determined from the start point (present position of the vehicle) to the destination (step SJ1). The guide route is determined by using the road data file F4 stored in the data storage unit 37. In the processing for searching a guide route at the step SJ1, the guide route may be determined by using the same method used to identify peripheral links (step SF9) that will be described later. This case does not use rewritable data such as number of times of running, average vehicle speed, etc. In searching the guide route, therefore, the size of the search cost is determined by the road environment such as length of a road, width of the road, principal trunk road such as national highway and speed way.

Figure 35:
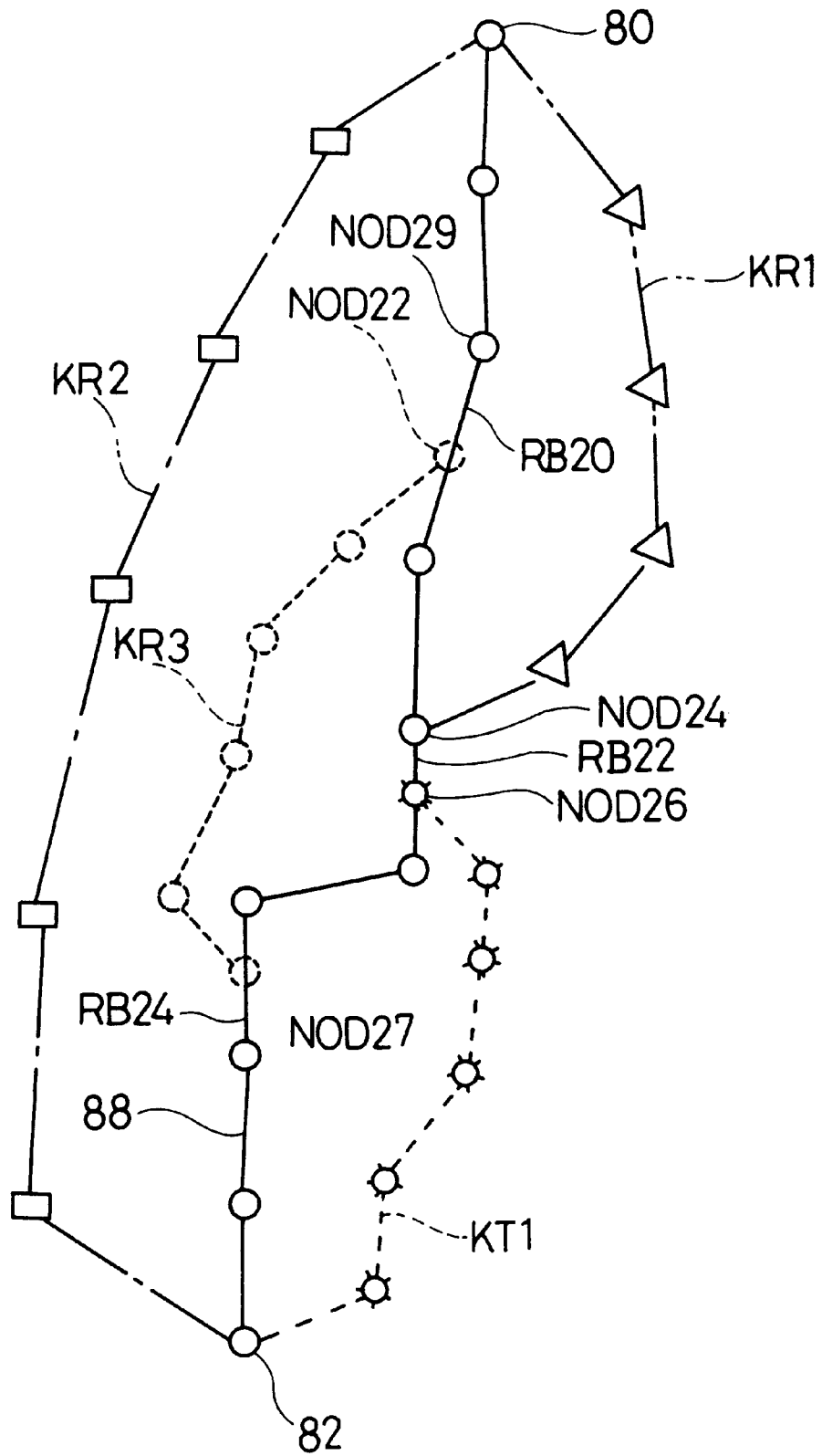
FIG. 35 is a diagram illustrating locus routes identified by the route searching of the second embodiment.

FIG. 35 illustrates a guide route 88 identified only by the road data in the data storage unit 37. The guide route 88 that is identified is constituted by the road numbers attached to the roads on a map stored in the data storage unit 37. The link data having road numbers of the guide route data are identified from the locus data stored in the locus data storage unit 40 (step SJ3). The links having road numbers of the roads constituting the guide route are defined to be overlapped links.

Next, a node near the start point (geographical position at the time of start) is set to be a search start node (step SJ5). The node referred to here is the locus data stored in the locus data storage unit 40. A locus route is identified from the search start node to a start point node of the overlapped link in a manner as described below.

First, when the locus route has not been identified for each of the overlapped links that have been identified (step SJ7), it is then determined whether or not the start point node of the overlapped links is an intersection node (step SJ9). In the guide route 88 of FIG. 35, when, for example, the links RB20, RB22 and RB24 are overlapped links, it is determined whether a node NOD26 of the overlapped link RB22 is an intersection node. When it is an intersection node, it is then determined whether or not entry is allowed to the guide route from the overlapped link (step SJ11). It is important to determine at the step SJ7 whether or not the start point node is an intersection node, on account of the reason described below. When the start point node is not an intersection node, entry is often not allowed to the overlapped link from other links. In this case, the course may not be changed from the overlapped link to the guide route 88. It is therefore necessary to determine whether or not the start point node is an intersection node.

It is necessary to determine whether or not entry is allowed to the guide route from the overlapped link (step SJ11), on account of the reason described below. That is, the direction of running on the overlapped link is often opposite the running direction of the guide route toward the destination. In this case, the user must U-turn to enter the guide route 88 constituted by the road data only from the overlapped link.

Figure 18:
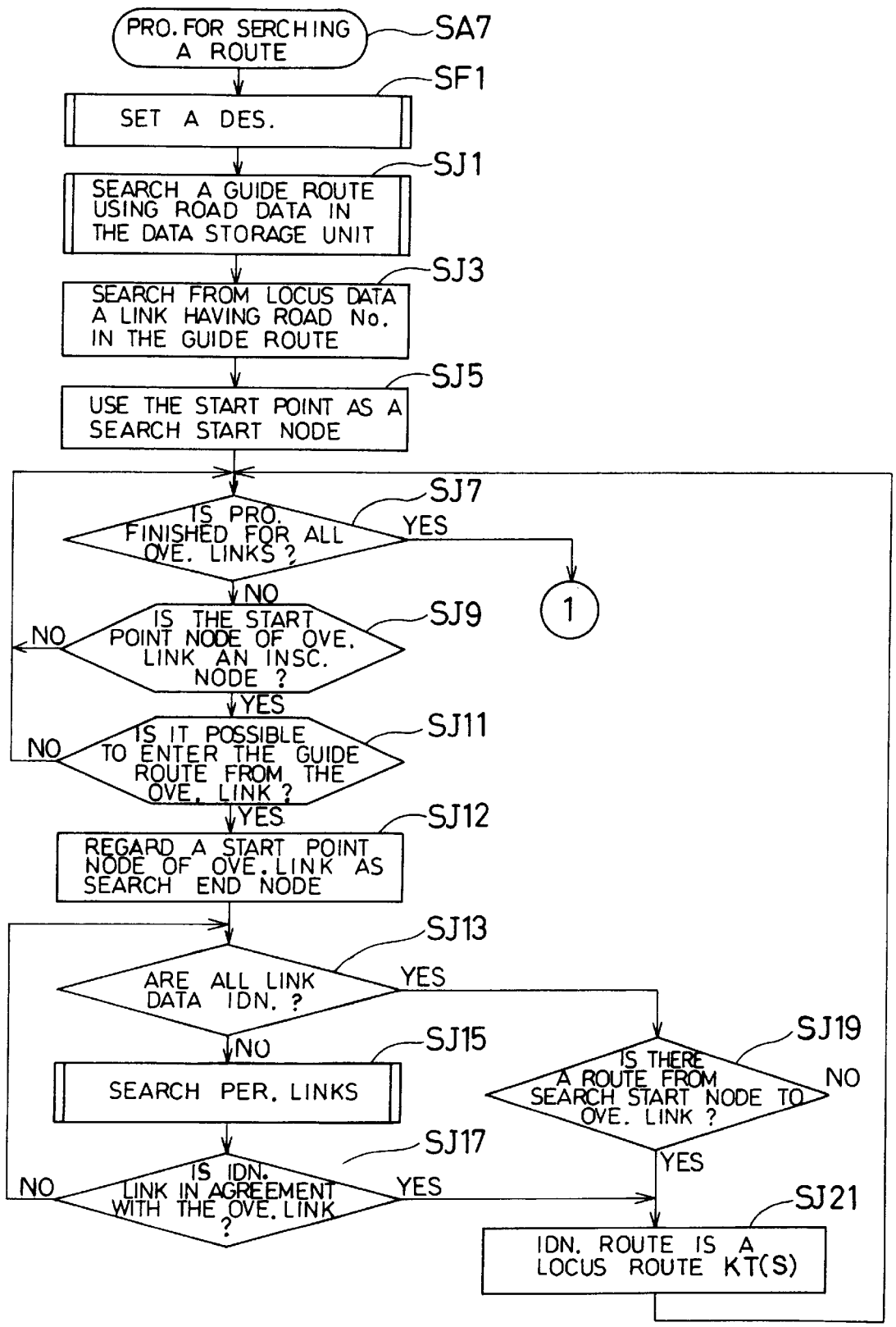
FIGS. 18 to 25 are flow charts of a routine for searching a route according to a second embodiment.
Figure 19:
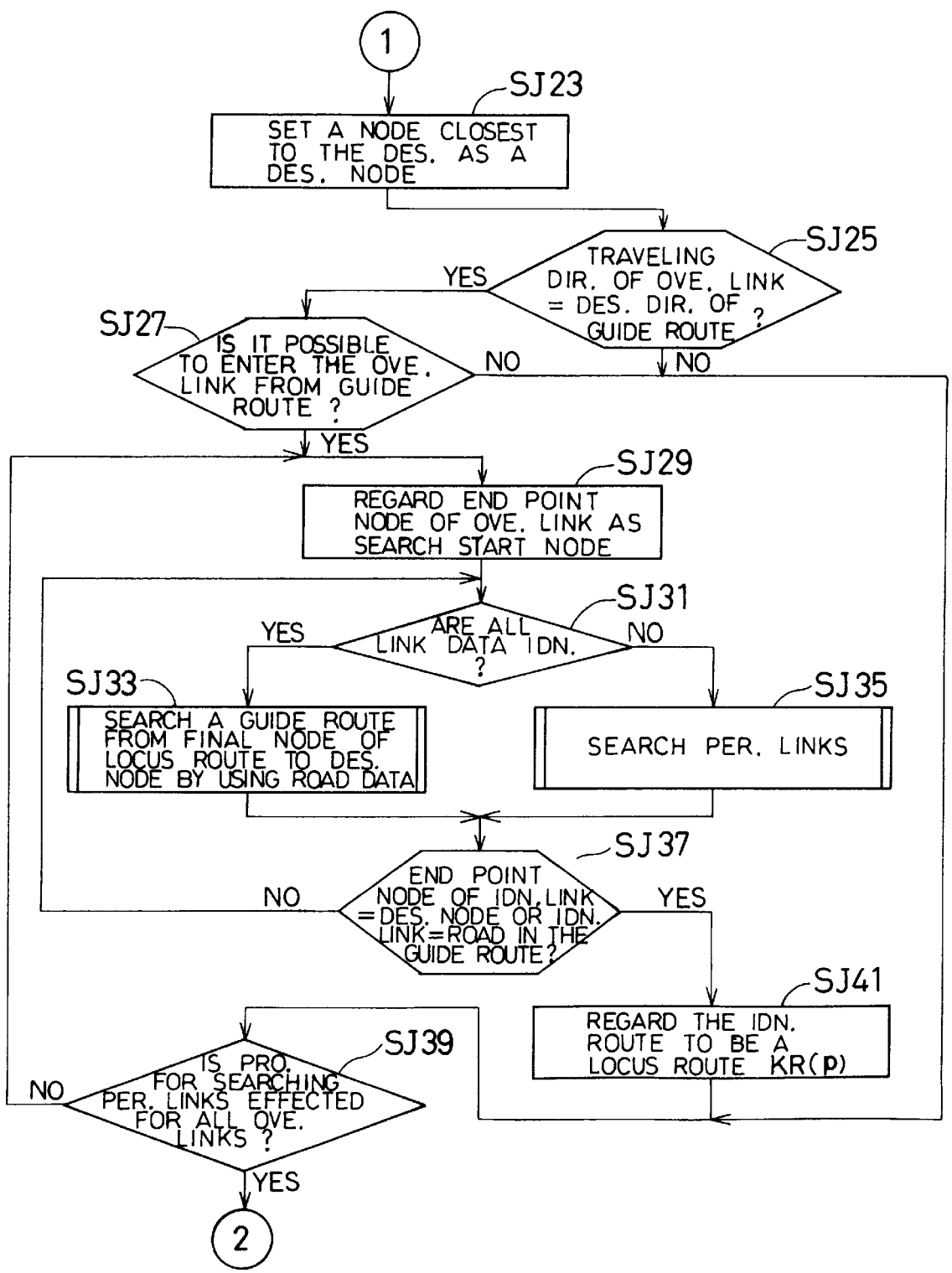

After the processing is finished for all overlapped links (step SJ7), the main routine proceeds from the routine of FIG. 18 to that of FIG. 19. When the start point node of the overlapped link is not an intersection node, or when it is difficult to proceed to the guide route 88 from the overlapped link (steps SJ9, SJ11), the locus route is not identified by using the overlapped link. Instead, the routine is returned back to the step SJ7, and the next overlapped link is processed.

However, when the start point node of the overlapped link is an intersection node, and it is allowed to enter the guide route 88 toward the destination from the overlapped link (steps SJ9, SJ11), the overlapped link is regarded to be the end point node and identification of the route is started by using the locus data. In identifying the locus route, first, the start point node of the overlapping link is set to be a search end node (step SJ12).

Next, when the locus route has not been identified by using all locus data stored in the locus data storage unit 40 (step SJ13), the end point node of a link connected to the last end of the locus route identified already is set to be a search start node. The searching for peripheral links is executed starting from this new search start node (step SJ15), and the new search link is added to the end of the locus route identified thus far. The searching for peripheral links is by a program shown in FIG. 16.

Next, when the newly added search link is not an overlapped link (step SJ17), the steps after the step SJ13 are executed again. When the added search link is in agreement with the overlapped link (step SJ17), however, a locus route is identified from the start point to the overlapped link. Then, the identified route is stored as a locus route KT(S) in the first RAM 5 (step SJ21). A variable (S) of the locus route KT(S) indicates an S-th locus route KT. Thereafter, the determination of the step SJ7 is executed again, and processing is started again for the next overlapped link.

When the locus route is identified for all locus data in the locus data storage unit 40 (step SJ13), it is determined whether a route is established by locus data from the start point to the overlapped link (step SJ19). This is the case where the locus data stored in the locus data storage unit 40 exists only for the vicinity of the overlapped link and in the vicinity of the start point. That is, when there is no route of locus data that connects the start point to the overlapped link, the route is not regarded to be the locus route KT(S).

FIG. 35 shows a locus route KT1 identified by a series of executions in the routine of FIG. 18. The locus route KT1 is constituted by the locus data only of from the start point node 82 to the overlapped link RB22. In the routine of FIG. 18, the locus route KT(S) is identified from the start point node 82 to each of the overlapped links on the guide route 88.

Then, a locus route KR(P) of FIG. 19 is searched, and a node in the locus data storage unit 40 closest to the destination is set as the destination node 80 (step SJ23). Next, it is determined whether the running direction of the overlapped link detected at the step SJ3 is in agreement with the running direction of the guide route 88 to the destination (step SJ25). The overlapped link used here is the same as the overlapped link used in FIG. 18. Whether the running direction of the link is in agreement with the running direction of the guide route 88 is determined depending upon whether or not the numbers of times ESK, SEK of running of the link data 60 are "0". For example, when the number of times SEK of running is "0", it is determined that it is not possible to run from the start point node to the end point node of the overlapped link. When the running direction of start point→end point is the direction of the guide route 88 to the destination, then, the running direction of the overlapped link is not in agreement with the running direction of the guide route 88 (NO at the step SJ25).

When they are in agreement (YES at the step SJ25), it is determined that the course can be changed from the guide route 88 to the overlapped link (step SJ27). This determination is based upon whether or not the end point node of the overlapped link is the intersection node as in step SJ9 of FIG. 18. At the intersection node, furthermore, it is determined whether it is allowed to run from the overlapped link to the links of other locus data. The determination is based upon the intersection data 65 stored in the locus data storage unit 40. When it is allowable to proceed to other links from the guide route 88 through the overlapped link, the end point node of the overlapped link is set to be a search start node (step SJ29).

When the search start node has been set but the processing for searching a locus route has not been effected for all link data stored in the locus data storage unit 40 (step SJ31), the processing for searching peripheral links is executed starting from the above search start node (step SJ35). The search processing for all link data at the step SJ31 ends even when there is no next link newly connected to the link being identified. This is the case where the locus data storage unit 40 stores only the locus data in the vicinities the start point and no locus data for the vicinity of the destination.

When the processing for searching a locus route ends (YES at the step SJ31), the processing for searching a route is executed using, as a new search start node, the end point node of the locus route identified thus far (step SJ33). That is, when the locus data in the locus data storage unit 40 are not sufficient, and the locus route that is identified does not arrive at the destination node, the lacking route is identified by using the road data in the data storage unit 37.

When it is not possible to form a locus route from the overlapped link to the destination node, the processing for searching a route by using the road data at the step SJ33 may be inhibited. That is, when the locus data stored in the locus data storage unit 40 is only that of in the vicinity of the overlapped link, it is impossible to search a locus route up to the destination node 80 relying only upon the locus data. Therefore, the intermediate locus route may be forcibly discarded.

After the step SJ33 or SJ35, it is next determined whether or not the final end point node of the locus route which is now being identified has reached the destination node (step SJ37). Here, it is determined if the final link of the locus route being identified is in agreement again with the overlapped link on the guide route 88. That is, in FIG. 35, it is determined whether the locus route KR3 starting from the overlapped link RB24 has arrived at the overlapped link RB20.

When the search of the locus route has been finished (YES at the step SJ37), the newly identified route is stored in the first RAM 5 as a locus route KR(P) (step SJ41). When the process for searching for a locus route has not been effected for all overlapped links (step SJ39), the process for searching a locus route is started for the new overlapped links (step SJ29). When the process for searching a locus route is effected for all overlapped links (step SJ39), the routine of FIG. 20 is started.

Thus, the locus routes KR1, KR3 shown in FIG. 35 are identified through a series of steps shown in FIG. 19. That is, a locus route KR(P) is identified that starts from an intermediate point of the guide route 88 constituted by the road data in the data storage unit 37.

Figure 20:
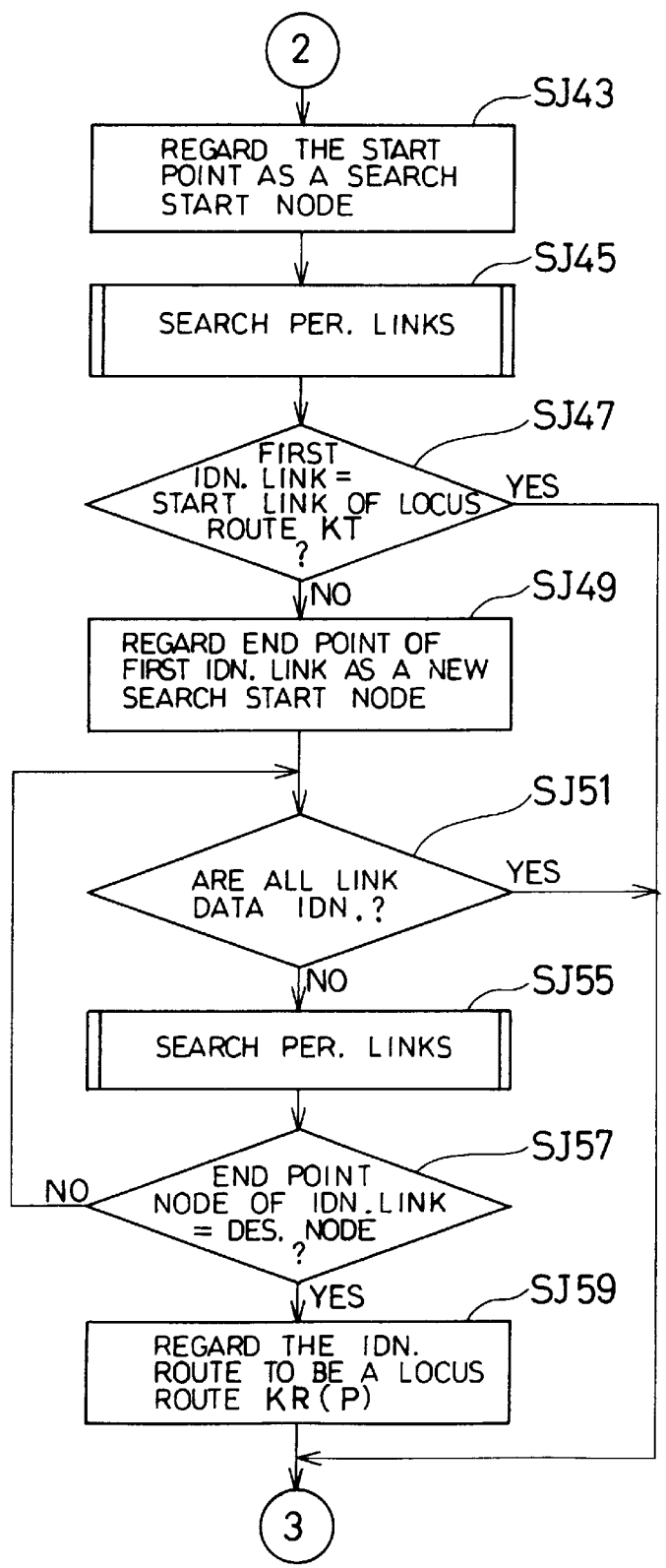

In identifying the route constituted by locus data of FIG. 20, it is determined whether there exists a locus route constituted by only the locus data, from the starting point to the destination node 80. First, the start point node 82 is set to be a search start node (step SJ43), and a next optimum link is identified by the searching of peripheral links with the search start node as a start point (step SJ45). It is then determined whether or not the link identified at the step SJ45 is the same as the first link in the identified locus route KT(S) (step SJ47). That is, if the first link identified at the step SJ45 is in agreement with the start link of any locus route KT(S), the locus route starting from the link comes into agreement with the locus route KT that has been identified already. To prevent the searching from being effected in an overlapping manner, a step SJ47 renders a determination.

When the first identified link is not in agreement with the start link of the locus route KT(S) (step SJ47), the end point node of the first identified link is set to be a next search start node (step SJ49). When the processing has not been effected for all link data stored in the locus data storage unit 40 (step SJ51), the end point node of the lastly identified link is regarded to be a new search start node, and the processing is executed for searching peripheral links (step SJ55).

When the end point node of the newly identified link is not the destination node 80, after the searching peripheral links of the step SJ55 (step SJ57), the processing is repeated again from the step SJ51. When the end point node has reached the destination node 80, however, the locus route is identified from the start point node 82 to the destination node 80, and this route is stored in the first RAM 5 as a new locus route KR(P) (step SJ59).

When the end point of the identified link is not in agreement with the destination node 80 and the processing has been effected for all link data (NO at the step SJ57, YES at the step SJ51), the routine of FIG. 20 is forced to end. In this case, there exists no locus route from the start point node 82 to the destination node 80, and the link data stored in the locus data storage unit 40 are only those related to the vicinity of the start point node 82 and those related to the vicinity of the destination node 80. The locus route KR(P) identified by the routine of FIG. 20 corresponds to the locus route KR2 of FIG. 35. Thus, the locus route KR2 includes no link that overlaps the guide route 88.

In searching a route using locus data of FIG. 21, the processing is executed in a manner as described below. That is, it is determined whether the route from the start point to the destination node 80 is constituted by locus data only, and whether the route includes locus routes other than those identified in FIG. 20.

First, a start point node 82 is set to be a search start node (step ST1). With this search start node as a start point, a next optimum link is identified by the process of searching peripheral links (step ST3). It is determined whether or not the link identified at the step ST3 is the same as the first link of the locus routes identified by the processings of FIGS. 18 to 20 (step ST5). This prevents the searches from being executed in an overlapped manner. This is because, when the first link identified at the step ST3 is in agreement with the start link of any locus route KR(P) or KT(S), a locus route starting from this link comes into agreement with the locus route that has been identified already.

When the first identified link is not in agreement with the start link of other locus routes (step ST5), the end point node of the first identified link is set to be the next search start node (step ST7). Then, the end point node of the last identified link is regarded to be a new search start node until the processing is effected for all link data stored in the locus data storage unit 40 (step ST9), and the searching for peripheral links is executed (step ST11). Next, when the newly identified link is in agreement with the locus route that has been identified already (step ST13), the links that are in agreement are excluded (step ST15), and the searching for peripheral links is repeated using the remaining links (step ST11).

When the newly identified link is not used in other locus routes (step ST13), the searching for peripheral links is repeated (steps ST9, ST11) until the end point node of the link comes into agreement with the destination node (step ST17). When the end point node of the identified link is the destination node 80, however, it means that the locus route is identified up to the destination node 80. Therefore, this route is stored in the first RAM 5 as a new locus route KR(P) (step ST19).

Figure 21:
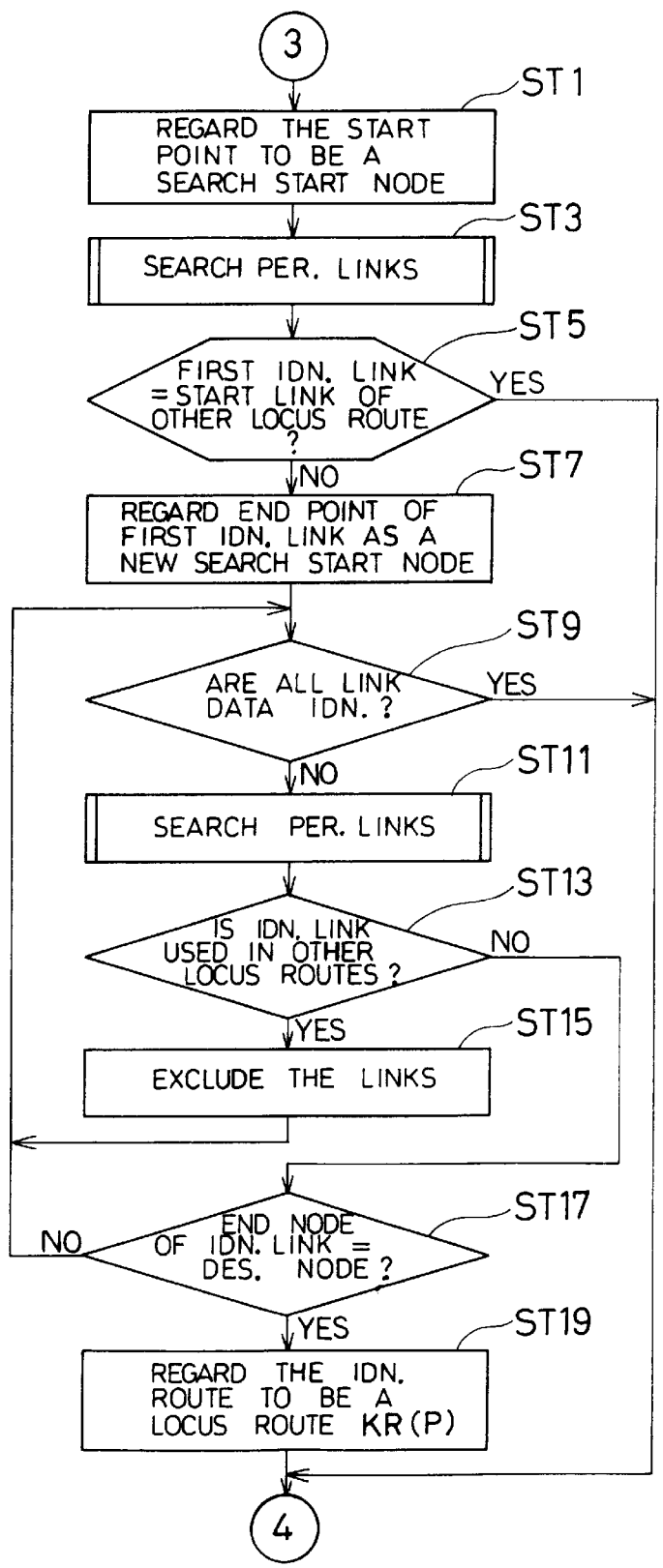

When the end point of the identified link is not in agreement with the destination node 80 (NO at the step 17) and when the processing for search has been effected for all link data (YES at the step ST9), the routine of FIG. 21 is forced to end. In this case, there exists no locus route from the start point node 82 to the destination node 80, and the locus route that is not perfectly identified of FIG. 21 is canceled.

In the locus route KR identified by the routine of FIG. 21, the links of the second smallest cost are successively selected out of the search costs identified by the searching for peripheral links (step SF9) unlike those of the locus route KR identified in FIG. 20. In calculating the search costs, therefore, when the length of the links most affects the running cost VL, the shortest locus route from the start point node 82 to the destination node 80 is identified by executing the routine of FIG. 20, and the second shortest locus route is identified by executing the routine of FIG. 21.

Figure 22:
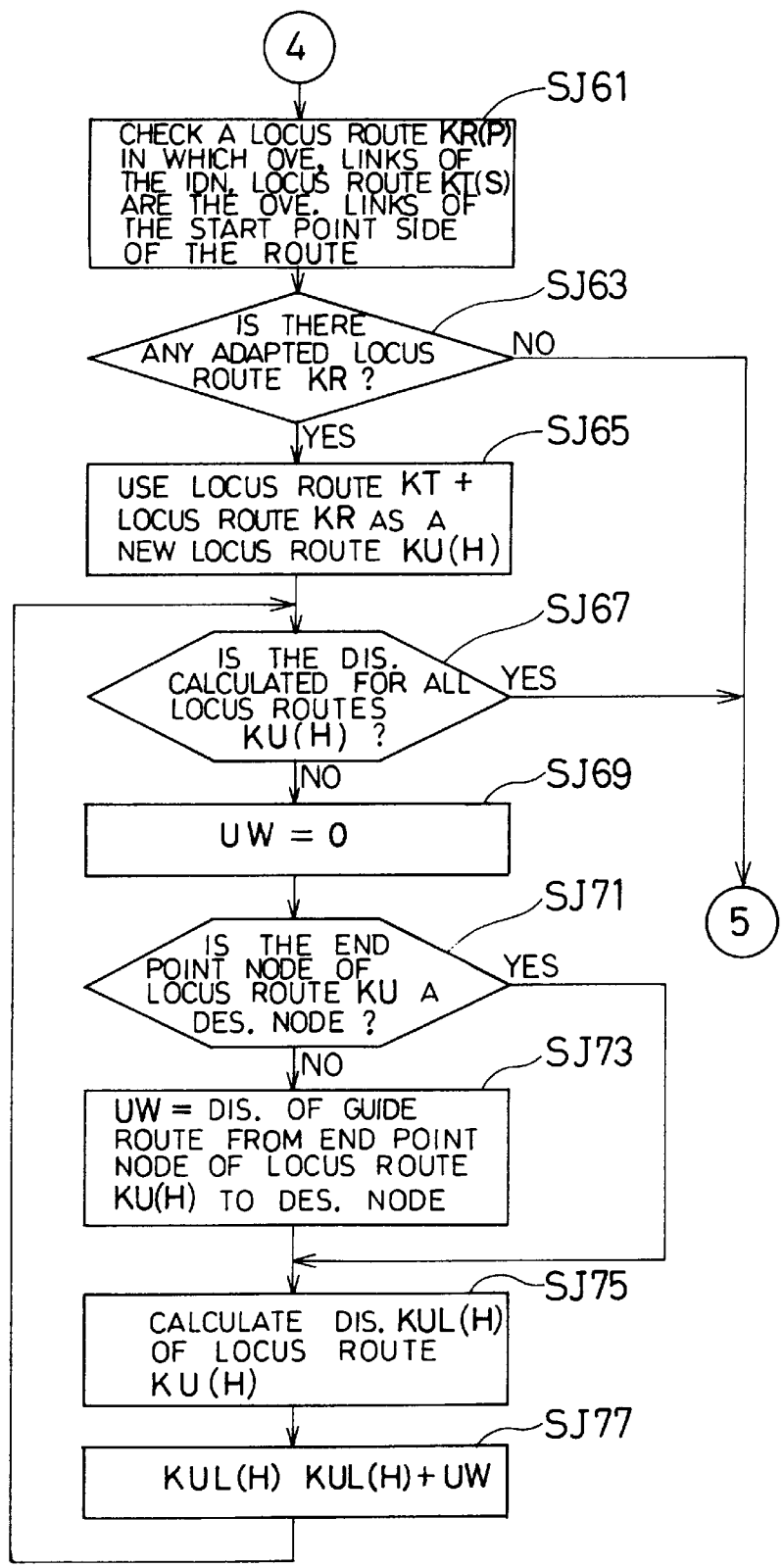

When the locus route KT(S) and the locus route KR(P) are identified by the routines of FIGS. 18 to 21, the routine of FIG. 22 is executed. It is, first, checked whether the overlapped links of the locus routes KT(S) are in agreement with the overlapped link on the start point side of the locus route KR(P) (step SJ61). In the example of FIG. 35, the overlapped link RB22 of the locus route KT1 is the overlapped link of the start point side of the locus route KR1. If there exists such a combination of the locus route KT(S) and the locus route KR(P) (step SJ63), a route consisting of the two locus routes is stored in the first RAM 5 as a new locus route KU(H) (step SJ65).

Next, when the calculation of the distance of the whole newly formed locus route KU(H) has not been finished (step SJ67), the calculation register UW is initially set to "0" (step SJ69). Here, the distance of the locus route KU(H) is the sum of the whole distance of the locus route KT constituting the locus route KU(H) and the whole distance of the locus route KR. In the example of FIG. 35, length of the locus route KT1+length of the locus route KR1=distance of the locus route KU(H). Here, the distances of the overlapped links have not been calculated in an overlapped manner.

When the end point node of the locus route KU(H) is not in agreement with the destination node 80 (step SJ71), the distance from the end point node of the locus route KU(H) to the destination node 80 is calculated by using the guide route 88 and is stored in the calculation register UW (step SJ73) The end point node of the locus route KU(H) is also the end point node of the locus route KR that constitutes the locus route KU(H). Therefore, when the end point node of the locus route KR is not the destination node 80, the route from the end point node to the destination node 80 is the one which uses the guide route 88. In FIG. 35, this may be, for example, the end point node NOD29 of the locus route KR3.

The distances of the links constituting the locus route KT and the locus route KR are read from the link data 60 in the locus data storage unit 40, and are accumulated (step SJ75). The sum of the distances of the links of locus routes KT and KR is stored in the route distance KUL (H). A value of the calculation register UW is further added to the route distance KUL(H) (step SJ77). Thus, the route distance KUL(H) of the locus route KU(H) is found from the start point node 82 to the destination node 80. When there is no locus route KU(H) or when the distance of all locus route KU(H) is calculated, the routine of FIG. 22 ends, and the routine of FIG. 23 starts.

Figure 23:
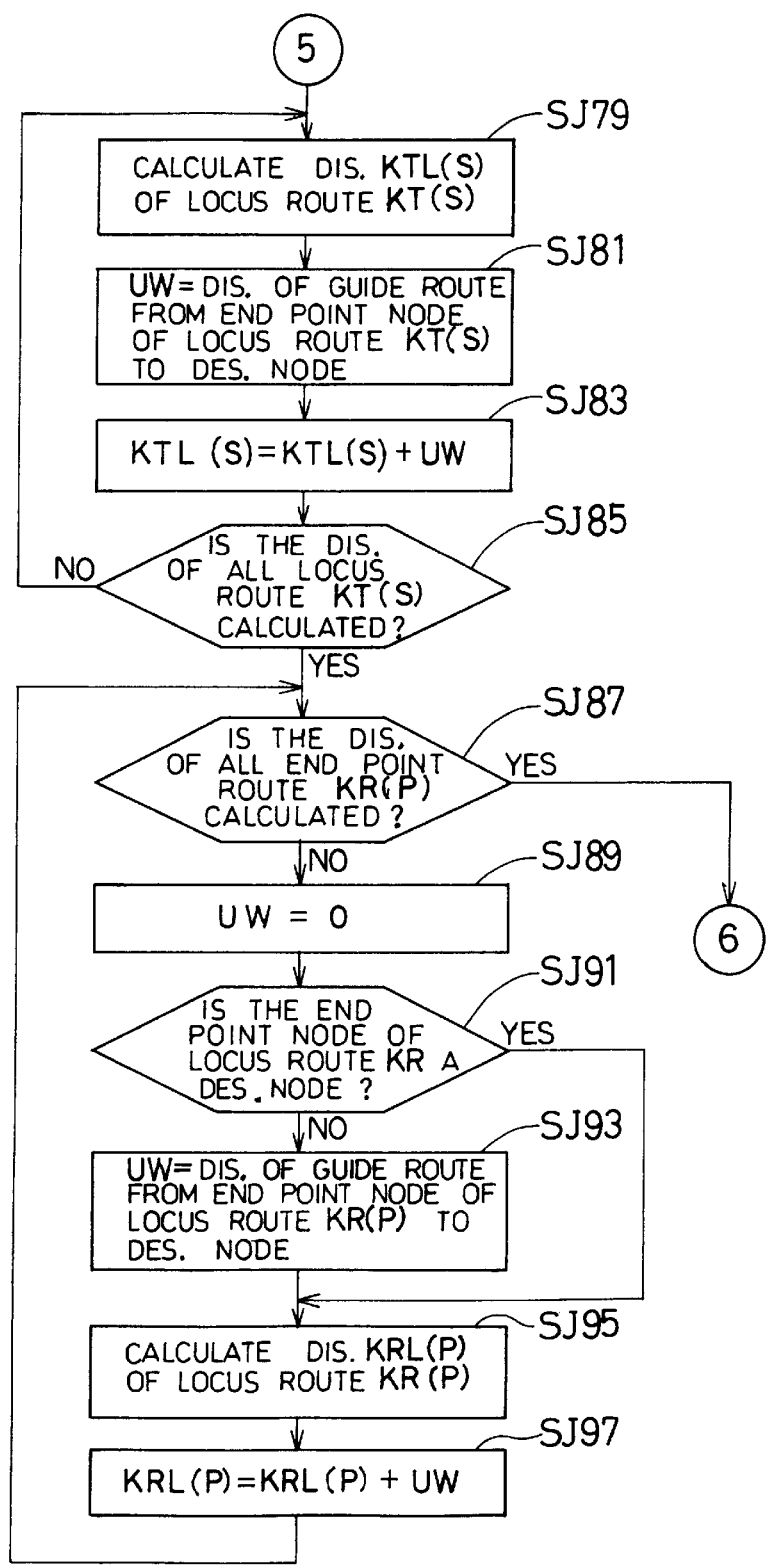

In the routine of FIG. 23, when the locus route KT(S), locus route KR(P) and the guide route 88 are used in combination, their respective route distances are calculated. That is, the lengths of the links constituting the locus route KTO(S) are read out from the locus data storage unit 40, and are accumulated. Then, the distances of the links of the locus route KT(S) are stored in the route distance KTL(S) (step SJ79).

Next, the distance of the guide route 88 from the end point node of locus route KT(S) to the destination node 80 is calculated by utilizing the road data file F4 of the data storage unit 37 (step SJ81), stored in the calculation register UW (step SJ81), and is added to the route distance KTL(S) (step SJ83). In FIG. 35, the distance from the node NOD24 of overlapped link RB22 of locus route KT1 to the destination node 80 is calculated by using the guide route 88, and is stored in the calculation register UW. On the other hand, the distance of the locus route KT1 is calculated by using the link data 60 of the locus data storage unit 40, and is stored in the route distance KTL(1). The lengths of the links are accumulated until the route distance KTL(S) from the start point node 82 to the destination node 80 is calculated by using the locus routes KT(S) (step SJ85).

When the route distances KTL(S) are found for all locus routes KT (S), then, the route distance KRL (P) is calculated for the locus route KR(P). First, the steps after the step SJ89 are repetitively executed until the calculation of distances of all locus routes KR(P) is finished (step SJ87). Here, "0" is set to the calculation register UW (step SJ89). When the end point node of locus route KR(P) is not in agreement with the destination node 80 (step SJ91), the distance from the end point node of locus route KR(P) to the destination node 80 is calculated as the distance of the guide route 88 (step SJ93), and the thus calculated distance is stored in the calculation register UW.

The distance from the start point node 82 to the end point node of locus route KR (P) is calculated as a route distance KRL (P), and to this value is added the value of the calculation register UW (step SJ95). At this moment, when the start point node of the locus route KR(P) is not in agreement with the start point node 82, the guide route 88 is used from the start point node 82 to the start point node of the locus route KR(P). Therefore, the distance from the start point node 82 to the start point node of the locus route KR(P) is calculated by using the guide route 88.

Thereafter, steps SJ87 to SJ97 are repeated until the calculation of distance of the whole locus route KR(P) is completed (step SJ87). Thus, the route distances KRL(P) from the start point node 82 to the destination node 80 are calculated by using the locus routes KR(P).

Figure 24:
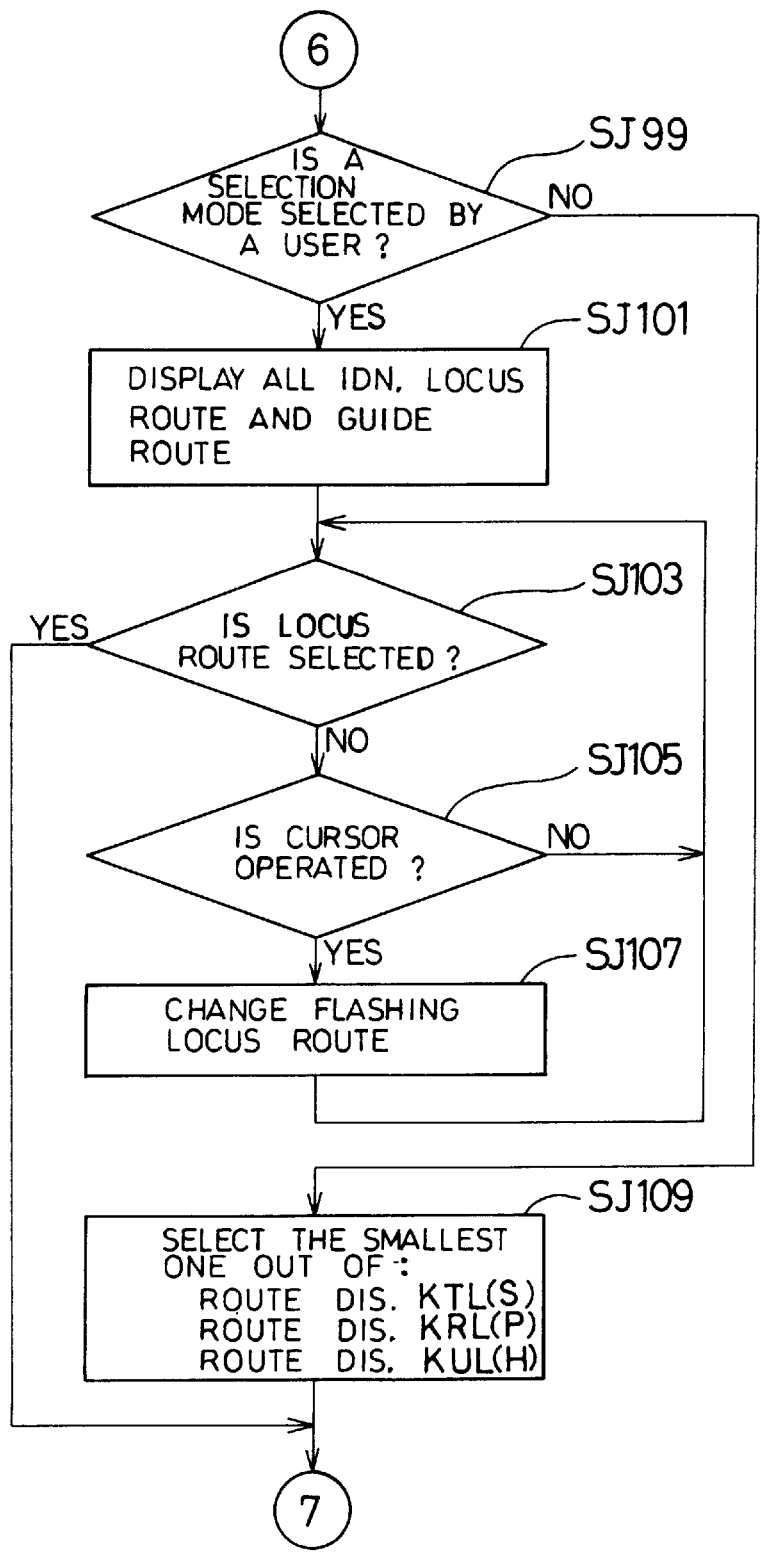

The locus route is identified by the routines of FIG. 18 to FIG. 23 by using locus data, and the distances are calculated from the start point node 82 to the destination node 80 by using locus routes. Thereafter, the routine of FIG. 24 is started. First, when the mode for selecting a locus route is set by the user (step SJ99), the route distance KTL(S), route distance KRL(P) and route distance KUL(H) are shown together with the guide route 88 on the display 33, and distances of the links only of the locus routes and the time required for running the links are shown (step SJ101).

When the locus route is shown on the display 33, furthermore, the first locus route is displayed in a flashing manner. When no locus route is selected (step SJ103) and the cursor is operated (step SJ105), the next locus route is shown in a flashing manner. When the cursor is not operated, however, the locus route is selected or waits for until the cursor is operated (steps SJ103, SJ105). Therefore, when the cursor is repetitively operated, the locus route shown on the display 33 in a flashing manner is changed cyclically. When the locus route is selected (step SJ103), on the other hand, the route is regarded to be a locus route KV. The selection is made depending upon whether or not the determination key provided on the display 33 is depressed. The flashing locus route is selected at the moment the determination key is depressed.

Furthermore, when the mode for selecting the locus route is not set by the user (step SJ99), a guide route is automatically selected out of the locus routes identified in FIGS. 18 to 23 (step SJ109). For example, the shortest one is selected out of the route distance KTL(S), route distance KRL(P) and route distance KUL(H) (step SJ109 in FIG. 24), and this route is regarded to be the locus route KV. That is, the locus route KV is the one selected out of the identified locus route KT (S), locus route KR (P) and locus route KU (H).

Next, it is determined whether the links constituting the locus route KV have road numbers of road data stored in the data storage unit 37 (steps SJ111, SJ113). The link without a road number is not a guide road but is a newly constructed road or a narrow road. It is not, therefore, allowed to display, by using the road data file F4, the locus route KV on a map shown on the display 33.

Therefore, the links of the locus route KV without road number are replaced by the arrangement of geographical coordinate points by using locus data in the locus data storage unit 40 (step SJ115), and the locus route KV and the guide route 88 are both shown on the display 33 (step SJ119). They may be shown in different colors, and the locus route KV may be distinguished from the guide route 88. When all links of the locus route KV have road numbers (step SJ113), the locus route KV can be represented by the road data stored in the data storage unit 37, and the links of the locus route KV can be replaced by a data sequence expressed by road numbers (step SJ117).

In FIG. 35, when the locus route KV is a locus route KT1, the routes to the destination node 80 from the locus route KT1 and from the node NOD24 of guide route 88 are shown on the display 33, and a locus route using locus data of the locus data storage unit 40 is shown preferentially. In this display of routes, the whole guide route 88 may be displayed, or the locus route KV and the guide route 88 may be displayed being distinguished from each other.

When the locus route KV and the whole guide route 88 are shown in parallel on the display 33, a query is shown on the display 33 asking the user if he wishes to use the locus route KV (step SJ121). When the locus route KV is selected, the locus route KV is used in the route guide display. In this case, the remaining routes other than the locus route KV use the guide route 88. In FIG. 35, this is a portion of the guide route 88 from the node NOD24 to the destination node 80. When the locus route KV is different from the guide route 88 at the step SJ121, the locus route KV may be preferentially selected. However, the guide route 88 may be automatically selected only when the distance of the guide route 88 is very short in comparing the distance of a portion of the guide route 88 with the distance of the locus route KV.

Figure 25:
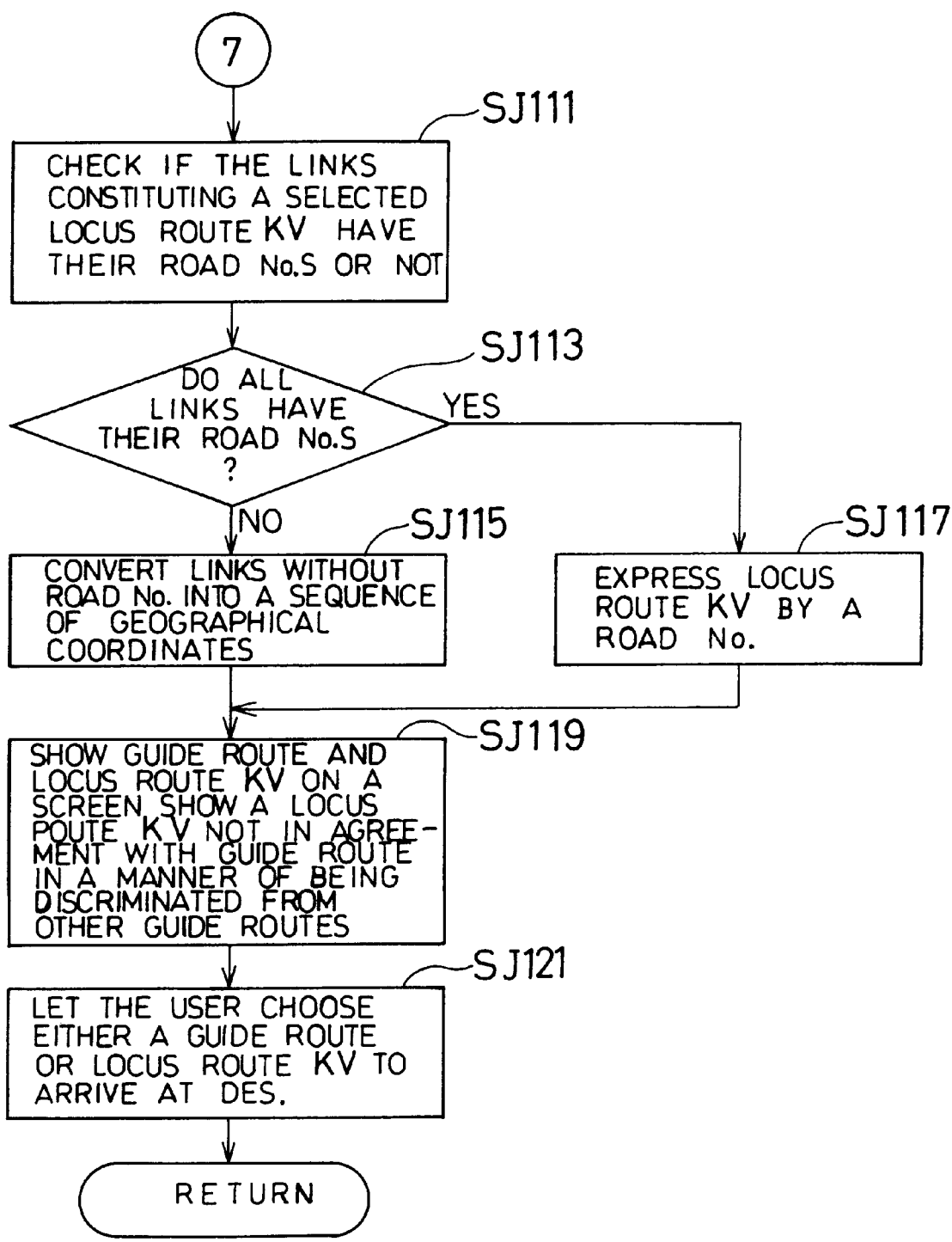

Referring to FIG. 25, when the locus route KV is a locus route KT1, the guide route 88 that corresponds to the locus route KV is from the node NOD26 to the start point node 82. Therefore, the locus route KT1 is forcibly selected since the locus route KT1 is different from the guide route 88.

Figure 29:
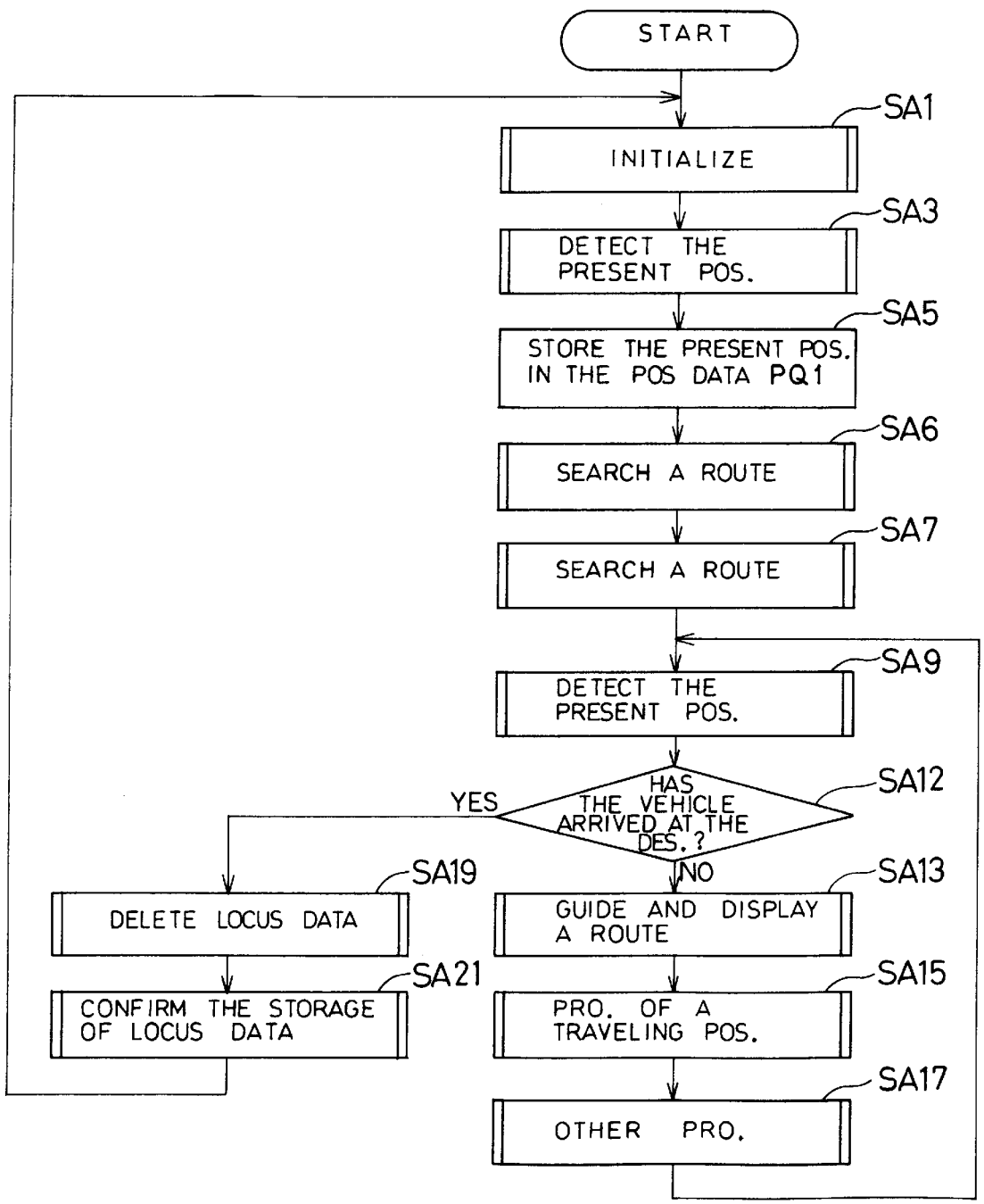
FIG. 29 is a flow chart of a main routine inclusive of deleting locus data according to a fourth embodiment.

As described above in detail, the locus route KT1 of FIG. 35 is identified by the processing shown in FIG. 18, the locus routes KR1, KR3 of FIG. 35 are identified by the processing shown in FIG. 19, and the locus route KR2 of FIG. 29 is identified by the processing shown in FIG. 20 or 21.

In the second embodiment of searching a route as described above, the guide route 88 using the road data file F4 of the data storage unit 37 is identified or the locus route preferentially using the locus data of the locus data storage unit 40 is identified as a route from the start point node 82 to the destination node 80. Referring to FIG. 35, for example, the guide route 88 is identified by using the road data file F4 of FIG. 4, and the locus routes KR1, KR2, KR3 and KT1 are identified by using the locus data in the locus data storage unit 40.

According to any one of these plurality of locus routes, the one having the shortest distance from the start point node 82 to the destination node 80 is selected, and the shortest locus route is preferentially used. Therefore, non-guided roads (which have not been stored in the data storage unit 37) frequently used by the user, are often used for searching a route. In the searching of peripheral links, in particular, the number of times of running through the link is added to the link running cost. Therefore, links that are most frequently used are preferentially employed for the route.

It is also allowable to execute a plural number of times the search for a guide route (step SJ1 of FIG. 15) by using the road data stored in the data region 38c of the data storage unit 37. In the second and subsequent searches for a guide route, the road that was once used for another guide route may be used for searching a new guide route as in the process for searching a locus route KR(P) of FIG. 21. Thus, the conditions for searching a route may be varied in searching for a guide route executed a plural number of times.

That is, in searching a guide route by using the road data stored in the data storage unit 37, the value of the search cost increases or decreases depending upon the distances of the roads, widths of the roads and frequencies for turning to the right and left, and the weighting added to the data greatly varies depending upon the value of the search cost. In the first processing for searching a guide route, for example, the search cost greatly varies depending upon the distance of the road, and the guide route being identified has a decreased overall distance from the start point to the destination. In the second processing for searching a guide route, the search cost for turning to the right or the left increases at the intersection. Therefore, the guide route that is identified turns to the right and left a decreased number of times as a result of preferentially selecting straight roads as a guide route.

Thus, the guide route is identified a plural number of times by using the road data stored in the data storage unit 37, and the locus routes constituted by the locus data in the locus data storage unit 40 are identified by the routines of FIGS. 18 to 21. The locus routes are shown on the display 33 together with a plurality of guide routes that have been identified thus far. With the locus routes being displayed, points where the locus routes and guide routes intersect (join) together are branch points, and a route is displayed from any branch point to another branch point. The thus divided routes are displayed in different colors so as to be distinguished from other routes.

In FIG. 35, for example, a route is from a node NOD27 to a node NOD26, and another route is from a node NOD24 to a node NOD22. The routes are expressed as roads in different colors or in different forms such as dotted line, one-dot chain line, two-dot chain line, etc.

The routes are freely selected as guide routes and are specified by the user. In FIG. 35, for example, a portion of the guide route 88 is used from the start point node 82 to the node NOD27, and the locus route KR3 is used from the node NOD27 to the node NOD22. Then, a route is selected to once return to the node NOD24 from the node NOD22, and the locus route KR1 is selected from the node NOD24 to the destination node 80. These routes form a guidance route for navigation. In calculating the running cost, furthermore, the times required for passing the links may be calculated and a guide route may be determined depending upon the required times. Moreover, the times required for running the links and the times TSU required for passing the intersections may be accumulated to find the time required for running the whole locus route that is identified, and these times may be displayed on the screen at the time of displaying the route.

Thus, a plurality of guide routes identified by using the road data in the data storage unit 37 and a plurality of locus routes identified by using locus data in the locus data storage unit 40, are freely selected by the user. Thus, a variety of routes can be selected as guide routes, and a guide route preferred by the user can be selected.

20. First Embodiment of a Routine for Deleting Locus Data

Figure 26:
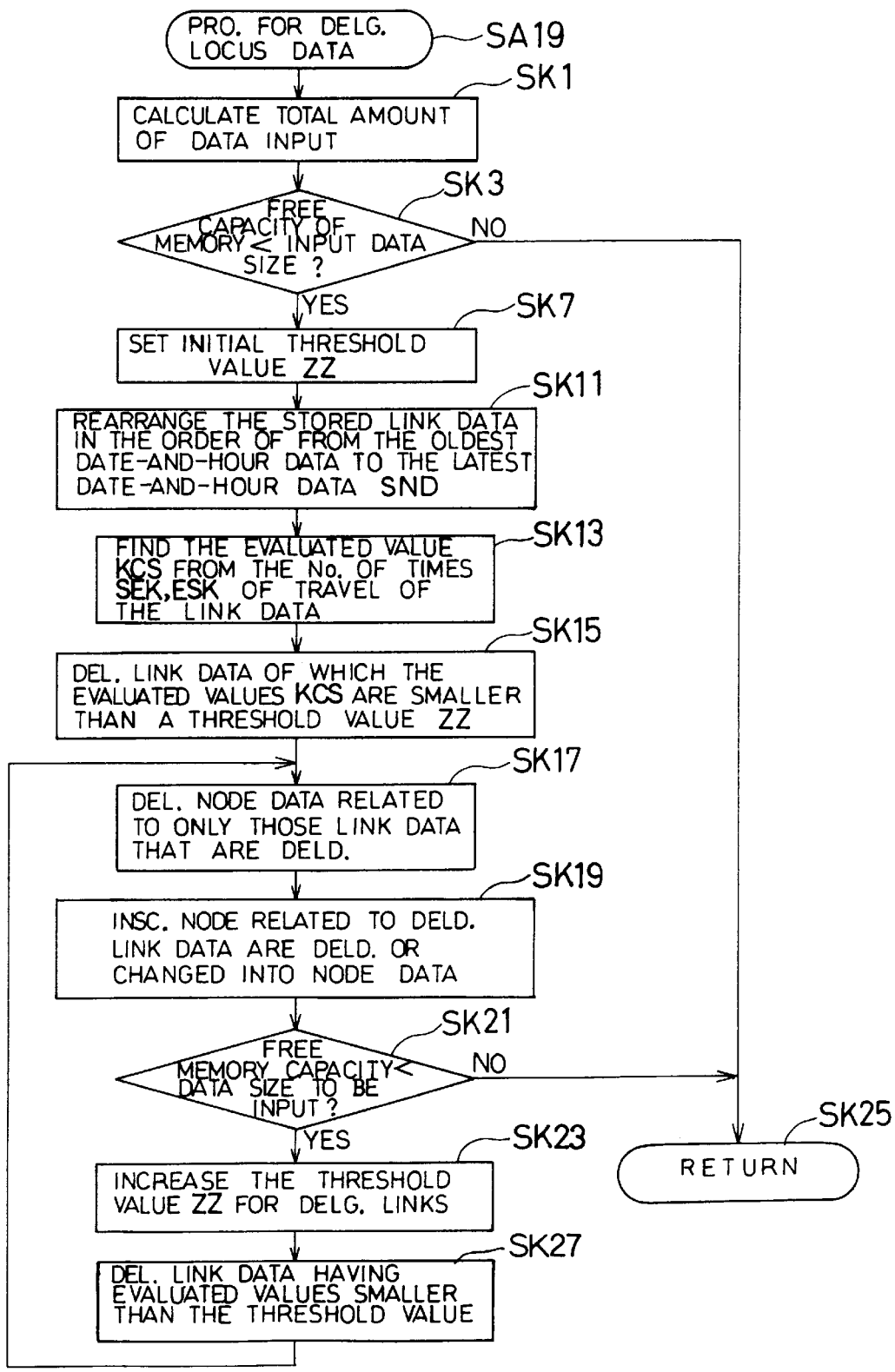
FIG. 26 is a flow chart of a routine for deleting locus data according to a first embodiment.

FIG. 26 is a flow chart of the processing for deleting locus data (step SA19) of FIG. 9. First, there is calculated the amount of new locus data to be stored in the locus data storage unit 40. In this case, the second RAM 6 temporarily stores the new locus data that are to be stored, and the amount of the stored data is measured to thereby measure the amount of new data.

Based on the result of measurement, it is determined whether or not the new locus data can be stored in the free memory region of the locus data storage unit 40 (step SK3). That is, it is determined whether the newly formed locus data or the locus data that increase accompanying the updating of the locus data can be all stored in the locus data storage unit 40.

Here, when the free memory region is not sufficient for storing new locus data in the locus data storage unit 40, a predetermined value is unconditionally substituted for the threshold value ZZ (step SK7). The threshold value ZZ creates a condition for automatically and selectively deleting the locus data that have been stored in the locus data storage unit 40. Then, the link data 60 stored in the locus data storage unit 40 are rearranged in the order of from the oldest traveled date-and-hour data SND to the latest traveled date-and-hour data SND (step SK11). The weighting function CD is found as described below depending upon the date-and-hour data SND.

As shown in FIG. 36, the functional value CD changes relative to the date-and-hour data SND. In FIG. 35, the date-and-hour data SND become newer toward the side of origin of the X-axis. The functional value CD is found according to, for example, CD=a constant PD/date-and-hour data SND. The constant PD is a value larger than "0". The functional value CD may be an exponential function such as of raising (SND) a constant PE. The constant PE is a value satisfying $0<\alpha<1$.

Therefore, the newer the date-and-hour data SND, the larger the functional value CD. The number of times of running through the links corresponding to the date-and-hour data SND is multiplied by the functional value CD, and the evaluated value KCS (SND) is found (step SK13). The number of times of running is a value obtained by adding together the number of times SEK of running and the number of times ESK of running.

The functional value CD increases as the date-and-hour data SND becomes more current. Therefore, even when the number of times of running is small, the evaluated value KCS (SND) relatively increases as the traveled date-and-hour data SND become more current. Conversely, the evaluated value KCS (SND) becomes relatively small if the traveled date-and-hour data SND are old despite a large number of travel times. When the evaluated value KCS is found for the link data 60, the evaluated values KCS are compared with the threshold value ZZ. The link data 60 of which the evaluated values KCS are smaller than the threshold value ZZ are deleted from the locus data storage unit 40 (step SK15). When the link data are deleted as described above, the node data 55 connected to the deleted link data 60 are also deleted (step SK17).

The link is a straight line connecting the two nodes as shown in FIG. 34. Therefore, when a given link is deleted, the nodes connected to both ends of the link are not necessary and are deleted. The nodes connected to the link are determined relying upon the start point node number SNB and end point node number ENB constituting the link data 60.

When the node specified by the start point node number SNB and the end point node number ENB is an intersection node, the node is converted into link data (step SK19). Whether or not the nodes at both ends of the link are intersection nodes is determined based upon the intersection number NPB included in the node data 55. The intersection number NPB of node data is "0" when the node is not an intersection.

When the node is an intersection, on the other hand, the intersection number NPB of the node data 55 is the number of the intersection data 65. Therefore, whether or not the node is an intersection is determined depending upon the intersection number NPB. When it is an intersection node, the number of the remaining links connected to the intersection node is calculated based on the number (NIM) of the entering links and the number (NOUT) of the exit links of the intersection data 65. Here, the remaining links are those links connected to the intersection node other than those links that are to be deleted. When the number of the remaining links exceeds "2", this node is preserved as an intersection node in the locus data storage unit 40. When the number of the remaining links is smaller than "3", however, the intersection node is changed into a general node, the intersection data 65 related to the node are deleted, and the intersection number NPB of the node data 55 is set to "0".

When the intersection node is changed (step SK19), the free memory capacity of the locus data storage unit 40 is compared again with the amount of data that is to be newly added (step SK21). When the free memory capacity is not sufficient, the threshold value ZZ is increased (step SK23), and the links having evaluated values KCS smaller than the new threshold value ZZ are newly deleted (step SK27). Whether or not the nodes at both ends of the link to be deleted are deleted, is determined based on the contents of the node data 55 (step SK17), and undesired intersection data 65 are deleted (step SK19).

Thus, every time the new locus data temporarily stored in the second RAM 6 is stored in the locus data storage unit 40, it is determined whether the free memory region of the locus data storage unit 40 is sufficiently large. When it is determined that the free memory region of the locus data storage unit 40 is not enough, the data related to the links having the oldest travel date-and-hour data and small numbers of times of running are preferentially deleted. That is, the locus data which are used less frequently are preferentially deleted from the locus data storage unit 40. When the free memory region that is increased by the one deletion of locus data, is not still large enough, more severe conditions are established for selectively deleting the data, and the locus data are further deleted.

As described above, whenever the new locus data are added to the locus data storage unit 40, the size of the free memory region of the locus data storage unit 40 is checked. This makes it possible to completely prevent the leakage of recording of additional locus data into the locus data storage unit 40.

21. Second Embodiment of a Routine for Deleting Locus Data

Figure 27:
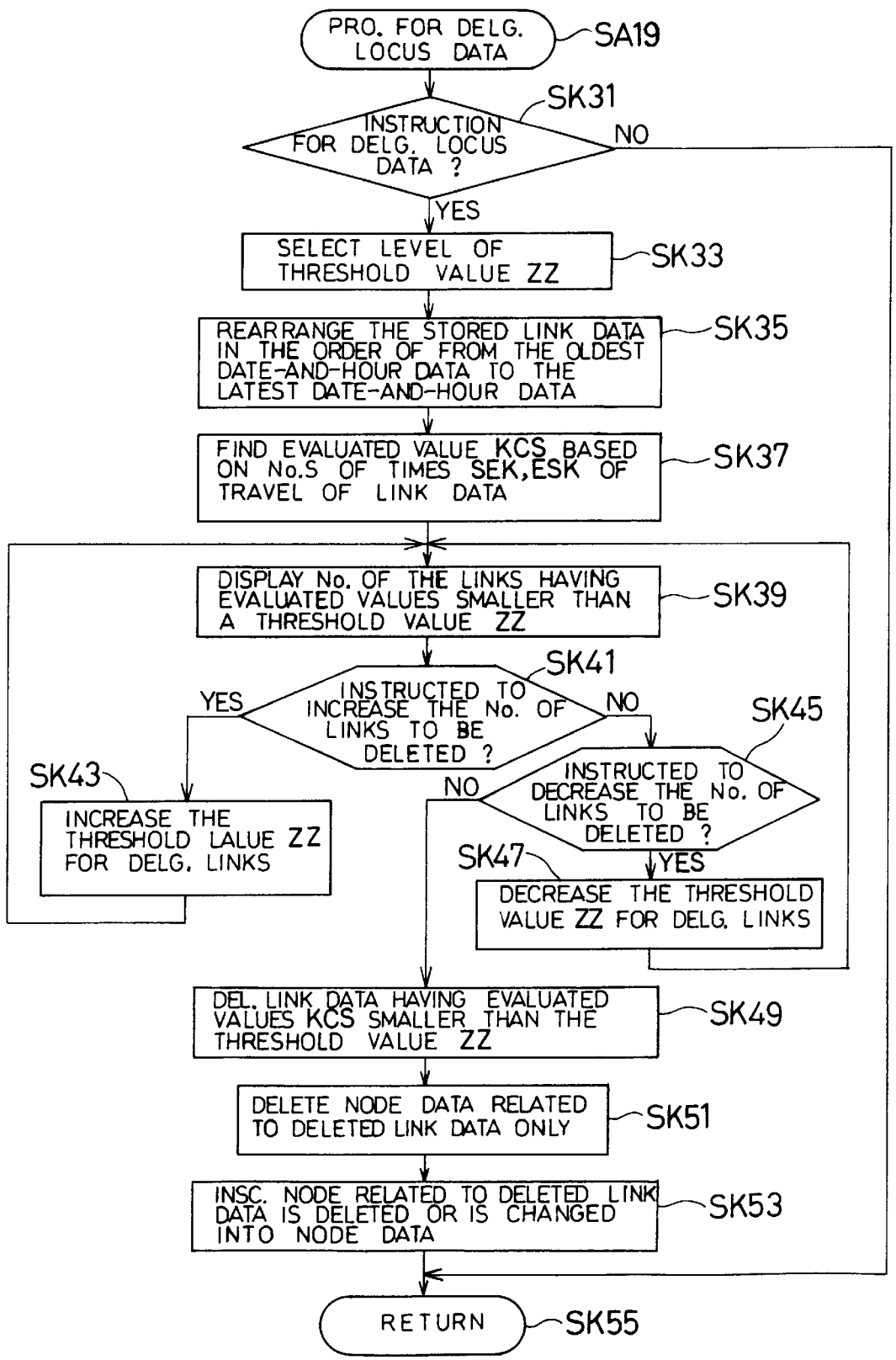
FIG. 27 is a flow chart of a routine for deleting locus data according to a second embodiment.

FIG. 27 is a flow chart of a second embodiment of the processing for deleting locus data (step SA19) of FIG. 9. In the second embodiment, the locus data are forcibly deleted by the user. First, when an instruction for deleting locus data of locus data storage unit 40 is input to the navigation device through a touch switch 34 (step SK31), a value that is adapted to a routine for forcible deletion is substituted for the threshold value ZZ. The threshold value ZZ used here is different from the threshold value ZZ used in the first embodiment. The link data 60 stored in the locus data storage unit 40 are rearranged in the order of from the oldest traveled date-and-hour data SND to the latest traveled date-and-hour date SND (step SK35).

Furthermore, the evaluated value KCS (SND) is found based upon the traveled date-and-hour data SND, number of times ESK of running and the number of times SEK of running of the links (step SK37). In calculating the evaluated value KCS, first, the weighing function value CD is found depending upon the date of the date-and-hour data SND. As shown in FIG. 36, the functional value CD changes depending on the date-and-hour data SND. In FIG. 36, the date of date-and-hour data SND becomes newer toward the side of origin of the X-axis. The functional value CD is found according to, for example, CD=a constant PD/date-and-hour data SND. The constant PD is a value larger than "0". The functional value CD may be an exponential function such as of raising (SND) a constant PE. The constant PE is a value satisfying $0<\alpha<1$.

Therefore, the more current the date-and-hour data SND, the larger the functional value CD. The number of times of running through the links corresponding to the date-and-hour data SND is multiplied by the functional value CD, and the evaluated value KCS (SND) is found (step SK37). The number of times of running is a value obtained by adding together the number of times SEK of running and the number of times ESK of running.

The functional value CD increases as the date-and-hour data SND become newer. Therefore, even when the number of times of running is small, the evaluated value KCS (SND) increases as the traveled date-and-hour data SND become newer. Conversely, the evaluated value KCS (SND) becomes small if the traveled date-and-hour data SND are old despite the number of times of running being large. When the evaluated value KCS is found for the link data 60, the evaluated values KCS are compared with the threshold value ZZ.

The number of the links for which the evaluated values KCS is smaller than the threshold value ZZ are shown on the display 33 (step SK39), and the number of the links to be forcibly deleted are shown on the display 33. When the user requests deletion of links of a number larger than the above displayed amount of links to be deleted, i.e., requests an increase in the number of the links that are to be deleted (step SK41), the threshold value ZZ is increased, an increased number of the links have evaluated values KCS smaller than the threshold value ZZ, and the number of the links having evaluated values KCS smaller than the threshold value ZZ is shown on the display 33 (step SK39). Then, step SK41 is executed again.

When increase in the number of links is not selected (step SK41) and, instead, a decrease in the number of the links to be deleted (step SK45) is selected, the threshold value ZZ decreases, the number of the links having evaluated values KCS smaller than the threshold value ZZ decreases, and the number of the links having evaluated values KCS smaller than the threshold value ZZ is shown again on the display 33 (step SK39). Thereafter, step SK41 is executed again. The instruction for increasing or decreasing the number of the links is input by using a cursor of the touch switch 34 or the like means.

When the number of the links to be deleted is either increased or decreased by the user (steps SK41, SK45), the links having evaluated values KCS smaller than the threshold value ZZ that has now been set are deleted (step SK49). Then, the data 55 of the nodes connected to the deleted links only are deleted (step SK51). The nodes connected to the links are discriminated relying upon the start point node number SNB and end point node number ENB included in the link data 60.

When the node specified by the start point node number SNB and end point node number ENB is an intersection node, then, the node is changed into link data (step SK53). Whether or not the nodes at both ends of the link are intersection nodes is determined based upon the intersection number NPB included in the node data 55. The intersection number NPB of node data is "0" when the node is not an intersection.

When the node is an intersection, on the other hand, the intersection number NPB of the node data 55 is the number of the intersection data 65. Therefore, whether or not the node is an intersection is determined depending upon the intersection number NPB. When it is an intersection node, the number of the remaining links connected to the intersection node is calculated based on the number (NIM) of the entering links and the number (NOUT) of the exit links of the intersection data 65. Here, the remaining links are those links connected to the intersection node other than those links that are to be deleted. When the number of the remaining links exceeds "2", this node is preserved as an intersection node.

When the number of the remaining links is smaller than "3", however, the intersection node is changed into a general node, the intersection data 65 related to the node are deleted, and the intersection number NPB of the node data 55 is set to "0". When the intersection node is changed (step SK53), the processing for deleting the locus data of FIG. 27 ends (step SK55).

According to the second embodiment of the processing for deleting locus data of FIG. 27 as described above, the processing for deleting links is executed in response to the instruction for deleting the links input by the user irrespective of the free memory capacity of the locus data storage unit 40. The total number of the links stored in the locus data storage unit 40 may also be shown while the number of the links to be deleted is being shown on the display 33 at the step SK39.

22. Third Embodiment of Deletion of Locus Data

Figure 28:
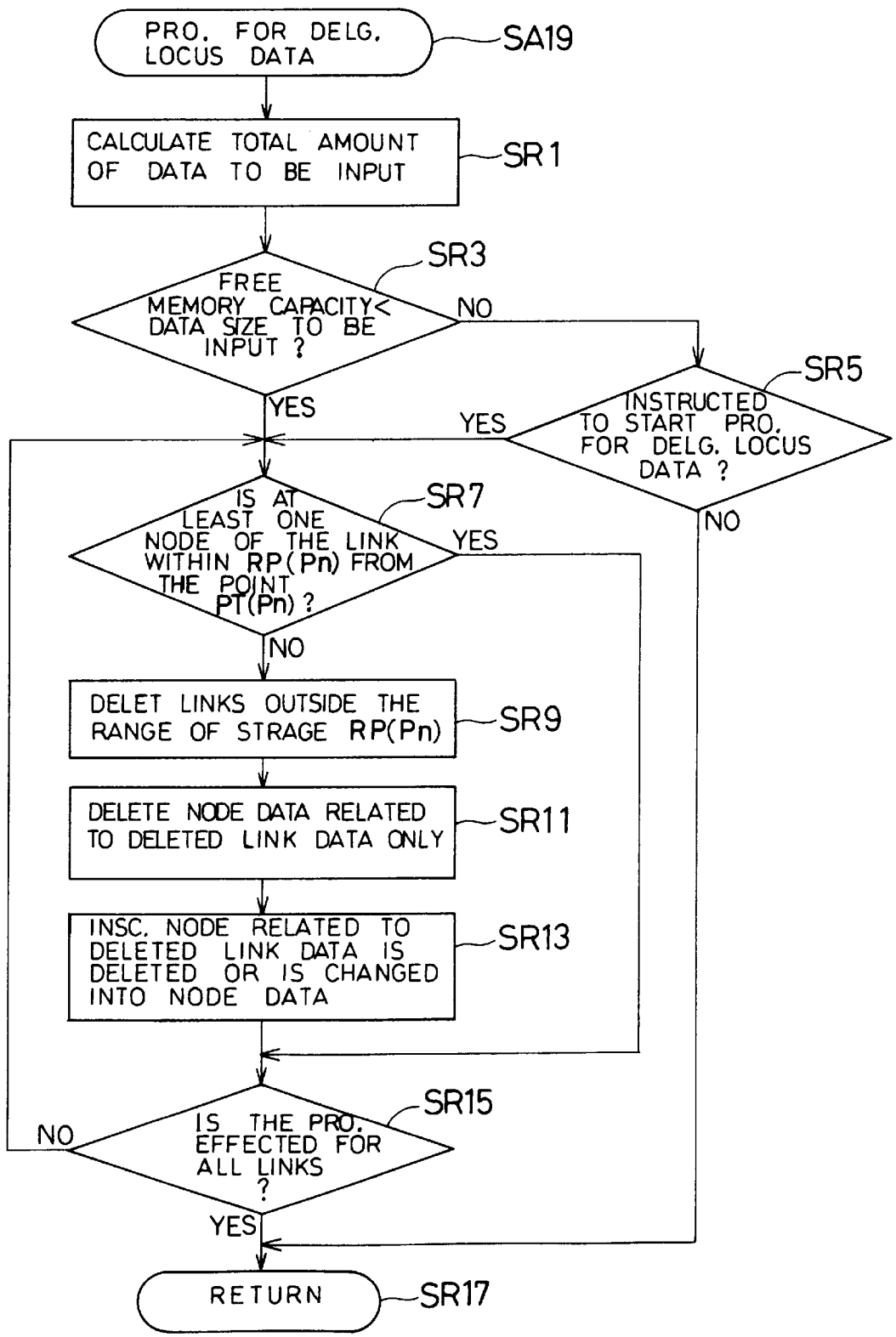
FIG. 28 is a flow chart of a routine for deleting locus data according to a third embodiment.

FIG. 28 is a flow chart of a third embodiment of the deleting of locus data (step SA19) of FIG. 9. In the deleting of locus data of the third embodiment, whether or not the locus data is to be stored in the locus data storage unit 40 is determined depending upon the geographical position of the locus data. Whether the locus data should or should not be input to the locus data storage unit 40 is determined depending upon whether one node of the link of the locus data lies within a range of a radius RP(Pn) with the point PT(Pn) as a center.

First, the amount of locus data temporarily stored in the second RAM 6 is measured (step SR1). The amount of data is compared with the free memory capacity of the locus data storage unit 40 (step SR3). When the free memory capacity of the locus data storage unit 40 is not sufficient for the amount of data in the second RAM 6, or when the user instructs start of the processing for deleting the locus data (step SR5), it is determined if one node of each link stored in the locus data storage unit 40 lies within a range of the radius RP from each point PT of the point list 66 (step SR7). The links outside the range of storage of the radius RP(Pn) are deleted (step SR9).

The data 55 of nodes connected to the deleted links only are deleted (step SR11). The nodes connected to the links are discriminated relying upon the start point node number SNB and end point node number ENB included in the link data 60. When the node specified by the start point node number SNB and the end point node number ENB is an intersection node, the node is converted into link data (step ST13). Whether or not the ends of the link are intersection nodes is determined by the intersection point number NPB included in the node data 55. When the node is not an intersection point, the intersection number NPB of the node data is Conversely, when the node is an intersection, the intersection number NPB of the node data 55 is the number of the intersection data 65. Based upon the value of intersection number NPB, it is determined whether or not the node is an intersection. When it is an intersection node, the number of the remaining links connected to the intersection node is calculated based upon the number (NIM) of the entering links and the number (NOUT) of the exit links of the intersection data 65. Here, the remaining links are those links connected to the intersection node but excluding the links that are to be deleted. When the number of the remaining links exceeds "2", the node is kept stored as an intersection node in the locus data storage unit 40.

However, when the number of the remaining links is smaller than "3", the intersection node is changed into a general node, and the intersection data 65 related to the node are deleted, and the intersection number NPB of the node data 55 is set to "0". When the data of the intersection node are changed, the steps from the step SR7 are repeated until the processing ends for all links stored in the locus data storage unit 40 (step SR15).

When it is determined at the step SR7 that one node of the link is within a range of storage RP of the point PT, the link is preserved in the locus data storage unit 40. When the routine of FIG. 28 is executed for all links stored in the locus data storage unit 40 (step SR15), the routine returns back to the routine of FIG. 9. In the routine of FIG. 28 as described above, the locus data in the vicinity of a particular point only are stored. The particular point may be a point where the ignition key is turned on or off. There may be stored the running locus data of only the vicinity of the point where the ignition key is turned off. The point where the ignition key is turned off is substantially the same point where the ignition key is turned on.

23. Fourth Embodiment of the Processing for Deleting Locus Data

Figure 30:
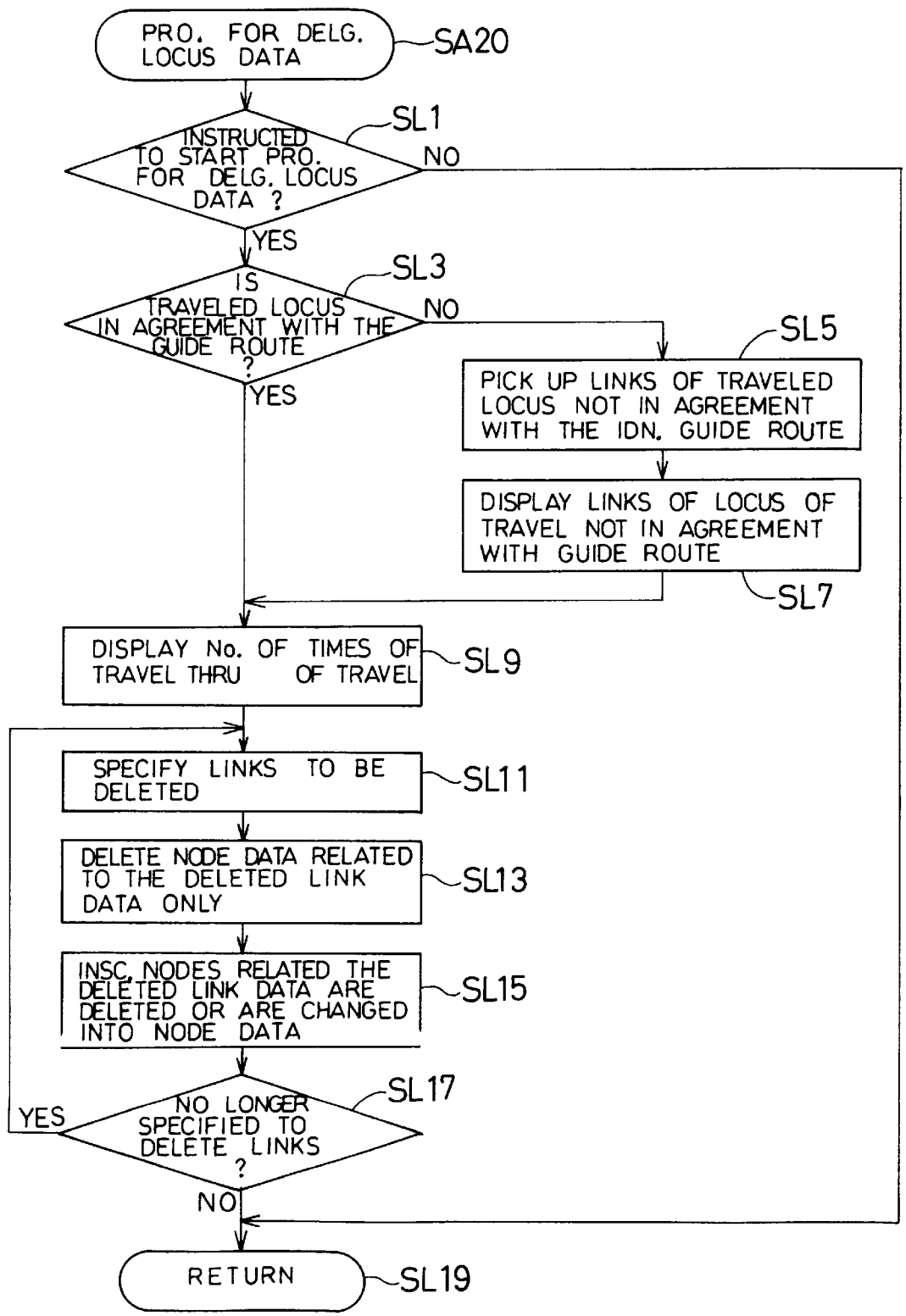
FIG. 30 is a flow chart of a routine for deleting locus data according to the fourth embodiment.

FIG. 30 is a flow chart of a fourth embodiment of the deleting of locus data. The overall processing inclusive of the processing for deleting locus data of the fourth embodiment is slightly different from the above-mentioned embodiment. FIG. 29 is a flow chart of the overall routine inclusive of the deleting of locus data of the fourth embodiment.

Like in the aforementioned embodiments, the main routine of FIG. 29 starts upon closing the power source circuit and ends upon turning the power source off. The power source is turned on or off upon turning the power source of the navigation device on or off, or upon turning the engine start key (ignition switch) of the vehicle on or off. The point where the ignition switch is turned off is substantially the same as the point where the ignition switch is turned on.

In FIG. 29, first, initialization is effected (step SA1). In the initialization a program for navigation is read out from the data region 38c of the data storage unit 37, and is copied onto the flash memory 3, so that the program of the flash memory 3 is executed. The CPU 2 clears the general-purpose data storage areas in the RAMs such as work memory in the first RAM 5 and the image memory 10.

Then, a present position routine is executed to detect the present position of the vehicle (step SA3). That is, the present geographical position of the vehicle is detected by using the GPS receiver 25 and the like. The geographical coordinate data of the vehicle are stored in the first RAM 5 as the present position data MP. The present position data MP are frequently corrected by data input through the beacon receiver 26 or the data transmitter-receiver 27.

In the detecting of the present position (step SA3), furthermore, the absolute direction data ZD, relative direction angle data Dθ and the traveled distance data ML are simultaneously found by utilizing the absolute direction sensor 21, relative direction sensor 22 and distance sensor 23. The absolute direction data ZD, relative direction angle data Dθ and traveled distance data ML are operated to determine the position of the vehicle. The thus determined position of the vehicle is collated with map data stored in a data region 38c of a data storage unit 37, and is corrected and is correctly indicated. Therefore, the present position of the vehicle is correctly indicated even when the GPS signals are not received such as when running through a tunnel.

The data representing the present position generated by the process for detecting in step SA3 are stored in the first RAM 5 as position data PQ1 (step SA5). The position data of the vehicle and time data therefore are stored in correlation with each other. Then, the searching of a route is executed (step SA7), the destination is set (step SF1 of FIG.

15), and the processing for searching links is executed (step SF9) to form a route.

In setting the destination, the geographical coordinates of the destination desired by the user are set as inputted destination data TP. For example, a coordinate position is specified by the user on a road map or on a house map shown on a display 33. When the destination is specified by the user, a central processing unit 1 stores the data related to the geographical coordinates of the destination in the first RAM 5 as inputted destination data TP.

In the route search, furthermore, an optimum route is identified from the start point of guide route SP to the end point of guide route ED. The optimum route referred to here is the one which the user can follow to the destination within the shortest period of time or running the shortest distance, or is the one which includes the roads that were preferentially used by the user in the past. Or, the optimum route may be the one which uses speedways enabling the user to arrive at the destination within the shortest period of time or running the shortest distance.

Thereafter, the present position of the vehicle is detected again by a present position detector 20 (step SA9). The deleting of locus data is executed (step SA20) when the vehicle has arrived at the destination of the route (step SA12) that is identified by the step SA7. When the vehicle has not arrived at the destination, however, the processing for indicating a next guide route (step SA13) is executed.

In the routine guiding and displaying the route, the guide route identified by the above-mentioned searching for a route is shown on the display 33 with the present position of the vehicle as a center. The guide route is shown on the display 33 in a different color so that it can be easily distinguished from other roads. Furthermore, guide information is output by voice from a speaker 13 or is shown on the display 33 at all times, so that the vehicle may favorably follow along the guide route. The image data of the guide route are the road map data around the present position or are the house map data around the present position stored in the data region 38c of the data storage unit 37.

The road map data and the house map data are changed over depending upon the conditions such as a distance from the present position to a guide point (destination, stopping place or intersection), a running speed of the vehicle, the size of the area that can be displayed, or the switching operation by the user. Near the guide point (destination, stopping place or intersection), the map is shown on an enlarged scale on the display 33. Instead of displaying the road map, the image of a simplified guide route may be shown on the display 33, or a minimum of required data only may be shown omitting geographical data to indicate a guide route, direction to the destination or to the place to be dropped in and the present position only.

After the processing for guiding and displaying the route of step SA13, there are successively executed the processing of a running position (step SA15) and other processing (step SA17). In the processing of a running position (step SA15), the data representing the locus of travel of the vehicle are temporarily stored in the second RAM 6, and the locus of travel of the vehicle is compared with the locus data stored in the locus data storage unit 40. The new locus data are added or the locus data are updated, and these locus data are stored in the second RAM 6.

The locus data are stored in the locus data storage unit 40 through execution of the steps SA20 and SA21. In step SA20, the new locus data stored in the second RAM 6 are selectively deleted. Therefore, even the newly formed locus data are not of ten stored in tthe locus data storage unit 40. This step SA20 is a routine for deleting the locus data of the fourth embodiment.

After the processing of a running position in step SA15, other processing (step SA17) is executed, and it is determined if an in struction for changing the d estination has been input by the switching operation of the user. When the new locus data stored in the second RAM 6 are stored in the locus data storage unit 40 at the step SA21, the processing is started again from the step SA1.

Next, described below with reference to FIG. 30 is the routine for deleting locus data according to the fourth embodiment. First, when it is instructed by the user to delete locus data (step SL1), it is determined whether or not the locus of travel of the vehicle is in agreement with the guide route (step SL3). That is, the locus data representing a locus of travel of the vehicle is stored in the second RAM 6, and the guide route is identified by the searching of a route (step SA7) of FIG. 29. The guide route is constituted by the road in the data storage unit 37 and by the links of locus data stored in the locus data storage unit 40. It is then determined if the road numbers or the link numbers constituting the guide route are in agreement with the link numbers of the running locus data currently stored in the second RAM 6.

When they are in agreement, it means that the current locus of travel is in agreement with the guide route. When the road numbers and link numbers constituting the guide route are not in agreement with the link numbers stored in the second RAM 6, however, it means that the current locus of travel is different from the guide route.

When it is determined that the locus of travel of the vehicle is not in agreement with the guide route (step SL3), the links of mismatching portions are checked (step SL5) to pick up links stored in the second RAM 6 that are not in agreement with the link numbers constituting the guide route that is identified. The links of the mismatching portions and the guide route are simultaneously shown being distinguished from each other on the display 33 (step SL7). The guide route and the mismatching links are shown, for example, in different colors.

At the same time, the number of times of previous running through the displayed links is shown (step SL9), and it is specified whether or not the links are to be deleted (step SL11). In specifying the links to be deleted, the links in the locus of travel are flashed one by one from the start point to the destination.

The display 33 invites a selection of whether or not a link is to be deleted by flashing that link. A command that permits the deletion may be, for example, "DELETION OK=Y, N". When the command for deletion is input, the data related to the flashing links are erased from the second RAM 6. The user is allowed to determine whether or not the locus data related to the links is to be deleted relying upon the number of times of running through the links indicated on the display 33.

When the guide route is not in agreement with the current locus of travel and the number of times of previous running through the link is only one time, it can be selected whether or not the new locus data is to be stored in the locus data storage unit 40.

When a locus of travel different from the guide route has been temporarily stored in the second RAM 6, the locus data corresponding to the locus of travel stored in the second RAM 6 are identified from the locus data storage unit 40. When the corresponding locus data have been stored in the locus data storage unit 40, the locus data stored in the locus data storage unit 40 may be displayed at the time of displaying the links at the step SL9. The locus data related to the links to be deleted may be deleted at step SL11.

When it is determined that the guide route is in agreement with the current route of travel (step SL3), the links of locus data stored in the second RAM 6 are all shown on the display 33 (step SL9), and the links constituting a guide route are shown. In showing the links the number of times of running through the links are also shown on the display 33. In this case, furthermore, the guide route is once stored as locus data of travel in the second RAM 6.

It is then specified whether or not the data of the displayed links is to be deleted (step SL11). To specify the links to be deleted, the links in the locus of travel are flashed one by one from the start point to the destination. An indication is shown on the display 33 inviting selection of whether or not the link that is flashing is to be deleted. When a command for deletion is input, the data related to the flashing link are erased from the second RAM 6. When the number of times of running is two or more, the link data 60 related to the link stored in the locus data storage unit 40 is also erased.

Thus, as the link data temporarily stored in the second RAM 6 is erased and the node data connected to the deleted links is erased only from the second RAM 6. When the erased links have been newly formed as a result of having been traveled, the node data only is erased from the second RAM 6. When the data related to the nodes have been previously stored in the locus data storage unit 40, however, the node data is also erased from the locus data storage unit 40. The nodes connected to the links are discriminated relying upon the start point node number SNB and end point node number ENB included in the link data 60.

When the node specified by the start point node number SNB and the end point node number ENB is an intersection node, the node is converted into link data (step SL15). Whether or not the nodes at both ends of the link are intersection nodes is determined based upon the intersection number NPB included in the node data 55. The intersection number NPB of node data is "0" when the node is not an intersection.

When the node is an intersection, on the other hand, the intersection number NPB of the node data 55 is the number of the intersection data 65. Therefore, whether the node is an intersection or not is determined depending upon the intersection number NPB. When it is an intersection node, the number of the remaining links connected to the intersection node is calculated based on the number (NIM) of the entering links and the number (NOUT) of the exit links of the intersection data 65. Here, the remaining links are those links connected to the intersection node other than those links that are to be deleted. When the number of the remaining links exceeds "2", this node is preserved as an intersection node in the locus data storage unit 40.

When the number of the remaining links is smaller than "3", however, the intersection node is changed into a general node. With the intersection node being changed into the general node, the intersection data 65 related to the node are deleted, and the intersection number NPB of the node data 55 is set to "0". When the intersection node is changed at the step SK53, the processing for deleting locus data of FIG. 30 ends (step SL19).

According to the routine for deleting locus data of the fourth embodiment shown in FIG. 30, as described above, it is determined whether or not the locus data related to the locus of current travel near the navigation operation end point (near the destination) is stored in the locus data storage unit 40. When the links related to the locus of travel of this time are those links that were traveled in the past, the numbers of times of travel in the past are also shown.

Therefore, whether or not the data related to the links is to be erased from the locus data storage unit 40 is freely determined by the user based on the numbers of times of running. Therefore, the links having small numbers of times of running that need not be stored are positively erased, and only those links (roads) desired by the user are preferentially stored.

The conditions for deleting the links of the locus data further include the following conditions. For example, the roads having limitations on the time for passage may be preferentially deleted, and the links having traveled date-and-hour data within particular hours only or outside particular hours may be preferentially deleted. Therefore, the route having limitations on the time for passage is not erroneously identified depending upon the time zone of travel of the vehicle. Moreover, the links on which the average vehicle speed AS is smaller than a predetermined value or larger than a predetermined value, may be preferentially deleted.

Through the above-described deletion of locus data, the deleted links and the intersections are excluded from the guide roads used in searching a route. However, the deleted links and the intersections, or the links and intersections that have not yet been traveled, may be included among the guide roads for searching a route. In calculating the running cost, running distance or running time for searching a route, in this case, the number of times "0" of running is changed into a value such as "0.5" or "0.1" other than "0".

24. Confirming the Storage of Locus Data

Figure 31:
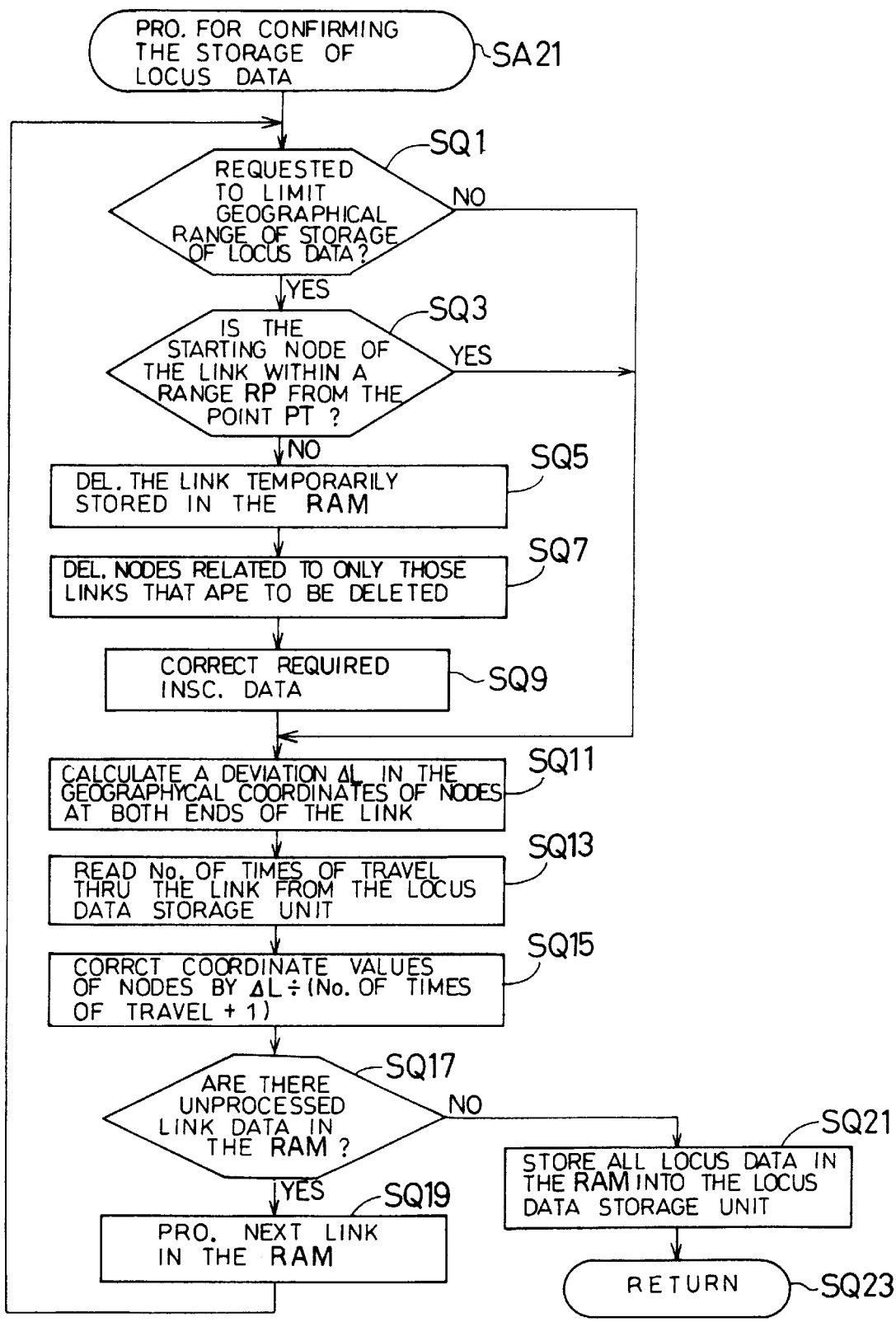
FIG. 31 is a flow chart of a subroutine for confirming the storage of locus data.

FIG. 31 is a flow chart of a routine for confirming the storage of locus data (step SA21) of FIG. 9. First, when the user requests limitation of the geographical range of storage to limit locus data stored in the locus data storage unit 40 (step SQ1), it is determined if the start point nodes of the links, which are the locus data stored in the second RAM 6, lie within a range of storage of the radius RP with the points PT of point list 66 as centers. Here, the start point node is a node of the side closer to the point PT.

When the start point nodes of the links stored in the second RAM 6 do not lie within the radius (range RP of storage) from the point PT, the nodes are deleted from the second RAM 6. Therefore, even the locus data detected by the processing for storing a locus of FIG. 12 are not often stored in the locus data storage unit 40 provided they do not lie within the radius RP (=range RP of storage) from the input point PT.

The nodes related to only the links that are deleted from the second RAM 6 at the step SQ5 are also deleted from the second RAM 6 (step SQ7). Whether or not the nodes are related to the deleted links is determined relying upon the start point node number SNB and the end point node number ENB of link data.

When the node specified by the start point node number SNB and the end point node number ENB of a link that is to be deleted is an intersection node, the node is converted into link data (step SQ9). Whether or not the nodes at the ends of the link are intersection nodes is determined based upon the intersection number NPB included in the node data 55.

When the node is an intersection, the number of the remaining links connected to the intersection node is calculated based on the number (NIM) of the entering links and the number (NOUT) of the exiting links of the intersection data 65. Here, the remaining links are those links connected to the intersection node other than those links that are to be deleted. When the number of the remaining links exceeds "2", this node is preserved as an intersection node in the second RAM 6.

When the number of the remaining links is smaller than "3", however, the intersection node is changed into a general node. With the intersection node being changed into the general node, the intersection data 65 related to the node are deleted, and the intersection number NPB of the node data 55 is set to "0". When the intersection node is changed at the step SK53, the node coordinates at both ends of the link stored in the second RAM 6 are read out from the second RAM 6, and the coordinates of the node stored in the locus data storage unit 40 are read out from the locus data storage unit 40. A geographical straight distance between the two coordinates is calculated (step SQ11). The geographical straight distance between the two coordinates is a deviation ΔL, and the number of times of running through the link with the above node as a start point or an end point is read out from the locus data storage unit 40 (step SQ13).

The geographical coordinate position of the node stored in the locus data storage unit 40 is corrected by a value obtained by dividing the deviation ΔL by (number of times of running +1) (step SQ15). That is, the position coordinate of the node is detected by the present position detector 20 every time the vehicle passes through the node, but the coordinate position that is detected does not assume the same value every time. When the position coordinate of the node is varying, the link may not be shown at an optimum position on the display 33. Therefore, the coordinate position of the node stored in the locus data storage unit 40 is averaged by the detected coordinate value every time the vehicle passes through the node. The detected coordinate positions may all be stored together with the coordinate values to be averaged. That is, the coordinate values that are detected are all stored as the coordinate values of the node every time when the node is passed. An average value of the coordinate values is also stored. When the deviation ΔL between the coordinate value of the present position that is detected and the coordinate value of the node stored in the locus data storage unit is larger than a predetermined value, the present position may be stored as a new separate node, and a link connected to the node may be newly formed.

Thereafter, the unprocessed links are processed through a step SQ19 until the links temporarily stored in the second RAM 6 are all processed (step SQ17). After the links stored in the second RAM 6 are all processed (step SQ17), the locus data temporarily stored in the second RAM 6 are all stored in the locus data storage unit 40 (step SQ21), and the routine returns back to the main routine of FIG. 9 (step SQ23).

In the processing for determining storage of locus data of FIG. 31, only those links within the radius (range of storage) RP from the point PT are stored in the locus data storage unit 40 from among the links stored in the second RAM 6. Therefore, the locus data stored are not limitlessly stored in the locus data storage unit 40. Besides, the points PT and the range RP of storage can be freely set and input by the processing for inputting a point of FIG. 10. Thus, storage of locus data is limited to a particular region only, e.g., to only the vicinity of the user's home. When a regional limit is added to the locus data that are stored, undesired links can be excluded in searching a route by using the locus data.

According to the navigation device of the present invention as described above, the traveling route of the vehicle is stored as locus data in the locus data storage unit 40, and a guide route is identified by using locus data stored in the locus data storage unit 40. Therefore, the roads preferred by the user are preferentially identified as a guide route. Even a road that is newly constructed and has not been stored in the data storage unit 37, can be stored as a route in the locus data storage unit 40, making it possible to identify a guide route based on the latest road conditions.

Not being limited to the above-mentioned embodiments only, the present invention can be modified in a variety of ways without departing from the gist and scope of the invention. In the above-mentioned embodiments, for example, the first RAM 5 may be a writable recording medium such as floppy disk or the like. Furthermore, the navigation device may be equipped with a voice input unit having an analog-to-digital converter. A command may be input to the navigation device by a voice instruction input through the voice input unit.

In the navigation device according to the present invention, the function of the locus data storage unit 40 may be provided in the data management center, and the data may be exchanged through VICS, ATIS or the like unit. That is, the locus data related to a route traveled by the vehicle are transmitted to a main storage unit in the data management center through the data transmitter-receiver 27, and are successively stored. The processing for searching a route at the step SA7 is carried out at the data management center by using the locus data stored therein.

The data such as conditions for searching destinations such as nearby facilities and conditions for searching a route are sent from the navigation device to the data management center. Based upon these conditions sent from the navigation device, the data management center identifies desired facilities or searches a route to the destination. The data related to the results of identification, picking-up and search are transmitted together with map data to the navigation device from the data management center. Based upon the results of identification, picking-up and search that are received, the navigation device shows the identified facilities on the display 33. Thus, the facilities are identified, picked up and searched based upon the detailed and latest data of the facilities in the vicinity of the present position of the vehicle. In identifying the facilities, furthermore, changes in the environment (newly determined one-way roads, etc.) of the roads can be taken into consideration. In this case, the data related to the facilities stored in the data management center are continuously updated.

All routines except that for guiding and displaying a route as shown in FIG. 9 (step SA13) need not be executed according to the program 38b stored in the data storage unit 37 but may instead be executed in the data management center. In this case, map data preserved in the data management center is used instead of map data stored in the data region 38c of data storage unit 37, and the data related to a locus of travel of the vehicle is stored and preserved in the data management center. Besides, the present position of the vehicle is detected by using data signals exchanged relative to the data management center. Therefore, the navigation device executes only a routine for guiding and displaying a route, a routine for generating locus data of travel based on the map data transmitted from the data management center, and a routine for transmitting locus data to the data management center. Then, a route can always be identified based upon the latest road data and map data, and more locus data can be stored, and the constituent members of the navigation device as a whole can be decreased.

Moreover, the data storage unit 37 and the locus data storage unit 40 may be in the form of a single rewritable storage medium. For example, a storage medium such as PC card or a magnetic-optic disk stores the road data F4 and the programs that are stored in the data storage unit 37 of the above-mentioned embodiments, those data that have been stored in the rewritable storage medium are updated among the locus data of travel, and the locus data that have not been stored in the rewritable storage medium are newly formed.

The data storage medium 37 can be used in a computer installed in a room, in a portable computer, or in any other computer. Then, the aforementioned navigation processing can be executed in a place other than in the vehicle. For instance, a map can be displayed, motion can be simulated from the present position to the destination, and distance can be calculated among all points along the roads on the map. The portable navigation device can be carried for performing outdoor activities such as cycling, travel, mountain climbing, hiking, fishing, etc.

The program and/or the data may be sent (transmitted) to the flash memory 3 from an external system via the data transmitter/receiver unit 27. The external system is a system for feeding the present position data to a data processing center of ATIS (Advanced Traffic Information Service). The external system is installed remote from the navigation device. The program is sent to the navigation device and is designed so as to be installed (transferred/copied) in the flash memory 3.

The routine for detecting the present position (step SA3), the input of a point (step SA6), the searching of a route (step SA7), the detecting of the present position (step SA9), the guidance and display of the route (step SA13), the processing of a traveling position (step SA15), the deletion of locus data (step SA19) and the confirmation of storage of locus data (step SA21) may be executed by the above-mentioned external system. The results of execution and map data are sent (transmitted) to the navigation device from the external system. Based upon the results of execution and map data that are received, the navigation device displays road data and route guidance. In this case, the road data, map data, facility data and traffic jam data are processed and controlled at the same time by the external system, making it possible to search a route and to set points in an optimum manner.

The program is automatically executed when the data storage medium 37 is inserted in the navigation device, or when the power source circuit of the navigation device is closed, or when started by the operator. The program and the data are not stored in the RAM 4 in a non-volatile manner and, hence, the installation is executed every time when the power source circuit is closed. When the data can be read out at high speeds from the data storage medium 37, the CPU 2 may directly read the program from the data storage medium 37. The flash memory 3 may be a battery backed-up RAM, an IC memory card or an EPROM.

The present invention can be further adapted as a navigation device for guidance of a person and as a navigation device for vehicles other than a car, for ships and for aircraft. Moreover, the map used for the navigation may be a marine chart or a sea bottom chart instead of a road map.

The term "destination" includes a drop-in point (place), a passing point (place) or objective point (place) in this specification. The term "present position (place)" includes a start position (place) and the term "start position (place)" includes the present position (place) in this specification.

We claim:

1. A device for processing data related to at least one intersection, comprising:

means for detecting at least one present position;

means for comparing the data related to the at least one intersection with data related to the detected present position;

data updating means for changing an intersection value related to number of trips through the one intersection based upon the result of the comparing; and storage means for storing the changed value.

2. The device according to claim 1, wherein said data updating means changes values related to number of trips in each of plural directions through the one intersection.

3. A device for processing data related to at least one road comprising:

means for detecting at least one present position;

means for comparing the data related to the at least one road with data related to the detected present position;

data updating means for changing a road value related to number of trips on the one road based upon the result of comparing; and storage means for storing the changed value.

4. The device according to claim 3, wherein said data updating means changes values related to number of trips in each of plural directions on the one road.

5. A device for processing data related to at least one intersection and data related to at least one road, said device comprising:

means for detecting at least one present position;

means for comparing the data related to the at least one road and the data related to the at least one intersection with data related to the detected present position;

data updating means for changing an intersection value related to number of trips through the one intersection and for changing a road value related to number of trips on the one road, based on results of the comparing;

search means for searching to determine at least one route from a start point or a present position of a vehicle to a destination, giving priority to an intersection which has the highest intersection value and to a road which has the highest road value, as compared to other intersections and roads.

6. A device for processing data related to at least one intersection or road, comprising:

means for detecting at least one present position;

means for comparing the data related to the at least one intersection or road with data related to the detected present position to determine a correspondence between the detected present position and the at least one intersection or road; and storage means for storing the detected present position as a new intersection or a new road, based upon the result of the determining.

7. The device according to claim 6, further comprising:

means for searching to determine at least one route from a start point or a present position of a vehicle to a destination; and wherein the new intersection or the new road is included in said one route.

8. The device according to claim 6 wherein data related to the new intersection or road is compared with the data related to the detected present position and further comprising:

means for changing an intersection value related to frequency of passage through the one intersection or a road value related to frequency of travel on the one road based upon the result of the comparing.

9. The device according to claim 8, further comprising:

means for searching to determine at least one route from a start point or a present position of a vehicle to a destination, giving priority to an intersection which has the highest intersection value or to a road which has the highest road value, as compared to other intersections or roads.

10. A device for processing data related to at least one intersection or road, comprising:

a locus data storage unit for storing data related to roads and intersections;

means for detecting at least one present position;

temporary storage means for temporarily storing data newly acquired based on detection of the one present position, said newly acquired data being related to at least one intersection or road corresponding to the detected present position; and means for selectively adding a portion of the newly acquired data to the data stored in said locus data storage unit, said portion being selected according to satisfaction of at least one predetermined condition.

11. The device according to claim 10, further comprising:

comparing means for comparing the newly acquired data with data for a road or intersection stored in said locus data storage unit;

means for changing a value related to number of trips through the one intersection or road for a road or intersection stored in said locus data storage unit and matched with the newly acquired data by said comparing means; and means for deleting an intersection or road, based upon the changed value and/or storage time of the intersections and roads in said locus data storage unit.

12. The device according to claim 11, wherein:

said deleting means deletes an intersection or road responsive to addition to said locus data storage unit of a new intersection or road, responsive to arrival at a destination, responsive to a determination that available storage capacity in the locus data storage unit is insufficient and/or responsive to command by an operator.

13. The device for according to claim 11, wherein:

said means for changing a value changes values related to number of trips in each of plural directions through the one intersection or road.

14. A device for processing data related to at least one intersection or road, comprising:

means for detecting at least one present position when the present position moves from a specified point;

a data storage unit for storing the data related to the at least one intersection or road; and means for flagging an intersection or road corresponding to the detected present position as a marked item of information, if the detected present position is in a predetermined area relative to the specified point.

15. The device according to claim 14, wherein:

the specified point is a point selected by an operator or a point at which an engine of a vehicle is started or turned off.

16. The device according the claim 14, further comprising:

means for storing, for a flagged intersection or road, a passage value related to a cumulative number of trips through the one intersection or road or a detection number related to the frequency the engine of a vehicle is started or turned off at the specified point; and area change means for changing the predetermined area relative to the specified point based upon the passage value or the detection number.

17. The device according to claim 14, further comprising:

means for changing a passage value related to a cumulative number of trips through an intersection or road corresponding to the detected present position and to one of plural possible directions therethrough.

18. A device for processing data related to a cumulative number of trips intersection or road, comprising:

means for detecting at least one present position when the present position moves from a specified point;

means for comparing the data related to the at least one intersection with data related to the detected present position to determine if they correspond;

means for changing a passage value related to a cumulative number of trips through the intersection or the road corresponding to the detected present position, if the detected present position is in a predetermined area relative to the specified point.

19. The device according to claim 18, wherein:

the specified point is a point selected by an operator or a point at which an engine of a vehicle is started or turned off.

20. The device according the claim 18, further comprising:

means for storing the passage value or a detection number related to the frequency an engine of a vehicle is started or turned off at the specified point; and area change means for changing the predetermined area relative to the specified point based upon the passage value or the detection number.

21. A device for processing data related to at least one intersection or road, comprising:

means for detecting at least one present position;

comparing means for determining a correspondence between data related to the present position and data related to the one intersection or road;

storage means for storing the present position as a new intersection or road, based upon the result of the comparing; and change means for changing a value for the new intersection or road on each occasion the new intersection or road is found to correspond to the detected present position.

22. The device according to claim 21, wherein:

the value is related to cumulative number of trips through the new intersection or road.

23. The device according to claim 21, wherein:

the value is based upon an average position of the present position detected on each occasion a vehicle passes the new intersection or road.

24. The device according to claim 21, wherein:

said storage means contains values for cumulative number of trips through the intersection or road or the new intersection or road for each of plural directions of travel.

25. A computer-readable medium for use in a navigational device and containing, encoded thereon, a program for processing data related to intersections or roads, said program comprising:

determining a present position based on detection signals;

comparing the determined present position with stored data for intersections or roads to determine a match;

responsive to determination of a match with a stored road or intersection, changing a value for said matching road or intersection related to a cumulative number of trips through said matching road or intersection.

26. The computer-readable medium according to claim 25 wherein said program further comprises:

based on said comparing, storing the determined present position as a new intersection or as a new road.

27. A computer-readable medium for use in a navigational device and containing, encoded thereon, a program for processing data related to intersections or roads, said program comprising:

determining a present position based on input signals from at least one detector;

temporarily storing, in a first storage means, data identifying the detected present position;

selecting a portion of the temporarily stored data on the basis of satisfaction of at least one predetermined condition; and storing the selected portion of a data in a second storage means, different from said first storage means.

28. A computer-readable medium for use in a navigational device and containing, encoded thereon, a program for processing data related to intersections or roads, said program comprising:

determining a present position based on signals from at least one detector;

comparing the determined present position with a stored intersection or road to determine correspondence with the stored intersection or road;

determining if the detected present position is in a predetermined area relative to a specified point; and flagging the corresponding intersection or road, identified by said comparing, pursuant to a determination that the detected present position is in the predetermined area.

29. A computer-readable medium for use in a navigational device and containing, encoded thereon, a program for processing data related to intersections or roads, said program comprising:

determining a present position based on input signals from at least one detector;

comparing the determined present position with stored intersections or roads to identify a corresponding intersection or road;

determining if the determined present position is within a predetermined area relative to a specified point; and changing a value for a corresponding intersection or road pursuant to determination that the determined present position is within the predetermined area, said value being related to a cumulative number of trips through the corresponding intersection or road.

30. A computer-readable medium for use in a navigational device and containing, encoded thereon, a program for processing data related to intersections or roads, said program comprising:

determining a present position based on signals from at least one detector;

comparing the determined present position with stored intersections or roads to identify a corresponding intersection or road;

storing the determined present position as a new intersection or road based upon the results of the comparing; and changing a value for the new intersection or road on each subsequent ocassion the new intersection or road is found to correspond to a detected present position.

* * * * *